US011462736B2

(12) United States Patent
Dai et al.

(10) Patent No.: US 11,462,736 B2
(45) Date of Patent: *Oct. 4, 2022

(54) SURFACE STABILIZED CATHODE MATERIAL FOR LITHIUM ION BATTERIES AND SYNTHESIZING METHOD OF THE SAME

(71) Applicant: Apple Inc., Cupertino, CA (US)

(72) Inventors: Hongli Dai, Los Altos, CA (US); Dapeng Wang, San Jose, CA (US); Huiming Wu, San Jose, CA (US); Fiona Claire Strobridge, San Francisco, CA (US); John David Carter, Lemont, IL (US); Christopher S. Johnson, Naperville, IL (US); Xiaoping Wang, Naperville, IL (US); Hakim H. Iddir, Hoffman Estates, IL (US); Arthur Jeremy Kropf, Westmont, IL (US); Yan Li, Westmont, IL (US); Victor A. Maroni, Naperville, IL (US); Anh D. Vu, Lemont, IL (US); Zhenzhen Yang, Lemont, IL (US); Arturo Gutierrez, Naperville, IL (US); Yanjie Cui, Arlington Heights, IL (US)

(73) Assignee: Apple Inc., Cupertino, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/802,347

(22) Filed: Feb. 26, 2020

(65) Prior Publication Data
US 2020/0189930 A1 Jun. 18, 2020

Related U.S. Application Data

(63) Continuation of application No. 15/710,540, filed on Sep. 20, 2017, now Pat. No. 10,597,307.

(60) Provisional application No. 62/524,864, filed on Jun. 26, 2017, provisional application No. 62/397,730, filed on Sep. 21, 2016, provisional application No. 62/397,725, filed on Sep. 21, 2016.

(51) Int. Cl.
*H01M 4/525* (2010.01)
*H01M 4/505* (2010.01)
*C01G 53/00* (2006.01)
*C01G 45/12* (2006.01)
*C01G 51/00* (2006.01)
*H01M 4/131* (2010.01)
*H01M 4/1391* (2010.01)
*H01M 10/0525* (2010.01)

(52) U.S. Cl.
CPC ........ *H01M 4/525* (2013.01); *C01G 45/1228* (2013.01); *C01G 51/50* (2013.01); *C01G 53/42* (2013.01); *C01G 53/50* (2013.01); *H01M 4/131* (2013.01); *H01M 4/1391* (2013.01); *H01M 4/505* (2013.01); *H01M 10/0525* (2013.01); *C01P 2002/50* (2013.01); *C01P 2002/54* (2013.01); *C01P 2002/72* (2013.01); *C01P 2002/82* (2013.01); *C01P 2002/86* (2013.01); *C01P 2002/88* (2013.01); *C01P 2004/03* (2013.01); *C01P 2004/84* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 5,744,262 A | 4/1998 | Cheng et al. | |
| 5,993,998 A | 11/1999 | Yasuda | |
| 6,007,947 A | 12/1999 | Mayer | |
| 6,077,496 A | 6/2000 | Hiraoka et al. | |
| 6,677,082 B2 | 1/2004 | Thackeray et al. | |
| 6,680,143 B2 | 1/2004 | Thackeray et al. | |
| 6,878,487 B2 | 4/2005 | Cho et al. | |
| 7,135,252 B2 | 11/2006 | Thackeray et al. | |
| 7,205,072 B2 | 4/2007 | Kang et al. | |
| 7,235,193 B2 | 6/2007 | Park et al. | |
| 7,238,450 B2 | 6/2007 | Howard, Jr. et al. | |
| 7,314,682 B2 | 1/2008 | Thackeray et al. | |
| 7,314,684 B2 | 1/2008 | Kang et al. | |
| 7,435,402 B2 | 10/2008 | Kang et al. | |
| 7,468,223 B2 | 12/2008 | Thackeray et al. | |
| 7,655,361 B2 | 2/2010 | Kim et al. | |
| 7,691,535 B2 | 4/2010 | Shiozaki et al. | |
| 7,732,096 B2 | 6/2010 | Thackeray et al. | |
| 7,754,384 B2 | 7/2010 | Patoux et al. | |

(Continued)

FOREIGN PATENT DOCUMENTS

| | | |
|---|---|---|
| CN | 1588675 | 3/2005 |
| CN | 1702891 | 11/2005 |

(Continued)

OTHER PUBLICATIONS

Yuping et al.; "Lithium Ion Batteries—Applications and Practices"; Chapter 5 Cobalt Lithium Oxide Cathode Materials; Chemical Industry Press; Jan. 2012; 4 pages.
U.S. Appl. No. 16/679,911, filed Nov. 11, 2020, Dai et al.
Amiruddin et al.; "Electrochemical Characterization of Cathode Material (Li[Ni0.8Co0.1Mn0.1]O2 as Core and Li[Ni0.5-0.5xCoxMn0.5-0.5x]O2 as shell)for Lithium-Ion Batteries"; ECS Meeting Abstracts; Electrochemical Society; No. 240; 2007; one page.

(Continued)

Primary Examiner — Laura Weiner
(74) Attorney, Agent, or Firm — BakerHostetler

(57) ABSTRACT

A compound represented by $Li_aCo_{(1-x-2y)}Me_x(M1M2)_yO_\delta$, (Formula (I)) wherein Me, is one or more of Li, Mg, Al, Ca, Ti, Zr, V, Cr, Mn, Fe, Ni, Cu, Zn, Ru and Sn, and wherein $0 \leq x \leq 0.3$, $0 < y \leq 0.4$, $0.95 \leq \alpha \leq 1.4$, and $1.90 \leq \delta \leq 2.10$ is disclosed. Further, particles including such compounds are described.

11 Claims, 29 Drawing Sheets

(56) References Cited

U.S. PATENT DOCUMENTS

| | | | |
|---|---|---|---|
| 7,897,674 B2 | 3/2011 | Zaghib | |
| 7,923,149 B2 | 4/2011 | Hwang et al. | |
| 8,148,011 B2 | 1/2012 | Thackeray et al. | |
| 8,187,746 B2 | 5/2012 | Chen et al. | |
| 8,206,852 B2 | 6/2012 | Chang et al. | |
| 8,277,683 B2 | 10/2012 | Deng et al. | |
| 8,337,727 B2 | 12/2012 | Chen et al. | |
| 8,343,663 B2 | 1/2013 | Jung et al. | |
| 8,383,077 B2 | 2/2013 | Thackeray et al. | |
| 8,535,832 B2 | 9/2013 | Karthikeyan et al. | |
| 8,801,960 B2 | 8/2014 | Ueda et al. | |
| 8,802,290 B2 | 8/2014 | Li et al. | |
| 9,166,222 B2 | 10/2015 | Amiruddin et al. | |
| 9,716,265 B2 | 7/2017 | Dai et al. | |
| 9,843,041 B2 | 12/2017 | Lopez et al. | |
| 10,084,187 B2 | 9/2018 | Dai et al. | |
| 10,128,494 B2 | 11/2018 | Dai et al. | |
| 10,141,572 B2 | 11/2018 | Wu et al. | |
| 10,164,256 B2 | 12/2018 | Wu et al. | |
| 10,297,821 B2 | 5/2019 | Dai et al. | |
| 10,297,823 B2 | 5/2019 | Dai et al. | |
| 10,347,909 B2 | 7/2019 | Dai et al. | |
| 10,593,941 B2 | 3/2020 | Dai et al. | |
| 10,597,307 B2 * | 3/2020 | Dai | H01M 4/525 |
| 10,615,413 B2 | 4/2020 | Dai et al. | |
| 2002/0061444 A1 | 5/2002 | Kweon et al. | |
| 2002/0114995 A1 | 8/2002 | Thackery | |
| 2002/0136954 A1 | 9/2002 | Thackery | |
| 2002/0182504 A1 | 12/2002 | Imachi et al. | |
| 2003/0013017 A1 | 1/2003 | Nagayama et al. | |
| 2003/0039886 A1 | 2/2003 | Zhang et al. | |
| 2003/0073002 A1 | 4/2003 | Imachi et al. | |
| 2003/0082445 A1 | 5/2003 | Smieth et al. | |
| 2003/0134200 A1 | 7/2003 | Tanaka et al. | |
| 2004/0029008 A1 | 2/2004 | Winterberg | |
| 2004/0191633 A1 | 9/2004 | Johnson et al. | |
| 2004/0258836 A1 | 12/2004 | Besenhard et al. | |
| 2005/0026040 A1 | 3/2005 | Thackery | |
| 2005/0074675 A1 | 4/2005 | Nishijima et al. | |
| 2005/0130042 A1 | 6/2005 | Liu et al. | |
| 2005/0136329 A1 | 6/2005 | Howard, Jr. et al. | |
| 2005/0181279 A1 | 8/2005 | Hosoya | |
| 2005/0265909 A1 | 12/2005 | Kajiya et al. | |
| 2005/0271948 A1 | 12/2005 | Kang | |
| 2006/0024584 A1 | 2/2006 | Kim et al. | |
| 2006/0068293 A1 | 3/2006 | Kim et al. | |
| 2006/0081818 A1 | 4/2006 | Ito et al. | |
| 2006/0088767 A1 | 4/2006 | Li et al. | |
| 2006/0099508 A1 | 5/2006 | Thackeray et al. | |
| 2006/0159994 A1 | 7/2006 | Dahn et al. | |
| 2006/0177739 A1 | 8/2006 | Endo et al. | |
| 2006/0194118 A1 | 8/2006 | Yew et al. | |
| 2006/0240326 A1 | 10/2006 | Lee | |
| 2007/0048619 A1 | 3/2007 | Inda | |
| 2007/0141469 A1 | 6/2007 | Tokunaga et al. | |
| 2007/0172739 A1 | 7/2007 | Visco | |
| 2007/0202407 A1 | 8/2007 | Eberman et al. | |
| 2007/0264573 A1 | 11/2007 | Yamada et al. | |
| 2007/0292761 A1 | 12/2007 | Park et al. | |
| 2008/0057401 A1 | 3/2008 | Mori et al. | |
| 2008/0090150 A1 | 4/2008 | Nakura | |
| 2008/0118836 A1 | 5/2008 | Hwang et al. | |
| 2008/0118847 A1 | 5/2008 | Jung et al. | |
| 2008/0131778 A1 | 6/2008 | Watanabe et al. | |
| 2008/0131781 A1 | 6/2008 | Yong et al. | |
| 2008/0160415 A1 | 7/2008 | Wakita et al. | |
| 2008/0268339 A1 | 10/2008 | Suzuki | |
| 2008/0280205 A1 | 11/2008 | Jiang et al. | |
| 2008/0311473 A1 | 12/2008 | Sasaoka et al. | |
| 2008/0318131 A1 | 12/2008 | Watanabe et al. | |
| 2009/0092903 A1 | 4/2009 | Johnson et al. | |
| 2009/0146115 A1 | 6/2009 | Xiao et al. | |
| 2009/0200510 A1 | 8/2009 | Watanabe et al. | |
| 2009/0202905 A1 | 8/2009 | Morita et al. | |
| 2009/0239148 A1 | 9/2009 | Jiang | |
| 2010/0055567 A1 | 4/2010 | Nakai et al. | |
| 2010/0086853 A1 | 4/2010 | Venkatachalam et al. | |
| 2010/0086854 A1 | 4/2010 | Kumar et al. | |
| 2010/0151332 A1 | 6/2010 | Lopez et al. | |
| 2010/0173197 A1 | 7/2010 | Li et al. | |
| 2010/0304225 A1 | 12/2010 | Pascaly et al. | |
| 2011/0014518 A1 | 1/2011 | Nakai et al. | |
| 2011/0017529 A1 | 1/2011 | Kumar et al. | |
| 2011/0031437 A1 | 2/2011 | Nagase et al. | |
| 2011/0052981 A1 | 3/2011 | Lopez et al. | |
| 2011/0053001 A1 | 3/2011 | Babic et al. | |
| 2011/0065006 A1 | 3/2011 | Ogasa | |
| 2011/0076556 A1 | 3/2011 | Karthikeyan et al. | |
| 2011/0076564 A1 | 3/2011 | Yu et al. | |
| 2011/0081578 A1 | 4/2011 | Chang et al. | |
| 2011/0089369 A1 | 4/2011 | Patoux et al. | |
| 2011/0111294 A1 | 5/2011 | Lopez et al. | |
| 2011/0111298 A1 | 5/2011 | Lopez et al. | |
| 2011/0121240 A1 | 5/2011 | Amine et al. | |
| 2011/0136019 A1 | 6/2011 | Amiruddin et al. | |
| 2011/0143174 A1 | 6/2011 | Kim | |
| 2011/0165463 A1 | 7/2011 | Chang et al. | |
| 2011/0165474 A1 | 7/2011 | Im et al. | |
| 2011/0171371 A1 | 7/2011 | Li et al. | |
| 2011/0171539 A1 | 7/2011 | Patoux et al. | |
| 2011/0200864 A1 | 8/2011 | Dai | |
| 2011/0200880 A1 | 8/2011 | Yu | |
| 2011/0223492 A1 | 9/2011 | Sakitani et al. | |
| 2011/0244331 A1 | 10/2011 | Karthikeyan et al. | |
| 2011/0294006 A1 | 12/2011 | Amine et al. | |
| 2011/0294019 A1 | 12/2011 | Amine et al. | |
| 2012/0015240 A1 | 1/2012 | Teng et al. | |
| 2012/0015250 A1 | 1/2012 | Teng et al. | |
| 2012/0028134 A1 | 2/2012 | Kim et al. | |
| 2012/0040247 A1 | 2/2012 | Manivannan et al. | |
| 2012/0168696 A1 | 5/2012 | Huang et al. | |
| 2012/0196176 A1 | 8/2012 | He et al. | |
| 2012/0282522 A1 | 11/2012 | Axelbaum et al. | |
| 2012/0295155 A1 | 11/2012 | Deng et al. | |
| 2013/0004826 A1 | 1/2013 | Li et al. | |
| 2013/0011738 A1 | 1/2013 | Zhou | |
| 2013/0101893 A1 | 4/2013 | Dai et al. | |
| 2013/0149604 A1 | 6/2013 | Fujiki et al. | |
| 2013/0252107 A1 | 9/2013 | Lee et al. | |
| 2013/0260249 A1 | 10/2013 | Choi | |
| 2013/0344391 A1 | 12/2013 | Yushin et al. | |
| 2014/0087065 A1 | 3/2014 | Li et al. | |
| 2014/0087254 A1 | 3/2014 | Li et al. | |
| 2014/0087256 A1 | 3/2014 | Li et al. | |
| 2014/0087261 A1 | 3/2014 | Li et al. | |
| 2014/0141331 A1 | 5/2014 | Lee et al. | |
| 2014/0158932 A1 | 6/2014 | Sun et al. | |
| 2014/0175329 A1 | 6/2014 | Palma et al. | |
| 2014/0193693 A1 | 7/2014 | Hoshina et al. | |
| 2014/0234715 A1 | 8/2014 | Fasching et al. | |
| 2014/0272563 A1 | 9/2014 | Dai et al. | |
| 2015/0140421 A1 | 5/2015 | Ihara et al. | |
| 2015/0171423 A1 | 6/2015 | Kim et al. | |
| 2015/0180024 A1 | 6/2015 | Nose | |
| 2015/0243971 A1 | 8/2015 | Cho et al. | |
| 2015/0243984 A1 | 8/2015 | Kase et al. | |
| 2015/0303519 A1 | 10/2015 | Hanazaki | |
| 2015/0311522 A1 | 10/2015 | Fang et al. | |
| 2016/0036043 A1 | 2/2016 | Dai et al. | |
| 2016/0133929 A1 | 5/2016 | Hah et al. | |
| 2016/0156032 A1 | 6/2016 | Lee et al. | |
| 2016/0260965 A1 | 9/2016 | Wu et al. | |
| 2016/0293941 A1 | 10/2016 | Yamasaki et al. | |
| 2016/0315315 A1 | 10/2016 | Olken et al. | |
| 2016/0351973 A1 | 12/2016 | Albano et al. | |
| 2017/0092949 A1 | 3/2017 | Dai et al. | |
| 2017/0133678 A1 | 5/2017 | Ozoemena et al. | |
| 2017/0187071 A1 | 6/2017 | Wang et al. | |
| 2017/0187072 A1 | 6/2017 | Wang et al. | |
| 2017/0214045 A1 | 7/2017 | Dai et al. | |
| 2017/0263917 A1 | 9/2017 | Dai et al. | |
| 2017/0263928 A1 | 9/2017 | Dai et al. | |
| 2017/0263929 A1 | 9/2017 | Wu et al. | |
| 2017/0279162 A1 | 9/2017 | Vissers et al. | |

(56) References Cited

U.S. PATENT DOCUMENTS

| | | |
|---|---|---|
| 2017/0346082 A1 | 11/2017 | Dai et al. |
| 2018/0062156 A1 | 3/2018 | Wu et al. |
| 2018/0083277 A1 | 3/2018 | Dai et al. |
| 2018/0083278 A1 | 3/2018 | Dai et al. |
| 2018/0114983 A9 | 4/2018 | Dai et al. |
| 2018/0114984 A9 | 4/2018 | Wu et al. |
| 2018/0123117 A9 | 5/2018 | Dai et al. |
| 2018/0215629 A1 | 8/2018 | Honma et al. |
| 2018/0257947 A9 | 9/2018 | Dai et al. |
| 2018/0294522 A1 | 10/2018 | Dai et al. |
| 2018/0331360 A1 | 11/2018 | Meng et al. |
| 2018/0351173 A1 | 12/2018 | Dai et al. |
| 2019/0027747 A9 | 1/2019 | Dai et al. |
| 2019/0067686 A1 | 2/2019 | Dai et al. |
| 2019/0074514 A1 | 3/2019 | Wu et al. |
| 2020/0044242 A1 | 2/2020 | Wang et al. |
| 2020/0058933 A1 | 2/2020 | Wu et al. |
| 2020/0075951 A1 | 3/2020 | Dai et al. |
| 2020/0259208 A1 | 8/2020 | Yamamoto |
| 2020/0266435 A1 | 8/2020 | Dai et al. |

FOREIGN PATENT DOCUMENTS

| | | |
|---|---|---|
| CN | 1770514 | 10/2006 |
| CN | 101083321 | 12/2007 |
| CN | 101088918 | 12/2007 |
| CN | 101150190 | 3/2008 |
| CN | 101223660 | 7/2008 |
| CN | 101284681 | 10/2008 |
| CN | 101304090 | 11/2008 |
| CN | 101510603 | 8/2009 |
| CN | 101694877 | 4/2010 |
| CN | 101734728 | 6/2010 |
| CN | 102110808 | 6/2011 |
| CN | 102195094 A | 9/2011 |
| CN | 102299299 | 12/2011 |
| CN | 102332585 | 1/2012 |
| CN | 102368548 | 3/2012 |
| CN | 101789499 | 4/2012 |
| CN | 102439765 A | 5/2012 |
| CN | 102479947 | 5/2012 |
| CN | 102484249 | 5/2012 |
| CN | 102544575 | 7/2012 |
| CN | 102646831 | 8/2012 |
| CN | 102683666 | 9/2012 |
| CN | 102723459 | 10/2012 |
| CN | 102751481 | 10/2012 |
| CN | 102881891 | 1/2013 |
| CN | 103151520 | 6/2013 |
| CN | 103296249 | 9/2013 |
| CN | 102386381 | 1/2014 |
| CN | 103560250 | 2/2014 |
| CN | 103606674 A | 2/2014 |
| CN | 103682311 | 3/2014 |
| CN | 103872302 | 6/2014 |
| CN | 103872315 | 6/2014 |
| CN | 103972493 | 8/2014 |
| CN | 104022280 | 9/2014 |
| CN | 104201323 A | 12/2014 |
| CN | 104300138 | 1/2015 |
| CN | 104466099 | 3/2015 |
| CN | 104577128 A | 4/2015 |
| CN | 104868122 | 8/2015 |
| CN | 105161710 | 12/2015 |
| CN | 105895909 * | 8/2016 |
| CN | 106450211 | 2/2017 |
| DE | 10352063 | 6/2005 |
| JP | 4-267053 | 9/1992 |
| JP | H-10-087327 | 4/1998 |
| JP | 2001-167763 A | 6/2001 |
| JP | 2001-319652 A | 11/2001 |
| JP | 2002-201028 A | 7/2002 |
| JP | 2004-047180 * | 2/2004 |
| JP | 2005-101003 | 4/2005 |
| JP | 2005-149867 | 6/2005 |
| JP | 2005-289700 | 10/2005 |
| JP | 2006-344509 | 12/2006 |
| JP | 2007-091502 A | 4/2007 |
| JP | 2007-517368 | 6/2007 |
| JP | 2007-173113 A | 7/2007 |
| JP | 2009-4311 | 1/2009 |
| JP | 2009-217981 | 9/2009 |
| JP | 2010-541166 | 12/2010 |
| JP | 2011-105594 A | 6/2011 |
| JP | 2011-113869 | 6/2011 |
| JP | 2013-180917 | 9/2013 |
| JP | 2015-213038 | 11/2015 |
| JP | 2016-517615 A | 6/2016 |
| JP | 2017-191738 | 10/2017 |
| KR | 10-2002-0063501 | 8/2002 |
| KR | 10-2005-0121727 | 12/2005 |
| KR | 10-2014-0073856 | 6/2014 |
| KR | 10-2014-0108615 | 9/2014 |
| KR | 101731473 | 4/2017 |
| TW | 201126798 | 8/2011 |
| TW | 201342695 | 10/2013 |
| WO | WO 2003/049216 A1 | 6/2003 |
| WO | WO 2003/081698 A1 | 10/2003 |
| WO | WO 2004/045015 | 5/2004 |
| WO | WO 2004/102700 A1 | 11/2004 |
| WO | WO 2004/107480 | 12/2004 |
| WO | WO 2008/069351 | 6/2008 |
| WO | WO 2009/120515 | 10/2009 |
| WO | WO 2010/011569 | 1/2010 |
| WO | WO 2010/139404 | 12/2010 |
| WO | WO 2011/020073 | 2/2011 |
| WO | WO 2011/054441 | 5/2011 |
| WO | WO 2013/048048 | 4/2013 |
| WO | WO 2014/014913 | 1/2014 |
| WO | WO 2014/119165 | 8/2014 |
| WO | WO 2016/143572 | 9/2016 |

OTHER PUBLICATIONS

Levasseur et al., "Evidence for structural defects in on-stoichiometric HT-LiCoO2: electrochemical, electronic properties and 7LI NMR studies," *Solid State Ionics*, 128 (2000), pp. 11-24.

Zhao et al., "Progress of Research on the Li-rich Cathode Materials xLI2MnO3(1-x)LIMO2(M+Co, Fe, Ni1/2Mn1/2 . . . ) for Li-ion Batteries," Journal of Inorganic Materials, vol. 26(7), pp. 673-679, Jul. 2011.

Lee et al., "Characteristics of LiCoO2 and Its Precursor Synthesized by a Uniform Precipitation Method," Electrochemical and Solid-State Letters, 2010, vol. 13, No. 7, pp. A81-A84.

Kobayashi et al., "Study on the Crystal and Electronic Structures of the Layered Li2Mo3-LiMo2 Materials in Li De-Intercalation Process," *Photon Factory Activity Report*, 2012, vol. 29, No. 2011, 1 pp.

Giordano et al., "Metal Nitride and Metal Carbide Nanoparticles by a Soft Urea Pathway," *Chem. Mater.*, 2009, vol. 21, pp. 5136-5144.

Dou et al., "Synthesis and electrochemical properties of layered LiNi0.5-xMn0.5-xCo2xO2 for lithium-ion battery from nickel manganese cobalt precursor," *J Solid State Electrochem*, (2011), vol. 15, pp. 399-404.

Li, "Layered Oxides Li1+xM1-xO2 (M= Ni, Mn, Co, Al) as Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI No. 3474185, 158 pages.

Hu et al., "Ni, Mn-Co doped High-Voltage LiCoO2 Cathode Material for Lithium Ion Batteries," Chinese Journal of Inorganic Chemistry, 2015, vol. 31, Issue 1, pp. 159-165.

Rodrigues et al., "A novel coprecipitation method towards the synthesis of NiXMnXCo(1-2X)(OH)2 for the preparation of lithium metal oxides," *J Solid State Electrochem*, 2012, vol. 16, pp. 1121-1132.

Cho et al., "LICoO2 Cathode Material That Does Not Show a Phase Transition from Hexagonal to Monoclinic Phase," 2001, *Journal of The Electrochemical Society*, vol. 148, No. 10, pp. A1110-A1115.

(56) References Cited

OTHER PUBLICATIONS

Jung et al., "Enhanced Stability of LiCoO2 Cathodes in Lithium-Ion Batteries Using Surface Modification by Atomic Layer Deposition," 2010, *Journal of The Electrochemical Society*, vol. 157, No. 1, pp. A75-A81.
Koyama et al., "First principles study of dopant solubility and defect chemistry in Li CoO2," *J. Mater. Chem A.*, 2014, vol. 2, pp. 11235-11245.
Arunkumar et al., "Chemical and structural instability of the chemically delithiated (1-z) Li[Li$_{1/3}$Mn$_{2/3}$]O$_2$ (z) Li[Co$_{1-y}$Ni$_y$]O$_2$ (0 ≤ y ≤ 1 and 0 ≤ z ≤ 1) solid solution cathodes," *Journal of Materials Chemistry*, 2008, vol. 18, pp. 190-198.
Sun et al., "The Role of AlF3 Coatings in Improving Electrochemical Cycling of Li-Enriched Nickel-Manganese Oxide Electrodes for Li-Ion Batteries," *Adv. Mater.*, 2012, vol. 24, pp. 1192-1196.
Robertson et al., "Layered Li$_x$Mn$_{1-y}$Co$_y$O$_2$ Intercalation Electrodes—Influence of Ion Exchange on Capacity and Structure upon Cycling," *Chem. Mater.*, 2001, vol. 13, pp. 2380-2386.
Patoux et al., "Layered Manganese Oxide Intergrowth Electrodes for Rechargeable Lithium Batteries. 2. Substitution with Al," *Chem. Mater.*, 2005, vol. 17, pp. 1044-1054.
Myung et al., "Role of Alumina Coating on Li-Ni-Co-Mn-O Particles as Positive Electrode Material for Lithium-Ion Batteries," *Chem. Mater.*, 2005, vol. 17, pp. 3695-3704.
Wang et al., "Synthesis of Li$_2$MnO$_3$—stabilized LiCoO$_2$ cathode material by spray-drying method and its high voltage performance," *Journal of Alloys and Compounds*, 2015, vol. 626, pp. 228-233.
Zeng et al., "Cation ordering in Li[NixMnxCo(1-2x)]O-2-layered cathode materials: A nuclear magnetic resonance (NMR), pair distribution function, X-ray absorption spectroscopy, and electrochemical study," *Chemistry of Materials*, 2007, vol. 19. No. 25, pp. 6277-6289.
Zeng et al., "Investigation of the Structural Changes in Li[NiyMnyCo(1-2y)]O-2 (y=0.05) upon Electrochemical Lithium Deintercalation," *Chemistry of Materials*, 2010, vol. 22, No. 3, pp. 1209-1219.
Saadoune et al., "LiNi0.1Mn0.1Co0.8O2 electrode material: Structural changes upon lithium electrochemical extraction," *Electrochimica Acta*, 2010, vol. 55, No. 18, pp. 5180-5185.
Bentaleb et al., "On the LiNi0.2Mn0.2Co0.6O2 positive electrode material," *Journal of Power Sources*, 2010, vol. 195, No. 5, pp. 1510-1515.
Ben Kamel et al., "Local Structure and electrochemistry of LiNiyMnyCo1-2y)O2 electrode materials for Li-ion batteries," *Ionics*, 2008, vol. 14, No. 2, pp. 89-97.
Stoyanova et al., "High-Frequency Electron Paramagnetic Resonance Analysis of the Oxidation State and Local Structure of Ni and Mn Ions in Ni, Mn-Codoped LiCoO2," *Inorganic Chemistry*, 2010, vol. 49, No. 4, pp. 1932-1941.
Menetrier et al., "The insulator-metal transition upon lithium deintercalation from LiCoO2: electronic properties and Li-7 NMR Study," *Journal of Materials Chemistry*, 1999, vol. 9, No. 5, pp. 1135-1140.
Iddir et al., "Stability of Li- and Mn-Rich Layered-Oxide Cathodes within the First-Charge Voltage Plateau," *Journal of the Electrochemical Society*, 2016, vol. 163, No. 8, pp. A1784-A1789.
Seong-Min Bak et al, "Structural Changes and Thermal Stability of Charged LiNixMnyCozO2 Cathode Materials Studied by Combined In Situ Time-Resolved XRD and Mass Spectroscopy," *ACS Appl. Mater. Interfaces*, 2014, vol. 6, pp. 22594-22601.
Nam et al. "Ammonia-free coprecipitation synthesis of a Ni-Co-Mn hydroxide precursor for high-performance battery cathode materials," *Green Chemistry*, 2015. vol. 17, pp. 1127.
Xie et al., "An improved continuous co-precipitation method to synthesize LiNi0.80Co0.15Al0.05O2 cathode material," *Journal of Alloys and Compounds*, 2016, vol. 666, pp. 84-87.
Rouse et al., "Electrochemical Studies of Single Crystals of Lithiated Nickel Oxide," *Journal of The Electrochemical Society*, Feb. 1966, vol. 113, No. 2, pp. 184-190.
Jin et al., "Observation of Bulk Superconductivity in Na$_x$CoO$_2$ •yH$_2$O and Na$_x$CoO$_2$•yD$_2$O Powder and Single Crystals," *Phys Rev Lett*, 2008, vol. 91, Issue 21, id. 217001, 4 pages.

Franger et al., "Chemistry and Electrochemistry of Low-Temperature Manganese Oxides as Lithium Intercalation Compounds," *Journal of The Electrochemical Society*, 2000, vol. 147, No. 9, pp. 3226-3230.
Lu et al., "Layered Li[Ni$_x$Co$_{1-2x}$Mn$_x$]O$_2$ Cathode Materials for Lithium-Ion Batteries," *Electrochemical and Solid-State Letters*, 2001, vol. 4, No. 12, pp. A200-A203.
Shinova et al., "Cationic distribution and electrochemical performance of LiCo$_{1/3}$Ni$_{1/3}$Mn$_{1/3}$O$_2$ electrodes for lithium-ion batteries," 2008, *Solid State Ionics*, vol. 179, pp. 2198-2208.
Qian et al., "Lithium Lanthanum Titanium Oxides: A Fast Ionic Conductive Coating for Lithium-Ion Battery Cathodes," *Chemistry of Materials*, 2012, 24 (14), pp. 2744-2751.
Reddy et al., "Effects of LLTO coating on high temperature cycle life performance of LiMn2O4 cathode material," Abstract #382, 2012, The Electrochemical Society, 2 pages.
Davison et al., "Low Cost, Novel Methods for Fabricating All-Solid-State Lithium Ion Batteries," A Major Qualifying Project Submitted to the Faculty of Worcester Polytechnic Institute, Apr. 23, 2012, 126 pages.
Lee et al., "The Effects of Li-La-Ti-O Coating on the Properties of Li[Ni0.3Co0.4Mn0.3]O2 Cathode Material," Journal of the Korean Institute of Electrical and Electronic Material Engineers, Oct. 2009, vol. 22, No. 10, pp. 890-896.
Lee et al., "The Effect of Coating Thickness on the Electrochemical Properties of a Li-La-Ti-O-coated Li[Ni0.3Co0.4Mn0.3]O2 Cathode," Bull. Korean Chem. Soc., 2010, vol. 31, No. 11, pp. 3233-3237.
Hu et al., "Enhanced electrochemical performance of LiMn2O4 cathode with a Li0.34La0.51TiO3-caoted layer," *RSC Advances*, 2015. vol. 5, pp. 17592-17600.
Fergus et al., "Recent Developments in Cathode Materials for Lithium Ion Batteries," *Journal of Power Sources*, Vo. 195, No. 4, 23010, pp. 939-954.
Gille G. et al., "Cathode Materials for Rechargeable Batteries-Preparation, Structure-Property Relationships and Performance," *Solid State Ionics*, Vo. 148, No. 3-4, 2002, pp. 269-282.
Periasamy et al., "High Voltage and High Capacity Characteristics of LiNi1/3Co1/3Mn1/3O2 Cathodes for Lithium Battery Applications," *Int. J. Electrochem Soc.*, vol. 2, 2007, pp. 689-699.
Manthiram Lab Highlights, "Passivation of Spinel Cathode Surface through Self-Segregarion of Iron," May 7, 2010.
Cerion Power, "Our Power Business," www.cerionenterprises.com/companies_and_applications/power, accessed Sep. 8, 2011.
ETV Motors, "High5ive advanced high-voltage cells," www.etvemotors.com/advanced-battery.htm, accessed Sep. 8, 2011.
Wolfenstine et al., US Army RDECOM, "High Cycle Life Cathode for High Voltage (5V) Lithium Ion Batteries.".
Sullivan, "Safe High Voltage Cathode Materials for Pulsed Power Applications," Navy STTR FY2011A—Topic N11A-T035, www.navy.sbir.com/n11_A/navst11-035.htm, accessed Sep. 8, 2011.
Xu, US Army RDECOM, "Electrolyte for Next Generation 5V Li-Ion Batteries.".
Ghosh et al., "Block Copolymer Solid Battery Electrolyte with High Li-Ion Transference Number," *Journal of the Electrochemical Society*, 2010, vol. 157, No. 7, pp. A846-A849.
Abu-Lebdeh et al., High-Voltage Electrolytes Based on Adiponitrile for Li-Ion Batteries, *Journal of the Electrochemical Society*, 2009, vol. 156, No. 1, pp. A60-A65.
Jow et al., "High Voltage Electrolytes for Li-ion Batteries," U.S. Research Laboratory, Presentation, May 2011.
Lucht, University of Rhode Island, "Development of Electrolytes for Lithium-ion Batteries," Presentation, May 11, 2001.
Zhang et al, Argonne National Laboratory, Vehicle Technologies Program Annual Merit Review and Peer Evaluation Meeting, "High Voltage Electrolyte for Lithium Batteries," Presentation, Jun. 9-13, 2011.
David Howell, US Department of Energy, "Vehicle Technologies Program," 2011 Annual Merit Review and Peer Evaluation Meeting, Presentation, May 9-13, 2011.

(56) References Cited

OTHER PUBLICATIONS

Fey et al., Preparation and electrochemical properties of high-voltage cathode maters, LiMyNi0.5-yMn1.5O4 (M= Fe, Cu, Al, Mg; y= 0.0-0.4), *Journal of Power Sources*, 2003, vol. 115, pp. 332-345.

Kawai et al., "High-voltage lithium cathode materials," Journal of Power Sources, 1999, vols. 81-82, abstract only.

Huang et al., "Lithium cobalt phosphate: a high voltage lithium ion cathode material," Valence Technologies.

"Award Details," SBIR/STTR, www.sbir.gov/sbirsearch/detail/233700, accessed Sep. 8, 2011.

Ju et al., "LiCo1-xAlxO2 (0≤x≤0.05) cathode powders prepared from the nanosized Co1-xAlxOy precursor powders," *Materials Chemistry and Physics*, 112 (2008), pp. 536-541.

Wu et al., "Effect of Al3+ and F-Doping on the Irreversible Oxygen Loss from Layered Li[Li0.17Mn0.58Ni0.25]O2 Cathodes," *Electrochemical and Solid-State Letters*, 2007, vol. 10, No. 6, pp. A151-A154.

Li et al., "Effects of fluorine doping on structure, surface chemistry, and electrochemical performance of LiNi0.8Co0.15Al0.05O2," *Electrochimica Acta*, 2015, vol. 174, pp. 1122-1130.

Cho et al., "Exploring Lithium Deficiency in Layered Oxide Cathode for Li-Ion Battery," *Advanced Sustainable Systems*, 2017, 1700026, 10 pages.

Lee et al., "Surface modification of LiNi0.5Mn1.5O4 cathodes with ZnAl2O4 by a sol-gel method for lithium ion batteries," *Electrochimica Acta*, 2014, vol. 115, pp. 326-331.

Kim et al., "Effect of fluorine on Li[Ni1/3Co1/3Mn1/3]O2-zFz as lithium intercalation material," *Journal of Power Sources*, 2005, vol. 146, pp. 602-605.

Yue et al., "The enhanced electrochemical performance of LiNi0.6Co0.2Mn0.2O2 cathode materials by low temperature fluorine substitution," *Electrochimica Acta*, 2013, vol. 95, pp. 112-118.

Wang et al., "Effect of surface fluorine substitution on high voltage electrochemical performances of layered LiNi0.5Co0.2Mn0.3O2 cathode materials," *Applied Surface Science*, 2016, vol. 371, pp. 172-179.

Tang et al., "Synthesis and characterization of LiFePO4 coating with aluminum doped zinc oxide," *Trans. Nonferrous Met. Soc. China*, 2013, vol. 23, pp. 451-455.

Myung et al., "Functionality of Oxide Coating for Li[Li0.05Ni0.4Co0.15Mn0.4])2 as Positive Electrode Materials for Lithium-Ion Secondary Batteries," *J. Phys. Chem. C*, 2007, vol. 111, pp. 4061-4067.

Liu et al., "Investigation the electrochemical performance of Li1.2Ni0.2Mn0.6O2 cathode material with ZnAl2O4 coating for lithium ion batteries," *Journal of Alloys and Compounds*, 2016, vol. 685, pp. 523-532.

Kim et al., "Improvement of High-Voltage Cycling Behavior of Surface-Modified Li[Ni1/3Co1/3Mn1/3]O2 Cathodes by Fluorine Substitution for Li-Ion Batteries," *J. Electrochem. Soc.*, 2005, vol. 152, issue 9, pp. A1707-A1713.

Choi et al., "$^{27}$Al NMR Chemical Shifts in Oxide Crystals: A First-Principles Study," *J. Phys. Chem. C*, 2009, 113 (9), pp. 3869-3873.

Lee et al., "Solid-state NMR Studies of Al-doped and Al2O3-coated LiCoO2," *Electrochimica Acta*, Nov. 30, 2004, vol. 50, Issues 2-3, pp. 491-494.

Han et al., "Understanding the Role of Temperature and Cathode Composition on Interface and Bulk: Optimizing Aluminum Oxide Coatings for Li-Ion Cathodes," *ACS Appl. Mater. Interfaces*, 2017, 9 (17), pp. 14769-14778.

Chen et al., "Role of surface coating on cathode materials for lithium-ion batteries," *Journal of Materials Chemistry*, 2010, 20, 7606-7612.

Wenbin, Luo, "Effect of Al, Mg and Mn-Mg Doping on the Structure, Electrochemistry and Thermal Stability of LiCoO2 and LiNi1/3Mn1/3Co1/3O2," China Doctoral Dissertations Full-text Database Engineering Technology Part II, Nov. 15, 2010. (Translation provided by MultiLing).

Xinran, Cui, "Preparation and Properties of Al(3+) Doped Lithium-rich Layered Cathode Material Li[Co0.3Li0.23Mn0.47]O2," China Doctoral Dissertations Full-text Database Engineering Technology Part II, Oct. 15, 2012. (Translation provided by MultiLing).

\* cited by examiner

SURFACE STABILIZED CATHODE MATERIAL FOR LITHIUM ION BATTERIES AND SYNTHESIZING METHOD OF THE SAME

PRIORITY

This application is a continuation of U.S. patent application Ser. No. 15/710,540, now issued U.S. Pat. No. 10,597,307, entitled "SURFACE STABILIZED CATHODE ACTIVE FOR LITHIUM ION BATTERIES AND SYNTHESIZING METHOD OF THE SAME," filed on Sep. 20, 2017, which claims the benefit under 35 U.S.C. § 119(e) of U.S. Provisional Patent Application No. 62/397,725, entitled "High Energy and Stability from Nickel-Manganese Pairs in Lithium Cobalt Oxide", filed on Sep. 21, 2016, U.S. Provisional Patent Application No. 62/397,730, entitled "Surface Stabilized Cathode Material for Lithium Ion Batteries", filed on Sep. 21, 2016, and U.S. Provisional Patent Application No. 62/524,864, entitled "Surface Stabilized Cathode Material for Lithium Ion Batteries and Synthesizing Method of the Same", filed on Jun. 26, 2017, each of which is incorporated herein by reference in its entirety.

U.S. GOVERNMENT LICENSE RIGHTS

This invention was made with U.S. government support under WFO Proposal No. 85F59. This invention was made under a CRADA 1500801 between Apple Inc. and Argonne National Laboratory operated for the United States Department of Energy. The U.S. government has certain rights in the invention.

FIELD

The described embodiments relate to electrodes for lithium-ion based batteries. In particular embodiments, electrode compositions include lithium cobalt oxide containing nickel and manganese pairs, or other metal pairs, in prescribed proportions for achieving high energy capacity and stable electrodes.

BACKGROUND

Lithium-ion batteries are one of the most popular types of rechargeable batteries used in a number of consumer electronics. Due to their relative high energy density compared to other types of batteries, lithium-ion batteries can be manufactured in small sizes and are therefore widely the used in portable electronic devices. With the increasing capabilities of portable electronic devices, more components and features are included within the portable electronic devices, thereby leaving less room for batteries. Therefore there is a need for higher volumetric energy density electrodes, which can be manufactured in smaller batteries. Furthermore, longer lasting batteries that endure more reversible charge-discharge cycles are desirable. Thus, there is a demand for high-energy lithium-ion batteries with long-term cycle stabilities.

SUMMARY

This disclosure describes various embodiments that relate to lithium cobalt oxide compositions having nickel-manganese pairs or other heterogeneous atomic pairs. The heterogeneous atomic pairs can be metal pairs. The lithium cobalt oxide compositions exhibit high energy and cycle stability.

In a first aspect, a compound is represented by Formula (I):

$$Li_\alpha Co_{(1-x-2y)}Me_x(M1M2)_y O_\delta \qquad \text{(Formula (I))}$$

wherein Me selected from one or more of Li, Mg, Al, Ca, Ti, Zr, V, Cr, Mn, Fe, Ni, Cu, Zn, Ru and Sn;
wherein M1 is a metal having a +2 oxidation state;
wherein M2 is a metal having a +4 oxidation state; and
wherein $0 \leq x \leq 0.3$, $0 < y \leq 0.4$, $0.95 \leq \alpha \leq 1.4$, and $1.90 \leq \delta \leq 2.10$.

According to another aspect, a compound is represented by:

$$Li_\alpha Co_{(1-2y)}(M1M2)_y O_\delta \qquad \text{(Formula (II))}$$

wherein M1 is a metal having a +2 oxidation state;
wherein M2 is a metal having a +4 oxidation state;
wherein M1M2 represents metal pairs; and
wherein $0 < y \leq 0.4$, $0.95 \leq \alpha \leq 1.4$, and $1.90 \leq \delta \leq 2.10$, is described.

According to another aspect, a compound is represented by:

$$Li_\alpha Co_\beta M3_\gamma (M4M5)_\varepsilon O_\delta \qquad \text{(Formula (III))}$$

wherein M3 is one or more manganese, nickel, aluminum, magnesium, titanium, zirconium, calcium, vanadium, chromium, iron, copper, zinc, ruthenium or a combination thereof;
wherein M4 is a metal having a +2 oxidation state;
wherein M5 is a metal having a +4 oxidation state;
wherein M4M5 represents pairs of M4 and M5; and
wherein $0.95 \leq \alpha \leq 1.4$, $0.3 \leq \beta \leq 1.0$, $0 \leq \gamma \leq 0.7$, $0 < \varepsilon \leq 0.4$ and $1.90 \leq \delta \leq 2.10$. In some cases, M4 is one or more of nickel, magnesium, and zinc. In some cases, M5 is one or more of manganese, titanium, zirconium, ruthenium, tin, and vanadium.

According to another aspect, a compound is represented by:

$$Li_\alpha Co_\beta M4M5)_\varepsilon O_\delta \qquad \text{(Formula (IV))}$$

wherein M4 is a metal having a +2 oxidation state;
wherein M5 is a metal having a +4 oxidation state;
wherein M4M5 represents pairs of M4 and M5; and
wherein $0.95 \leq \alpha \leq 1.4$, $0.3 \leq \beta \leq 1.0$, $0 < \varepsilon \leq 0.4$, and $1.90 \leq \delta \leq 2.10$ is described.

According to an additional aspect, a particle is described.
According to an additional aspect, a particle that includes compounds in a single particle is described. In one aspect, the particle comprises compounds selected from:

a) $Li_\alpha Co_b M6_c O_\delta$      Formula (V)

wherein M6 is one or more of manganese (Mn), nickel (Ni), aluminum (Al), magnesium (Mg), titanium (Ti), zirconium (Zr), calcium (Ca), vanadium (V), chromium (Cr), iron (Fe), copper (Cu), zinc (Zn), and ruthenium (Ru); and wherein $0.90 < a \leq 1.1$, wherein $0.5 \leq b \leq 1.0$, wherein $0 < c \leq 0.5$, and wherein $1.90 \leq \delta \leq 2.10$; and (b) $Li_\alpha Co_\beta M3\gamma(M4M5)_\varepsilon O_\delta$,      Formula (III)

wherein M3 is one or more of manganese, nickel, aluminum, magnesium, titanium, zirconium, calcium, vanadium, chromium, iron, copper, zinc, ruthenium,
wherein M4 is a metal having a +2 oxidation state,
wherein M5 is a metal having a +4 oxidation state,
wherein M4M5 represents pairs of M4 and M5, and
wherein $0.95 \leq \alpha \leq 1.4$, $0.3 \leq \beta \leq 1.0$, $0 \leq \gamma \leq 0.7$, $0 < \varepsilon \leq 0.4$, and $1.90 \leq \delta \leq 2.10$.

The particle comprising compounds represented by:

(a) $Li_\alpha Co_{(1-x-2y)} Me_x (M1M2)_y O_\delta$  Formula (I)

wherein Me is one or more of Li, Mg, Al, Ca, Ti, Zr, V, Cr, Mn, Fe, Ni, Cu, Zn, Ru and Sn,
wherein M1 is a metal having a +2 oxidation state;
wherein M2 is a metal having a +4 oxidation state;
wherein M1M2 represents metal pairs; and
wherein $0 \leq x \leq 0.3$, $0 < y \leq 0.4$, $0.95 \leq \alpha \leq 1.4$, and $1.90 \leq \delta \leq 2.10$; and (b) $Li_\alpha Co_\beta M3_\gamma (M4M5)_\epsilon O_\delta$,  Formula (III)

wherein M3 is one or more of manganese, nickel, aluminum, magnesium, titanium, zirconium, calcium, vanadium, chromium, iron, copper, zinc, ruthenium,
wherein M4 is a metal having a +2 oxidation state,
wherein M5 is a metal having a +4 oxidation state,
wherein M4M5 represents pairs of M4 and M5, and
wherein $0.95 \leq \alpha \leq 1.4$, $0.3 \leq \beta \leq 1.0$, $0 \leq \gamma \leq 0.7$, $0 < \epsilon \leq 0.4$, and $1.90 \leq \delta \leq 2.10$.

Alternatively, the particle can include compounds represented by Formula (II) and/or Formula (IV), as described herein. In various aspects, the compounds of Formula (I) and Formula (III) can be different.

The particle includes a core and a coating disposed on the core. The core can be any cathode active material known in the art. In some variations, the core can be a compound of Formula (V), Formula (I), or Formula (II). Further, the coating can be a compound of Formula (III) or Formula (IV).

According to another embodiment, a cathode for a lithium-ion battery is described. The cathode includes a composition, or combination of compositions, described above.

According to a further embodiment, a method of synthesizing a lithium-oxide cathode active material for a lithium-ion battery is described. The method includes reacting a metal solution with a chelate agent and a base solution at an alkaline pH to form a particulate solution through a coprecipitation process; washing, filtering and drying the particulate solution to collect hydroxide precursor particles; blending the collected particles with a lithium salt; and reacting the blended particles at a first elevated temperature to produce base particles.

These and other aspects of the disclosure will be described in detail below and it is to be understood that both the foregoing general description and the following detailed description are exemplary and explanatory and are intended to provide further explanation of the disclosure as claimed.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
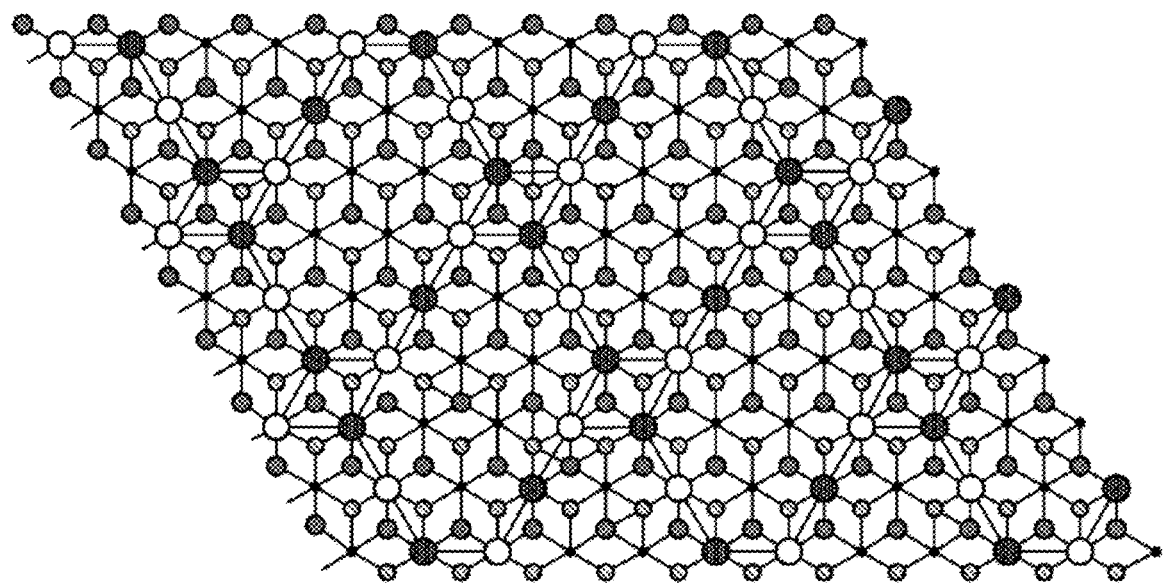
FIG. 1 shows a crystal structure model of a cobalt oxide portion of a lithium cobalt oxide composition, according to an illustrative embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Lithium cobalt oxide compositions suitable for use in lithium-ion battery cells are described. In some embodiments, the lithium cobalt oxide compositions are doped with pairs of metals. The first metal has a +2 oxidation state (e.g., Ni), and the second metal has a +4 oxidation state (e.g., Mn). The first and second metals form pairs within a base cobalt oxide lattice structure. Without being limited to a particular mechanism or mode of action, the pairs can form a lower energy and more stable lattice configuration. In this way, the metal pairs (e.g., Ni—Mn pairs) can provide lithium-ion electrodes that are less susceptible to structural degradation after numerous charge and discharge cycles compared to lithium cobalt oxide compositions without metal pairs. The metal pairs are also associated with a stable cathode interface with electrolyte, thereby providing better surface stability at high charge voltage compared to battery cells with lithium cobalt oxide electrode compositions without metal pairs. In some embodiments, the lithium cobalt oxide compositions include heterogeneous atomic pairs other than nickel and manganese, and that can also be associated with high energy capacity battery cells.

Lithium cobalt oxide compositions described herein can be characterized by any suitable technique, including Raman spectroscopy, and nuclear magnetic resonance (NMR). Charge and discharge cycling of a battery cell having lithium cobalt oxide compositions with metal pairs indicate a better capacity retention over numerous cycles compared to a battery cell having the lithium cobalt oxide compositions without metal pairs.

In some embodiments, lithium cobalt oxide compositions having heterogeneous atomic pairs are in the form of a coating that covers a core particle material. The core can be composed of a lithium cobalt oxide composition without heterogeneous atomic pairs, or can be composed of other suitable cathode material. The combination of core and coating materials can provide a surface-stable high energy cathode.

In other embodiments, the particle can be a combination of compounds (e.g., by a sintered core and coating). A first compound can be composed of any suitable material for a cathode active material known in the art. The first compound can be composed of a lithium cobalt oxide composition without heterogeneous atomic pairs, or can be composed of other suitable cathode material. In some embodiments, the first compound can be represented by the formula $LiTM_{1-x}Me_xO_2$ wherein TM is Co, Mn or Ni; Me is Li, Mg, Al, Ti, Zr, Ca, V, Cr, Fe, Cu, Zn or Ru. In other embodiments, the first compound can be represented by the formula $LiMn_{2-x}Me_xO_4$, wherein Me is Li, Ni, Co, Mg, Al, Ti, Zr, Ca, V, Cr, Fe, Cu, Zn or Ru. In further embodiments, the first compound can be represented by the formula $LiTM_{1-x}Me_xPO_4$, wherein TM is Co, Mn, Ni or Fe; Me is Li, Mg, Al, Ti, Zr, Ca, V, Cr, Fe, Cu, Zn or Ru. In additional embodiments, the first compound can be represented by the formula $Li_2MO_3*LiTM_{1-x}Me_xO_2$, wherein M is Mn, Ru, Ti or Zr, TM is Co, Mn or Ni, Me is Li, Mg, Al, Ti, Zr, Ca, V, Cr, Fe, Cu, Zn or Ru. In still further, first compound can be a compound of Formula (I) or Formula (II), as described herein. The second compound can be a compound of Formula (III) or Formula (IV), as described herein. The combination of the two materials in the particles can provide a surface-stable high energy cathode.

The particles can also be coated with a dielectric material to protect the lithium cobalt oxide material from chemical agents within the battery electrolyte that can degrade the lithium cobalt oxide material.

The lithium cobalt oxide compositions described herein are well suited for use in electrodes of lithium-ion batteries for any of a number of suitable consumer electronic products. For example, the lithium cobalt oxide compositions described herein can be used in batteries for computers, portable electronic devices, wearable electronic devices, and electronic device accessories, such as those manufactured by Apple Inc., based in Cupertino, Calif.

These and other embodiments are discussed below with reference to FIGS. 1-30. However, those skilled in the art will readily appreciate that the detailed description given herein with respect to these Figures is for explanatory purposes only and should not be construed as limiting.

Materials described herein are based on lithium cobalt oxide compositions and are suitable for application in positive electrodes of lithium-ion based batteries. In some embodiments, the lithium cobalt oxide compositions can be represented by:

$$Li_\alpha Co_{(1-x-2y)}Me_x(M1M2)_yO_\delta \qquad \text{(Formula (I))}$$

where Me is one or more of lithium (Li), magnesium (Mg), aluminum (Al), calcium (Ca), titanium (Ti), zirconia (Zr), vanadium (V), chromium (Cr), manganese (Mn), iron (Fe), nickel (Ni), copper (Cu), zinc (Zn), ruthenium (Ru) and tin (Sn); and where $0 \leq x \leq 0.3$, $0 \leq y \leq 0.4$, $0.95 \leq \alpha \leq 1.4$, and $1.90 \leq \delta \leq 2.10$. Note that Me can be a single element or combination of elements. In some cases, Me includes a suitable transition metal. M1M2 represents pairs of M1 and M2. In some cases, M1 is nickel and M2 is manganese.

In the case where x is zero, the lithium cobalt oxide composition can be represented by:

$$Li_\alpha Co_{(1-2y)}(M1M2)_yO_\delta \qquad \text{(Formula (II))}$$

wherein M1 and M2 are described as above.

The lithium cobalt oxide compositions in accordance with Formulae (I) and (II) can be used as positive electrodes (cathodes) within lithium-ion battery cells. The lithium cobalt oxide compositions include the substitution of some cobalt (Co) with a pair of first and second metals (which can be referred to as "metal pairs"). The first metal has a +2 oxidation state, and the second metal has a +4 oxidation state. The first metal can be nickel, and the second metal can be manganese, which form nickel-manganese pairs (which can be referred to as "Ni—Mn pairs"). Metal pairs (e.g., Ni—Mn pairs) are short-range pairing of the first and second metal within the crystal structure of the lithium cobalt oxide compositions. Without wishing to be limited to a particular embodiment or mode of action, the metal pairs are associated with more stable oxide compositions compared to oxide compositions without the metal pairs, thereby providing a more robust framework for Li intercalation and deintercalation and better cycle life lithium-ion battery cells, which will be described below in detail.

In some embodiments, the lithium cobalt oxide compositions include atomic pairs of metals other than nickel and manganese. For example, in some embodiments, one of the atomic pairs is a transition metal having a +4 oxidation state and the other is an element having a +2 oxidation state. These atomic pairs include different elements, and thus can be referred to as heterogeneous atomic pairs. For instance, in addition to or instead of Ni—Mn pairs, the lithium cobalt oxide compositions can include one or more of nickel and titanium (Ni—Ti) pairs, magnesium and titanium (Mg—Ti) pairs, magnesium and manganese (Mg—Mn) pairs, nickel and zirconium (Ni—Zr) pairs, magnesium and zirconium (Mg—Zr) pairs, etc. In some embodiments, the lithium cobalt oxide compositions include more than one type of atomic metal pairs. For example, a lithium cobalt oxide composition can include Ni—Mn pairs as well as one or more of Ni—Ti pairs, Mg—Mn pairs, Mg—Ti pairs, Ni—Zr pairs, Mg—Zr pairs, Ni—V pairs, Mg—V pairs, etc. That is, the lithium cobalt oxide compositions can include any suitable combination of +4 transition metal-containing pairs.

In some embodiments, x is 0. In some embodiments of Formula (I), $0<x\leq0.3$. In some embodiments of Formula (I), x is greater than or equal to 0.1. In some embodiments of Formula (I), x is greater than or equal to 0.2. In some embodiments of Formula (I), x is less than or equal to 0.3. In some embodiments of Formula (I), x is less than or equal to 0.2.

In some embodiments of Formula (I), y is greater than or equal to 0.1. In some embodiments of Formula (I), y is greater than or equal to 0.2. In some embodiments of Formula (I), y is greater than or equal to 0.3. In some embodiments of Formula (I), y is less than or equal to 0.4. In some embodiments of Formula (I), y is less than or equal to 0.3. In some embodiments of Formula (I), y is less than or equal to 0.2. In some embodiments of Formula (I), y is less than or equal to 0.1. In some embodiments, $0.20\leq y\leq0.25$. In some embodiments, $0.02\leq y\leq0.06$. In some embodiments, $0.05\leq y\leq0.09$. In some embodiments, $0.08\leq y\leq0.12$. In some embodiments, $0.14\leq y\leq0.18$. In some embodiment, $0.20\leq y\leq0.25$.

In some embodiments of Formula (I), α is greater than or equal to 0.95. In some embodiments of Formula (I), α is greater than or equal to 0.98. In some embodiments of Formula (I), α is greater than or equal to 1.0. In some embodiments of Formula (I), α is greater than or equal to 1.1. In some embodiments of Formula (I), α is greater than or equal to 1.2. In some embodiments of Formula (I), α is less than or equal to 1.4. In some embodiments of Formula (I), α is less than or equal to 1.3. In some embodiments of Formula (I), α is less than or equal to 1.2. In some embodiments of Formula (I), α is less than or equal to 1.1. In some embodiments of Formula (I), α is less than or equal to 1.2. In some embodiments of Formula (I), α is less than or equal to 1.1. In some embodiments of Formula (I), α is less than or equal to 1.0. In some embodiments of Formula (I), α is less than or equal to 0.99. In some embodiments of Formula (I), α is less than or equal to 0.98. In some embodiments of Formula (I), α is less than or equal to 0.97. In some embodiments of Formula (I), α is less than or equal to 0.96.

It will be understood that substituent quantities can be in any combination, as described herein.

In some embodiments, the lithium cobalt oxide compositions can be represented by:

$$Li_\alpha Co_\beta M3\gamma(M4M5)_\epsilon O_\delta \qquad \text{(Formula (III))}$$

where M3 is one or more of manganese (Mn), nickel (Ni), aluminum (Al), magnesium (Mg), titanium (Ti), zirconium (Zr), calcium (Ca), vanadium (V), chromium (Cr), iron (Fe), copper (Cu), zinc (Zn), and ruthenium (Ru); where M4 is a metal having a +2 oxidation state; where M5 is a metal having a +4 oxidation state; and where $0.9\leq\alpha\leq1.4$, $0.3\leq\beta\leq1.0$, $0\leq\gamma\leq0.7$, $0<\epsilon\leq0.4$, and $1.90\leq\delta\leq2.10$.

In particular embodiments, M4 is one or more of nickel (Ni), magnesium (Mg), and zinc (Zn); and M5 is one or more of manganese (Mn), titanium (Ti), zirconium (Zr), and vanadium (V).

In some embodiments, γ is 0. In some embodiments of Formula (III), $0<\gamma\leq0.3$. In some embodiments of Formula (III), γ is greater than or equal to 0.1. In some embodiments of Formula (III), γ is greater than or equal to 0.2. In some embodiments of Formula (III), γ is less than or equal to 0.3. In some embodiments of Formula (III), γ is less than or equal to 0.2.

In some embodiments of Formula (III), ε is greater than or equal to 0.1. In some embodiments of Formula (III), ε is greater than or equal to 0.2. In some embodiments of Formula (III), ε is greater than or equal to 0.3. In some embodiments of Formula (III), ε is less than or equal to 0.4. In some embodiments of Formula (III), ε is less than or equal to 0.3. In some embodiments of Formula (III), ε is less than or equal to 0.2. In some embodiments of Formula (III), ε is less than or equal to 0.1. In some embodiments, $0.20\leq\epsilon\leq0.25$. In some embodiments, $0.02\leq\epsilon\leq0.06$. In some embodiments, $0.05\leq\epsilon\leq0.09$. In some embodiments, $0.08\leq\epsilon\leq0.12$. In some embodiments, $0.14\leq\epsilon\leq0.18$. In some embodiment, $0.20\leq\epsilon\leq0.25$.

In some embodiments of Formula (III), α is greater than or equal to 0.95. In some embodiments of Formula (III), α is greater than or equal to 0.98. In some embodiments of Formula (III), α is greater than or equal to 1.0. In some embodiments of Formula (III), α is greater than or equal to 1.1. In some embodiments of Formula (III), α is greater than or equal to 1.2. In some embodiments of Formula (III), α is less than or equal to 1.4. In some embodiments of Formula (III), α is less than or equal to 1.3. In some embodiments of Formula (III), α is less than or equal to 1.2. In some embodiments of Formula (III), α is less than or equal to 1.1. In some embodiments of Formula (III), α is less than or equal to 1.2. In some embodiments of Formula (III), α is less than or equal to 1.1. In some embodiments of Formula (III), α is less than or equal to 1.0. In some embodiments of Formula (III), α is less than or equal to 0.99. In some embodiments of Formula (III), α is less than or equal to 0.98. In some embodiments of Formula (III), α is less than or equal to 0.97. In some embodiments of Formula (III), α is less than or equal to 0.96.

In some embodiments of Formula (III), β is greater than or equal to 0.3. In some embodiments of Formula (III), β is greater than or equal to 0.5. In some embodiments of Formula (III), β is greater than or equal to 0.7. In some embodiments of Formula (III), β is greater than or equal to 0.9. In some embodiments of Formula (III), β is less than or equal to 1.0. In some embodiments of Formula (III), β is less than or equal to 0.8. In some embodiments of Formula (III), β is less than or equal to 0.6. In some embodiments of Formula (III), β is less than or equal to 0.4.

It will be understood that any substituent quantities in any Formula can be in any combination, as described herein.

In another embodiment, the lithium cobalt oxide particles can include a combination of compounds of Formula (V) and Formula (III) as follows:

(a) $Li_aCo_bM6_cO_\delta$ (Formula (V))

where M6 is one or more of manganese (Mn), nickel (Ni), aluminum (Al), magnesium (Mg), titanium (Ti), zirconium (Zr), calcium (Ca), vanadium (V), chromium (Cr), iron (Fe), copper (Cu), zinc (Zn), and ruthenium (Ru); and where $0.90 \leq a \leq 1.1$, $0.5 \leq b \leq 1.0$, $0 < c \leq 0.5$, $1.90 \leq \delta \leq 2.10$; and (b) $Li_\alpha Co_\beta M3_\gamma (M4M5)_\varepsilon O_\delta$ (Formula (III))

wherein M3 is one or more of manganese, nickel, aluminum, magnesium, titanium, zirconium, calcium, vanadium, chromium, iron, copper, zinc, ruthenium,
wherein M4 is a metal having a +2 oxidation state,
wherein M5 is a metal having a +4 oxidation state,
wherein M4M5 represents pairs of M4 and M5, and
wherein $0.95 \leq \alpha \leq 1.4$, $0.3 \leq \beta \leq 1.0$, $0 \leq \gamma \leq 0.7$, $0 < \varepsilon \leq 0.4$, and $1.90 \leq \delta \leq 2.10$.

In some instances, M6 can be the combination of i) Mn, Ni, or the combination of Mn and Ni, and ii) Al as a dopant.

In some embodiments, Formula (V) is a layered hexagonal rock-salt structure represented as $LiTM_1-xMexM7O_2$; where TM is Co, Mn or Ni; Me is Li, Mg, Al, Ti, Zr, Ca, V, Cr, Fe, Cu, Zn or Ru. In some cases, the core has a spinel cubic structure represented as $LiMn_2-xMexO_4$; where Me is Li, Ni, Co, Mg, Al, Ti, Zr, Ca, V, Cr, Fe, Cu, Zn or Ru. In some embodiments, the core has an olivine structure represented as $LiTM_1-xMexPO_4$; where TM is Co, Mn, Ni or Fe; Me is Li, Mg, Al, Ti, Zr, Ca, V, Cr, Fe, Cu, Zn or Ru. In some embodiments, the core is a layered-layered material such as represented by $Li_2MO_3*LiTM1-xMexO_2$; where M is Mn, Ru, Ti or Zr; TM is Co, Mn or Ni; Me is Li, Mg, Al, Ti, Zr, Ca, V, Cr, Fe, Cu, Zn or Ru.

A concentration of compound (b) $Li_\alpha Co_\beta (M4M5)_\varepsilon O_\delta$ can be gradually increased or decreased in the compound (a) $Li_aCo_bM6_cO_\delta$ Formula (V) from a localized position to surrounding directions. Further, the composition may include a dielectric coating on the compound (b) $Li_\alpha Co_\beta M1_\gamma (M4M5)_\varepsilon O_\delta$.

In another embodiment, the lithium cobalt oxide particles can include a combination of compounds of Formula (I) and Formula (III) as follows:

(a) $Li_\alpha Co_{(1-x-2y)}Me_x(M1M2)_yO_\delta$ (Formula (I))

wherein Me is one or more of Li, Mg, Al, Ca, Ti, Zr, V, Cr, Mn, Fe, Ni, Cu, Zn, Ru and Sn, and wherein $0 \leq x \leq 0.3$, $0 < y \leq 0.4$, $0.95 \leq \alpha \leq 1.4$, and $1.90 \leq \delta \leq 2.10$; and (b) $Li_\alpha Co_\beta M3_\gamma (M4M5)_\varepsilon O_\delta$ (Formula (III))

wherein M3 is one or more of manganese, nickel, aluminum, magnesium, titanium, zirconium, calcium, vanadium, chromium, iron, copper, zinc, ruthenium,
wherein M4 is a metal having a +2 oxidation state,
wherein M5 is a metal having a +4 oxidation state,
wherein M4M5 represents pairs of M4 and M5, and
wherein $0.95 \leq \alpha \leq 1.4$, $0.3 \leq \beta \leq 1.0$, $0 \leq \gamma \leq 0.7$, $0 \leq \varepsilon \leq 0.4$, and $1.90 \leq \delta \leq 2.10$.

M1M2 represents pairs of M1 and M2. M1 can be nickel and M2 can be manganese. M1 can be one or more of nickel, magnesium, and zinc. M2 can be one or more of manganese, titanium, zirconium, and vanadium. The particle has an energy density higher at an interior of the particle than at a surface of the particle and has energy retentive properties higher at a surface of the particle than at an interior of the particle.

A concentration of compound (b) $Li_\alpha Co_\beta M1_\gamma (M4M5)_\varepsilon O_\delta$ can be gradually increased or decreased in the compound (a) $Li_\alpha Co_{(1-x-2y)}Me_x(M1M2)_yO_\delta$ from a localized position to surrounding directions. Also, the composition may include a dielectric coating on the compound (b) $Li_\alpha Co_\beta M1_\gamma (M4-M5)_\varepsilon O_\delta$.

In another embodiment, the lithium cobalt oxide compositions can be represented by a combination of Formula (II) and Formula (IV) as follows:

(a) $Li_\alpha Co_{(1-2y)}(M1M2)_yO_\delta$ (Formula (II))

wherein $0 < y \leq 0.4$, $0.95 \leq \alpha \leq 1.4$, $1.90 \leq \delta \leq 2.10$, and wherein M1M2 represents nickel-manganese pairs; and (b) $Li_\alpha Co_\beta (M4M5)_\varepsilon O_\delta$ (Formula (IV))

wherein M4 is a metal having a +2 oxidation state,
wherein M5 is a metal having a +4 oxidation state,
wherein M4M5 represents pairs of M3 and M4, and
wherein $0.95 \leq \alpha \leq 1.4$, $0.3 \leq \beta \leq 1.0$, $0 < \varepsilon \leq 0.4$ and $1.90 \leq \delta \leq 2.10$.

In some variations, M4 can be one or more of nickel, magnesium, and zinc. In some variations, M5 can be one or more of manganese, titanium, zirconium, and vanadium. The particle including the compounds of Formula (I) and Formula (III) can have an energy density higher at an interior of the particle than at a surface of the particle and has energy retentive properties higher at a surface of the particle than at an interior of the particle. A concentration of compound (b) $Li_\alpha Co_\beta M1_\gamma (M4M5)_\varepsilon O_\delta$ (Formula (III)) can be gradually increased or decreased in the compound (a) $Li_\alpha Co_{(1-x-2y)}Me_x(M1M2)_yO_\delta$ (Formula (I)) from a localized position to surrounding directions. Also, a dielectric coating may be disposed on the particle.

In other variations, this Formula (V) can be represented as represented by Formula (VIa) or Formula (VIb).

Formula (VIa) is represented by the following formula:

$(v)[M^7O_2] \cdot (1-v)[Co_{1-\sigma}M^8O_2]$ (Formula VIa)

wherein $M^7$ is one or more elements with an average oxidation state of 4+ (i.e., tetravalent); $M^8$ is one or more monovalent, divalent, trivalent, and tetravalent elements; $0.01 \leq v < 1.00$, and $0 \leq \sigma \leq 0.05$. In some variations, $M^7$ is selected from Mn, Ti, Zr, Ru, and a combination thereof. In some variations, $M^8$ is selected from B, Na, Mg, Ti, Ca, V, Cr, Mn, Fe, Co, Ni, Cu, Zn, Al, Sc, Y, Ga, Zr, Ru, Mo and a combination thereof. In some variations, $M^7$ is Mn. In some variations, $M^8$ is Al.

In some embodiments, $0.01 \leq v \leq 0.50$. In some embodiments, $0.01 \leq v \leq 0.50$. In some embodiments, $0.01 \leq v \leq 0.30$. In some embodiments, $0.01 \leq v < 0.10$. In some embodiments, $0.01 \leq v < 0.05$. In some variations, $0 < \sigma \leq 0.05$. In some variations, $0 < \sigma \leq 0.03$. In some variations, $0 < \sigma \leq 0.02$. In some variations, $0 < \sigma \leq 0.01$. In some variations, $0.01 \leq v < 0.05$, and $0 < \sigma \leq 0.05$.

In some variations, Al is at least 500 ppm. In some variations, Al is at least 750 ppm. In some variations, Al is at least 900 ppm. In some variations, Al is less than or equal to 2000 ppm. In some variations, Al is less than or equal to 1500 ppm. In some variations, Al is less than or equal to 1250 ppm. In some variations, Al is less than or equal to 1000 ppm. In some variations, Al is less than or equal to 900 ppm. In some variations, Al is less than or equal to 800 ppm. In some variations, Al is less than or equal to 700 ppm. In some variations, Al is less than or equal to 600 ppm. In some instances, when $M^8$ (e.g., Al) is expressed in ppm, in optional variations, the compound can be represented as $(v)[Li_2M^7O_3] \cdot (1-v)[Li_\alpha Co_w O_2]$ and the amount of $M^8$ can be represented as $M^8$ in at least a quantity in ppm, as otherwise described above. In some embodiments, $0.5 \leq w \leq 1$. In some embodiments, $0.8 \leq w \leq 1$. In some embodiments, $0.96 \leq w \leq 1$. In some embodiments, $0.99 \leq w \leq 1$. In some embodiments, w is 1.

Formula (VIb) is represented by the following formula:

$(v)[Li_2M^7O_3] \cdot (1-v)[Li_\alpha Co_{1-\sigma}M^8_\sigma O_2]$ (Formula VIb)

wherein $M^7$ is one or more elements with an average oxidation state of 4+ (i.e., tetravalent); $M^8$ is one or more monovalent, divalent, trivalent, and tetravalent elements; $0.95 \leq \alpha \leq 0.99$; $0.01 \leq v < 1.00$, and $0.5 \leq w \leq 1$, and $0 \leq \sigma \leq 0.05$. In some variations, $M^7$ is selected from Mn, Ti, Zr, Ru, and a combination thereof. In some variations, $M^8$ is selected from B, Na, Mg, Ti, Ca, V, Cr, Mn, Fe, Co, Ni, Cu, Zn, Al, Sc, Y, Ga, Zr, Ru, Mo and a combination thereof. In some variations, $M^7$ is Mn. In some variations, $M^8$ is Al.

In some embodiments, $0.01 \leq v \leq 0.50$. In some embodiments, $0.01 \leq v < 0.50$. In some embodiments, $0.01 \leq v \leq 0.30$. In some embodiments, $0.01 \leq v < 0.10$. In some embodiments, $0.01 \leq v < 0.05$. In some variations, $0 < \sigma \leq 0.05$. In some variations, $0 < \sigma \leq 0.03$. In some variations, $0 < \sigma \leq 0.02$. In some variations, $0 < \sigma \leq 0.01$. In some variations, $0.95 \leq \sigma < 0.99$, $0.01 \leq v < 0.05$, $0.96 \leq w < 1$, and $0 < \sigma \leq 0.05$.

In some variations, $M^8$ (e.g., Al) is at least 500 ppm. In some variations, $M^8$ (e.g., Al) is at least 750 ppm. In some variations, $M^8$ (e.g., Al) is at least 900 ppm. In some variations, $M^8$ (e.g., Al) is less than or equal to 2000 ppm. In some variations, $M^8$ (e.g., Al) is less than or equal to 1500 ppm. In some variations, $M^8$ (e.g., Al) is less than or equal to 1250 ppm. In some variations, $M^8$ (e.g., Al) is less than or equal to 1000 ppm. In some variations, $M^8$ (e.g., Al) is less than or equal to 900 ppm. In some variations, $M^8$ (e.g., Al) is less than or equal to 800 ppm. In some variations, $M^8$ (e.g., Al) is less than or equal to 700 ppm. In some variations, $M^8$ (e.g., Al) is less than or equal to 600 ppm. In some instances, when $M^8$ (e.g., Al) is expressed in ppm, the compound can be represented as $(v)[Li_2M^7O_3] \cdot (1-v)[Li_\alpha Co_w O_2]$ and the amount of $M^8$ can be represented as $M^8$ in at least a quantity in ppm, as otherwise described above. In some variations, $0.5 \leq w \leq 1$. In some variations, $0.8 \leq w \leq 1$. In some variations, $0.96 \leq w \leq 1$. In some variations, $0.99 \leq w \leq 1$. In some variations, w is 1.

It will be understood that the substituents in Formulae (II) can be in any variation as described for Formula (I), and the substituents for Formula (IV) can be in any variation as described for Formula (III).

In some embodiments, the compositions in accordance with Formulae I-IV are cobalt-rich, meaning that the atomic percentage of cobalt is larger than the atomic percentages of the first and second metal. It should be noted, however, that the embodiments described herein are not limited to cobalt-rich compositions. As indicated by Formulae I and II, the amount of metal pairs within the lithium cobalt oxide compositions can vary in accordance with y—which can be associated with variables x, α and δ.

In addition to the metal pairs (e.g., Ni—Mn pairs), the lithium content within the lithium cobalt oxide compositions can be controlled. In some embodiments, α is less than 1—in which case the lithium cobalt oxide composition can be referred to as lithium-deficient since the composition has relatively less lithium than cobalt and Me and/or metal pairs. That is, the lithium cobalt oxide composition has less than the nominal stoichiometric amount of lithium. In other embodiments, a is greater than 1—in which case the lithium cobalt oxide composition can be referred to as lithium-rich since the composition has relatively more lithium than cobalt and Me and/or metal pairs. That is, the lithium cobalt oxide composition has greater than the nominal stoichiometric amount of lithium.

With regard to oxygen, in accordance with Formulae (I)—(V), the amount of oxygen can be greater or less than a nominal stoichiometric amount of oxygen. That is, in some embodiments, δ is greater or less than two. This variance of δ from 2 can compensate for a charge deficiency within the lithium cobalt oxide composition due to variations in one or more of the other elements: x, y and α, in Formula (I), y and α in Formula (II), α, β, γ, and ε in Formula (III), and α, β, and ε in Formula (IV). In particular, δ can be greater or less than 2 in order to create a charge-neutral lithium cobalt oxide composition.

Stable atomic configurations of lithium cobalt oxide compositions in accordance with Formulae (I) or (II) can be calculated using, for example, density functional theory (DFT) calculations. Table 1 below shows DFT energy calculations performed on several atomic configurations having about 4 atomic % nickel and about 4 atomic % manganese (referred to herein as "NM44"). Table 1 shows calculated energy, relative energy, relative energy per formula unit, and probabilities of Ni—Mn pairs, Mn—Mn pairs, and Ni—Ni pairs for 15 different configurations.

TABLE 1

| Configuration | E (eV) | Relative E (eV) | Relative E (meV)/ formula unit | Ni—Mn pairs | Mn—Mn pairs | Ni—Ni pairs |
|---|---|---|---|---|---|---|
| c1 | −1791.3512 | 0.557253 | 7.7 | 6 | 3 | 3 |
| c2 | −1791.7716 | 0.136899 | 1.9 | 8 | 2 | 2 |
| c3 | −1790.8628 | 1.045661 | 14.5 | 4 | 3 | 3 |
| c4 | −1791.1392 | 0.769254 | 10.7 | 4 | 3 | 3 |
| c5c | −1791.2836 | 0.624940 | 8.7 | 6 | 3 | 1 |
| c6 | −1791.6337 | 0.274809 | 3.8 | 6 | 1 | 3 |
| c7 | −1791.8346 | 0.073948 | 1.0 | 7 | 0 | 0 |
| c8 | −1791.7485 | 0.160006 | 2.2 | 6 | 0 | 0 |
| c9 | −1791.8638 | 0.044662 | 0.6 | 7 | 0 | 0 |
| c10 | −1791.7407 | 0.167785 | 2.3 | 7 | 1 | 1 |
| c11 | −1791.9085 | 0.000000 | 0.0 | 8 | 1 | 0 |
| c12 | −1791.1349 | 0.773651 | 10.7 | | | |
| c13 | −1791.2917 | 0.616757 | 8.6 | 4 | 1 | 1 |
| c14 | −1791.1372 | 0.771294 | 10.7 | | | |
| c5 | −1791.1107 | 0.797835 | 11.1 | 4 | 1 | 1 |

Table 1 indicates that of the several possible structural model configurations considered, c11 shows the lowest relative energy with 8 Ni—Mn pairs, 1 Mn—Mn pair and 0 Ni—Ni pairs. The second and third lowest relative energy configurations are c7 and c9, both of which have 7 Ni—Mn pairs, 0 Mn—Mn pairs and 0 Ni—Ni pairs. This indicates that the configurations having the most Ni—Mn pairs relative to Mn—Mn pairs and 0 Ni—Ni pairs can be associated with a low energy configuration—that is, are calculated to be the most stable.

FIG. 1 illustrates a crystal structure model of the configuration c11. The crystal structure model in FIG. 1 shows nickel, manganese, cobalt, Me and oxygen atoms arranged in a trigonal crystal structure (R-3m), sometimes referred to as a rhombohedral lattice structure. It should be noted that FIG. 1 shows a crystal structure model of a cobalt oxide portion of the lithium cobalt oxide composition and lithium is not shown since lithium ions are transported between the cathode and anode of the lithium-ion battery cell. In particular, the cathode material is composed of layers of cobalt oxide structure doped with nickel and manganese (and in some cases Me), with layers of mobile lithium in between the doped cobalt oxide layers. During discharging, lithium ions in the battery cell move from the cathode via an electrolyte to the anode, thereby allowing electrons to flow as electric current. During charging, the lithium ions move from the anode via the electrolyte to the cathode.

FIG. 1 illustrates that when nickel and manganese are added to cobalt oxide layers, the nickel and manganese form a short-range order distribution. For example, the Ni and Mn atoms can be attracted to each other and form a chemical bond, thereby resulting in NiMn pairs within the $LiCoO_2$ crystal structure. That is, nickel and manganese are not randomly distributed within the crystal structure, but rather ordered in Ni—Mn pairs. In particular, the Ni—Mn pairs are predicted to reside within a sub-lattice of the $LiCoO_2$ crystal structure, as shown in FIG. 1. It is believed that these Ni—Mn pairs provide a short-range order that results in a lower energy and more stable structure compared to a $LiCoO_2$ structure without Ni—Mn pairs.

Figure 2:
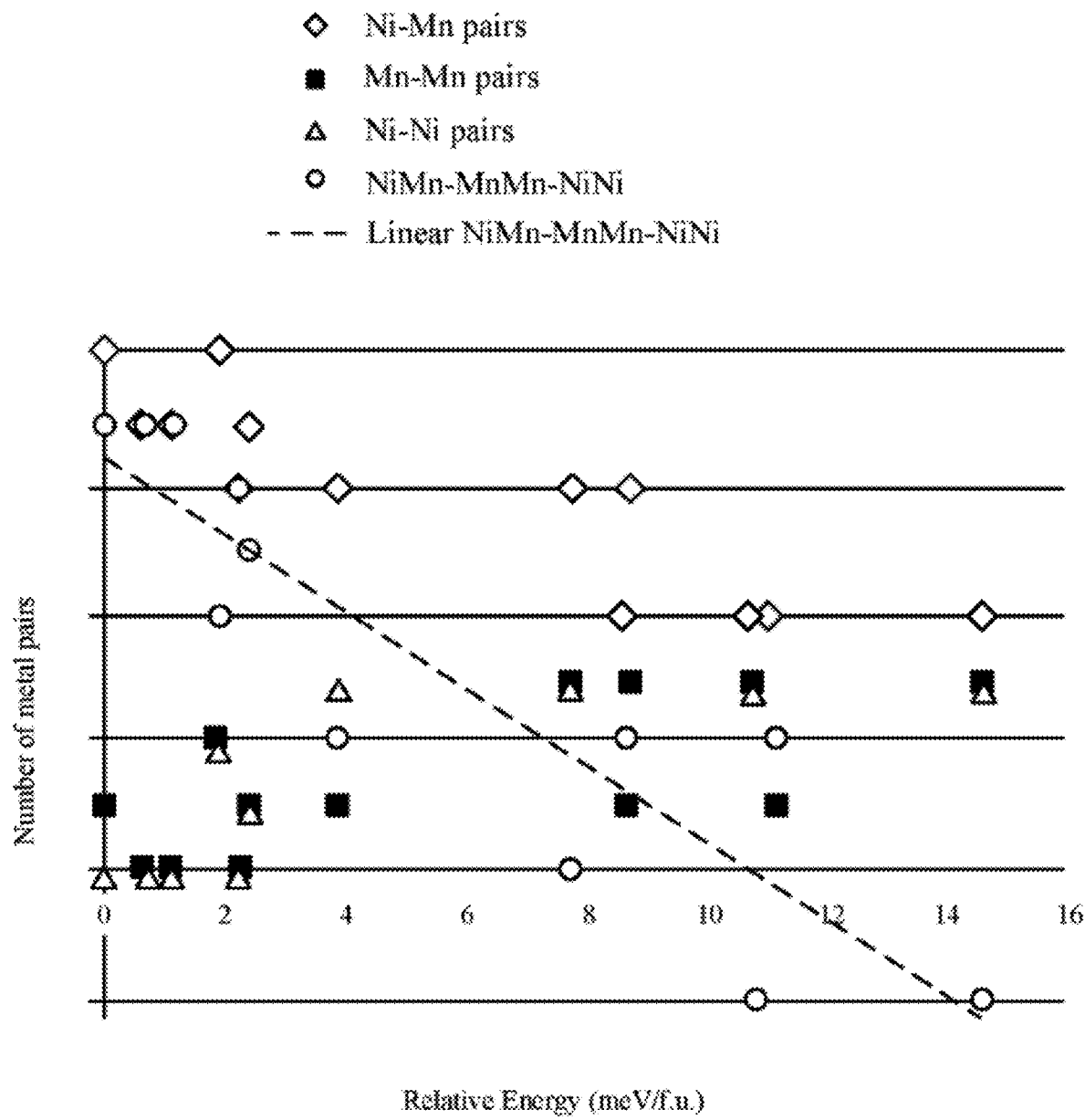
FIG. 2 shows a graph illustrating a relationship between the number and type of metal pairs within a lithium cobalt oxide material and relative total energy, according to an illustrative embodiment.

FIG. 2 shows a graph illustrating a relationship between the number and type of metal pairs within a lithium cobalt oxide material and relative total energy (meV/f.u.), as calculated using DFT. The DFT calculations are based on the number of Ni—Mn pairs, Mn—Mn pairs and Ni—Ni pairs within a lithium cobalt oxide lattice structure. These calculated results indicate that the greater amounts of Ni—Mn pairs in lithium cobalt oxide compositions, the lower relative total energies, and therefore more stable the material than lithium cobalt oxide compositions with lesser amounts of Ni—Mn pairs and having Mn—Mn pairs and Ni—Ni pairs. Thus, the lithium cobalt oxide compositions having metal pairs containing one atom in a +4 oxidation state (Mn) and the other atom in a +2 oxidation state (Ni) are calculated to provide a more stable lithium cobalt oxide composition than those having pairs of the same type of atoms.

Embodiments described herein are not limited to NM44 compositions. For example, "NM77" (having about 7 atomic % nickel and about 7 atomic % manganese), "NM1010" (having about 10 atomic % nickel and about 10 atomic % manganese), and "NM1616" (having about 16 atomic % nickel and about 16 atomic % manganese) also show evidence of short-range ordering due to Ni—Mn pairs. In fact, any suitable compositions in accordance with the Formulae described herein may have short-range ordering due to NiMn pairs. The Ni—Mn pairs within the $LiCoO_2$ structure can be characterized by Raman spectroscopy and nuclear magnetic resonance spectroscopy (NMR). Described below are some data using these and other characterization techniques.

Table 2 below shows MAS NMR peak assignments for the NM1616 samples of FIG. 3. The peak assignments marked in bold can be considered fingerprints for Ni—Mn short-range order interaction.

TABLE 2

| Measured NMR Spectra Shift (ppm) | Possible Assignments | (calculated shift for configuration) |
|---|---|---|
| −23 | $1Ni^{st}$ | −15 |
| −47 | $1Mn^{nd}$ | −60 |
| −81 | $1Ni^{st} 1Mn^{nd}$ | −75 |
| −98 | $2Ni^{st} 1Mn^{nd}$ | −90 |
| −136 | $1Ni^{st} 2Mn^{nd}$ | −135 |
| 4.8 | $2Mn^{st} 4Ni^{st} 3Mn^{nd}$ | 4 |
| 55 | $1Ni^{nd} 2Ni^{st} 1Mn^{nd}$ | 50 |
| 88 | $1Ni^{nd} 1Mn^{nd}$ | 84 |
| 125 | $1Ni^{nd}$ or $2Mn^{st} 2Mn^{nd}$ or $2Ni^{nd} 6Ni^{st} 1Mn^{nd}$ | 140 or 130 or 124 |
| 194 | $2Mn^{st} 1Ni^{nd} 4Ni^{st} 2Mn^{nd}$ or $2Ni^{nd} 6Ni^{st}$ | 204 or 190 |
| 230 | $1Ni^{nd} 1Mn^{st} 2Ni^{st}$ or $2Mn^{st}$ or $2Ni^{nd} 1Mn^{nd}$ | 232 or 244 or 220 |
| 330 | $2Mn^{st} 1Ni^{nd} 1Mn^{nd}$ | 324 |
| 523 | $2Mn^{st} 2Ni^{nd}$ | 524 |
| 688 | $4Mn^{st} 2Ni^{st} 1Mn^{nd} 2Ni^{nd}$ | 678 |

Figure 3:
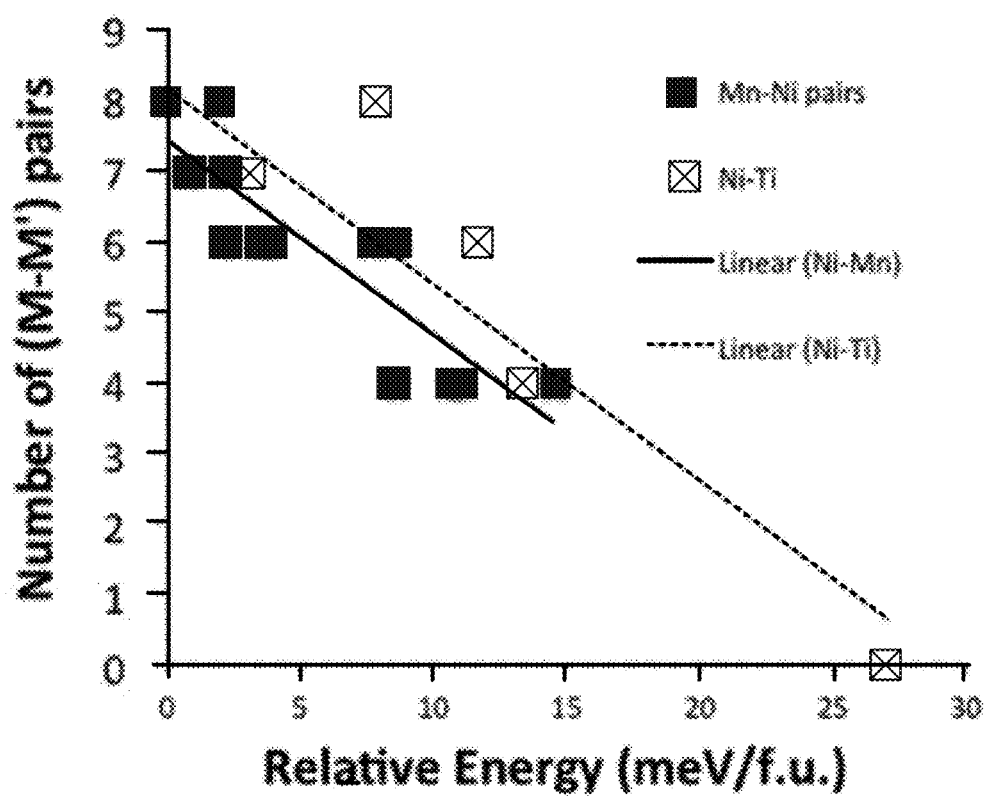
FIG. 3 shows a graph illustrating relative energy of battery cells as a function of number of atomic pairs, according to an illustrative embodiment.

FIG. 3 shows a graph illustrating data based on first principle calculations of relative energy of different cathode compositions as a function of the number of atomic pairs (M4M5) within the lithium cobalt oxide structure. Atomic pairs include Mn—Ni pairs and Ni—Ti pairs. The relative energy is calculated with respect to lowest energy configuration of each composition. For example, Mn—Ni pair calculations used 4 atomic % Mn—Ni pairs, and Ni—Ti pair calculations used 4 atomic % Ni—Ti pairs. This graph indicates a clear association of higher atomic pairs and higher relative energy.

Figure 4:
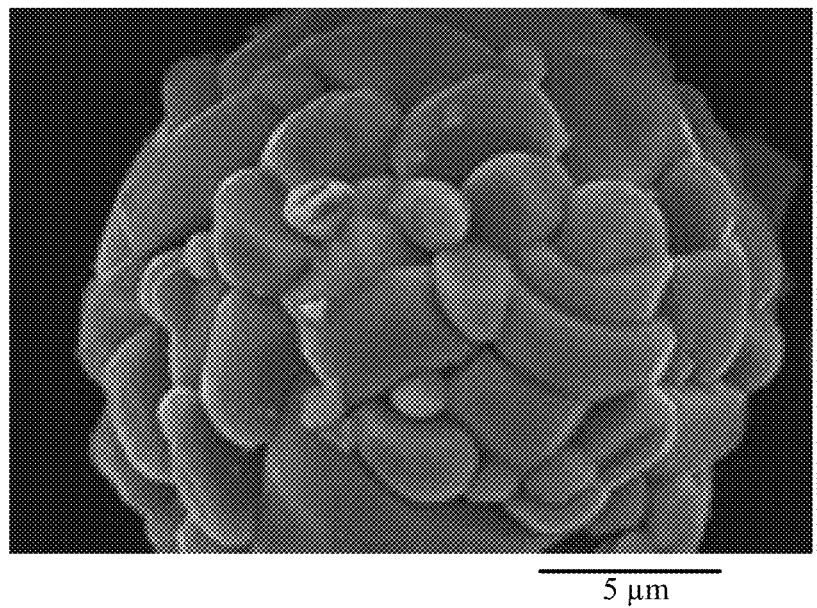
FIGS. 4 and 5 show scanning electron microscope (SEM) images of a lithium cobalt oxide composition with nickel-manganese pairs at higher and lower magnifications, respectively according to an illustrative embodiment.
Figure 5:
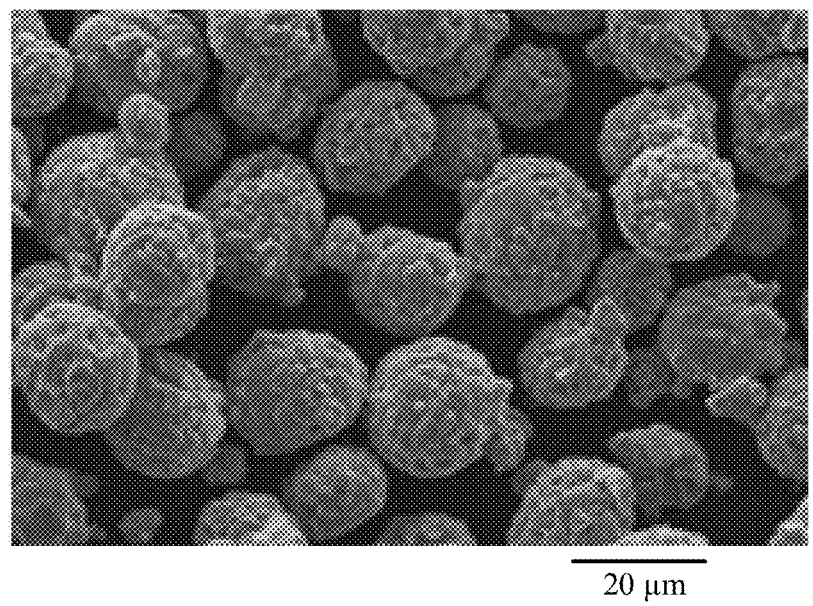

FIGS. 4 and 5 show scanning electron microscope (SEM) images of an NM77 composition at higher and lower magnifications, respectively. FIG. 5A shows a single particle of a NM77 composition and FIG. 5B shows multiple particles of a NM77 composition.

Figure 6:
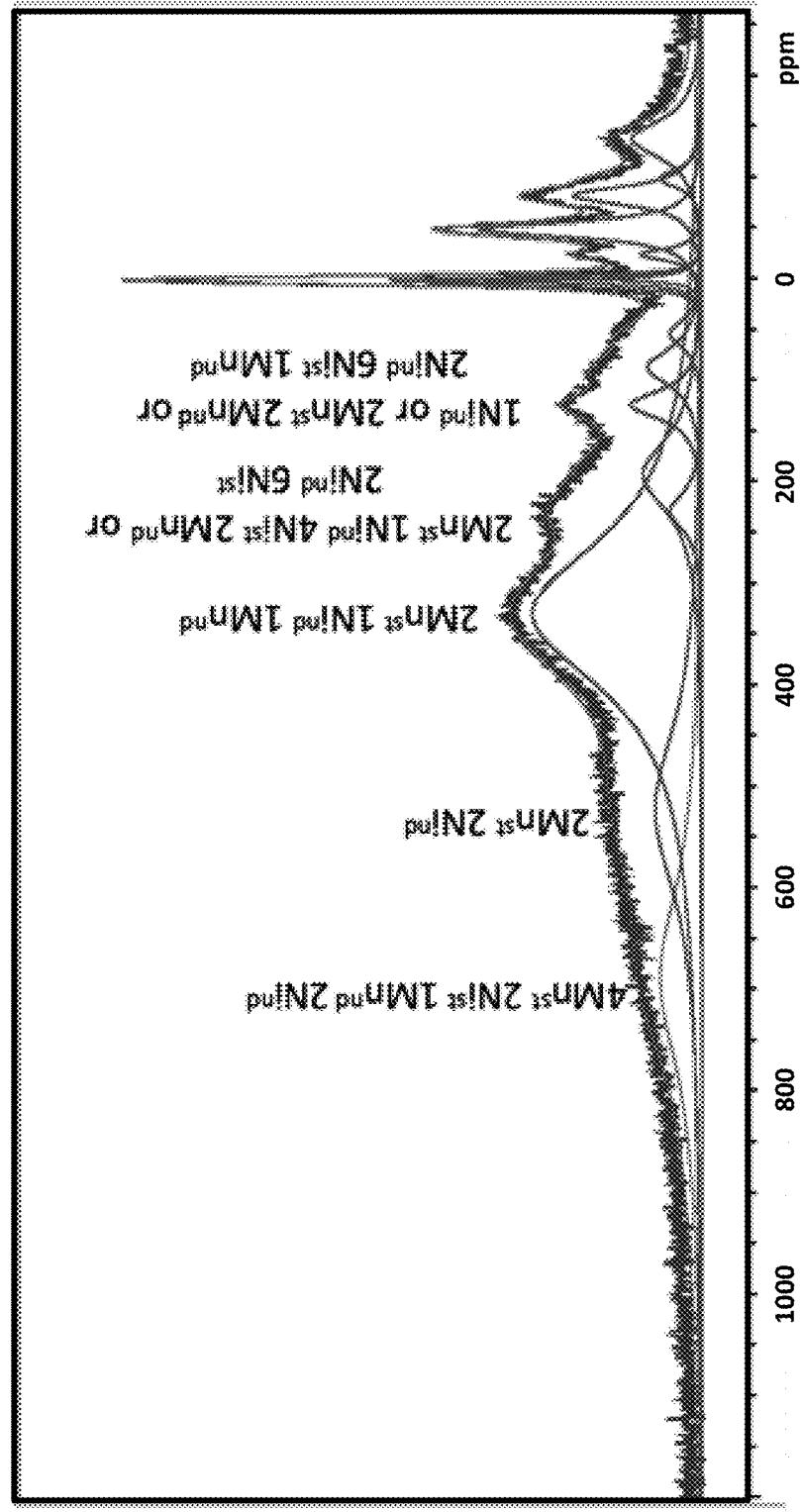
FIG. 6 shows MAS NMR spectra for lithium cobalt oxide compositions having nickel-manganese pairs, according to an illustrative embodiment.

FIG. 6 shows magnetic angle spinning (MAS) NMR spectra for NM1616 samples. The chemical shifts related to both Ni and Mn ions. In particular, labeled peaks within the MAS NMR spectra correspond to Ni—Mn short range order interaction within the lithium cobalt oxide structure. These labeled peaks can be taken as finger prints that Ni and Mn ions exist at adjacent Li+ ions.

Table 3 below summarizes some properties of an NM77 composition, specifically, $Li_{1.004}Co_{0.86}(Ni_{0.07}Mn_{0.07})O_2$, as well as characteristics of a lithium-ion cell having a positive electrode with the NM77 composition.

TABLE 3

| Property | MN44 | MN77 | MN1616 |
|---|---|---|---|
| Average working voltage at 0.2 C discharge rate 4.6-2.75 V (V) | 3.98 | 4.09 | 3.93 |
| Specific $1^{st}$ discharge capacity at 0.2 C, 4.6-2.75 V cutoff (mAh/g) | 210 | 204 | 200 |
| $1^{st}$ cycle efficiency, % | 92 | 96 | 92 |
| Lattice parameter based on R-3m space group (Å) | a = 2.8209, c = 14.0836 | a = 2.8223, c = 14.1140 | a = 2.838, c = 14.162 |

As indicated above in Table 3, the NM77 composition has R-3m lattice structure characterized as having lattice parameters a=2.82231 Å and c=14.11403 Å, and the NM1616 composition has R-3m lattice structure characterized as having lattice parameters a=2.838 Å and c=14.162 Å—which are generally larger than a and c values for a $LiCoO_2$ structure without Ni—Mn pairs (e.g., a commercial $LiCoO_2$ has a=~2.815 Å, c=~14.07 Å). In general, the compositions having Ni—Mn pairs provide refined lattice parameters of a≥2.817 Å and c>14.070 Å. It is believed this larger dimensioned R-3m lattice structure provides larger spacing between layers of each of the NM77 and NM1616 compositions, thereby providing improved intercalation of lithium ions between the layers as the battery cell is charged and discharged. As described above, the Ni—Mn pairs generally provide a more stable R-3m lattice structure compared to a $LiCoO_2$ structure without Ni—Mn pairs. It is believed that this more stable lattice structure is less vulnerable to collapse or sliding as lithium ions are removed and replaced, thereby providing a more reliable lattice structure for the lithium ions to move into and out of. That is, the Ni—Mn pairs result in a cathode that is capable of enduring more charge and discharge cycles without lattice structure breakdown compared to a $LiCoO_2$ structure without Ni—Mn pairs. The same is true for metal pairs, as described herein.

Table 3 also indicates that a battery cell having the NM77 composition is characterized as operating with a specific first discharge capacity is significantly higher than that of a $LiCoO_2$ battery without Ni—Mn pairs. Specifically, a NM77 composition battery cell can operate at a specific first discharge capacity of about 215 mAh/g compared to about 170 mAh/g for a $LiCoO_2$ battery without Ni—Mn pairs.

Figure 7:
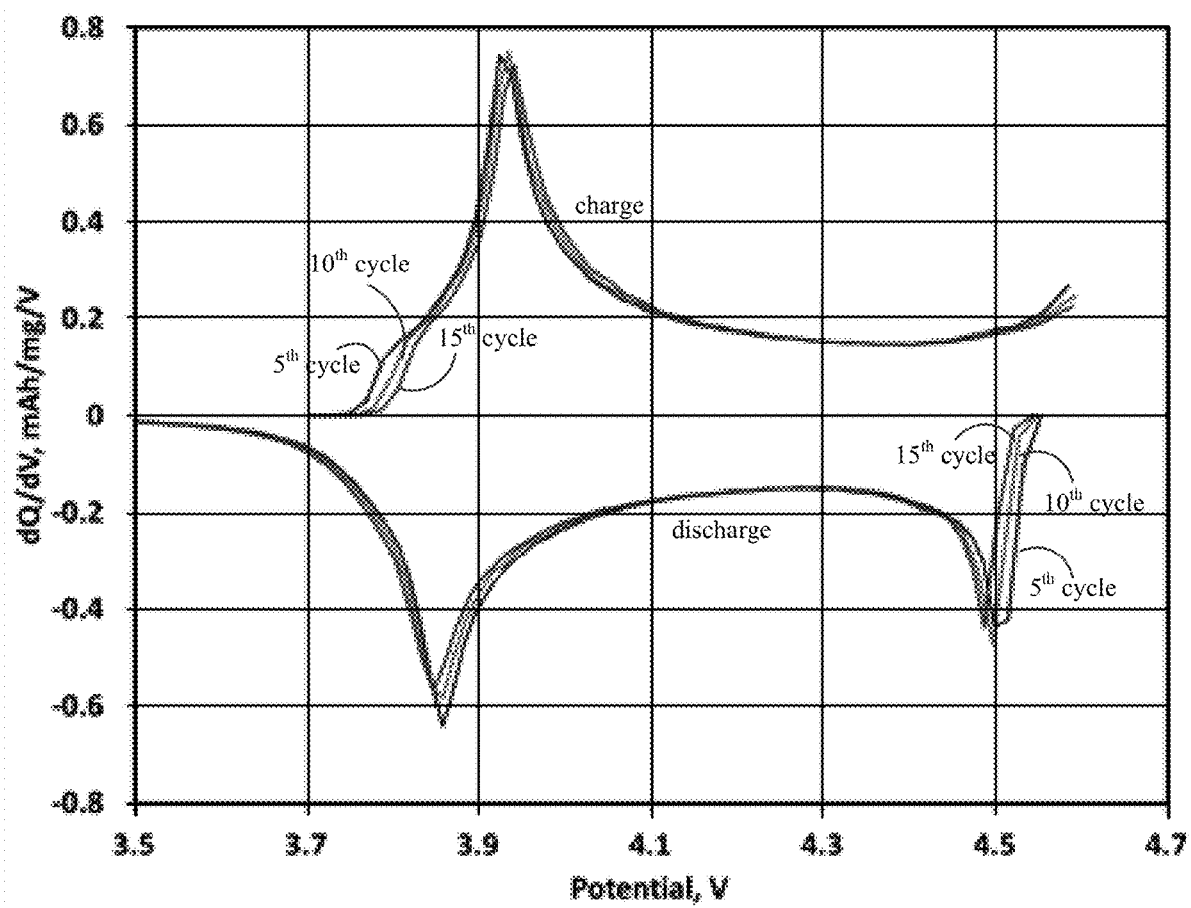
FIG. 7 shows a differential capacity analysis plot for a battery cell having a cathode with a lithium cobalt oxide composition with nickel-manganese pairs according to an illustrative embodiment.

FIG. 7 shows a differential capacity analysis (dQ/dV) plot for a battery cell having an NM77 electrode composition. In general, a dQ/dV plot is used to indicate the tendency of a battery cell to degrade over a number of charge and discharge cycles. Voltage (V) and charge (Q) data are collected as the cells are charged and discharged a designated number of cycles. These data are then differentiated to create differential capacity, dQ/dV (V, n), versus V for the nth measured cycle. FIG. 7 shows a dQ/dV plot for 5, 10 and 15 cycles. The top curves (having dQ/dV above zero) correspond to charge cycles and the bottom curves (having dQ/dV below zero) correspond to discharge cycles.

FIG. 7 shows that the dQ/dV curves for 5, 10 and 15 cycles have very similar shapes and closely overlap with each other. This indicates that the performance of the battery cell with the NM77 electrode composition is stable over these charge/discharge cycles, indicating a very stable crystal lattice structure over numerous cycles of lithium ion transport. In contrast, of dQ/dV curves of standard battery cells with commercially available $LiCoO_2$ electrode compositions will show degradation after about 10 cycles—i.e., the peaks of the curves will lessen or even disappear at around 10 cycles.

The peaks of the dQ/dV curves correspond to voltage potentials at which maximum lithium ion transport occurs, and at which maximum electron flow occurs. Standard battery cells with commercially available $LiCoO_2$ electrode compositions typically have a maximum voltage potential of about 3.7 V. FIG. 7 indicates that the battery cell with the NM77 electrode composition maximum reside around 3.9 V. These results indicate that, in addition to degrading less than standard $LiCoO_2$ electrodes, NM77 electrodes also provides a marked increase in battery energy (corresponding to a higher energy capacity) compared to standard $LiCoO_2$ electrodes. In some embodiments, a lithium-ion battery having a cathode with a composition in accordance with Formula (I) or 2 will provide a maximum voltage potential of at least 3.9 V.

Table 4 below summarizes some performance characteristics of sample battery cells (1-8) having positive electrodes of different compositions, including different NM77 compositions, a standard $LiCoO_2$ composition without nickel or manganese (referred as "LCO"), and a $Li_{1.02}Co_{0.95}Mn_{0.04}O_2$ (referred as "LCMnO").

TABLE 4

| Sample No. | 1 | 2 | 3 | 4 | 5 | 6 | 7 | 8 |
|---|---|---|---|---|---|---|---|---|
| cathode composition | NM77 | NM77 | NM77 | NM77 | NM77 | NM77 | LCO | LCMnO |
| Li/M (M = $Co_{0.93}Mn_{0.07}$) | $Li_{0.969}$ | $Li_{0.989}$ | $Li_{1.004}$ | $Li_{1.02}$ | $Li_{1.03}$ | $Li_{1.04}$ | — | — |
| $1^{st}$ cycle charge capacity | 220 mAh/g | 223 mAh/g | 229 mAh/g | 227 mAh/g | 228 mAh/g | 224 mAh/g | 238 mAh/g | 229 mAh/g |
| $1^{st}$ cycle discharge capacity | 206 mAh/g | 209 mAh/g | 215 mAh/g | 212 mAh/g | 214 mAh/g | 210 mAh/g | 232 mAh/g | 214 mAh/g |
| $1^{st}$ cycle efficiency | 94% | 94% | 94% | 93% | 94% | 94% | 98% | 94% |
| $1^{st}$ cycle average discharge V | 4.09 V | 4.08 V | 4.09 V | 4.08 V | 4.07 V | 4.07 V | 4.07 V | 4.10 V |
| $52^{nd}$ cycle discharge capacity | 191 | 193 | 198 | 196 | 197 | 196 | 181 | 167 |
| $52^{nd}$ cycle discharge V | 4.06 | 4.04 | 4.07 | 4.05 | 4.05 | 4.05 | 3.85 | 4.06 |
| Capacity retention % ($52^{nd}/1^{st}$ cycle) | 93 | 93 | 92 | 93 | 92 | 93 | 78 | 78 |
| Energy retention % ($52^{nd}/1^{st}$ cycle) | 92 | 92 | 91 | 92 | 92 | 93 | 74 | 77 |
| $1^{st}$ cycle energy | 3362 | 3410 | 3523 | 3451 | 3484 | 3412 | 3779 | 3515 |

Table 4 shows data for $1^{st}$ cycle charge and discharge capacities (mAh/g) for the cells at 0.1° C. between 4.6V and 2.75V, $1^{st}$ cycle efficiency (%), $1^{st}$ cycle average discharge voltage (V), $52^{nd}$ cycle average discharge capacity (mAh/g) for the cells at 0.1° C. between 4.6V and 2.75V, and $52^{nd}$ cycle average discharge voltage (V)—each averaged over three cells. Table 4 also shows data for capacity retention % and energy retention % of $52^{nd}$ cycle versus $1^{st}$ cycle.

Table 4 indicates that the cells having NM77 electrode compositions show less performance degradation over charge/discharge cycles compared to the cells having LCO and LCMnO electrode compositions. In particular, the capacity retention and energy retention percentages of $52^{nd}$ cycles versus $1^{st}$ cycles are much higher for the cells having NM77 electrode compositions (i.e., 93% and 92%) compared to the cells having LCO and LCMnO electrode compositions (i.e., 78%, 74% and 77%). These data further support the above-described improved stability provided by the Ni—Mn pairs with the NM77 electrode compositions. In some embodiments, a lithium-ion battery having a cathode with a composition in accordance with Formula (I) or 2 will provide a charge capacity retention ($52^{nd}/1^{st}$ cycle) of at least 92%.

Figure 8:
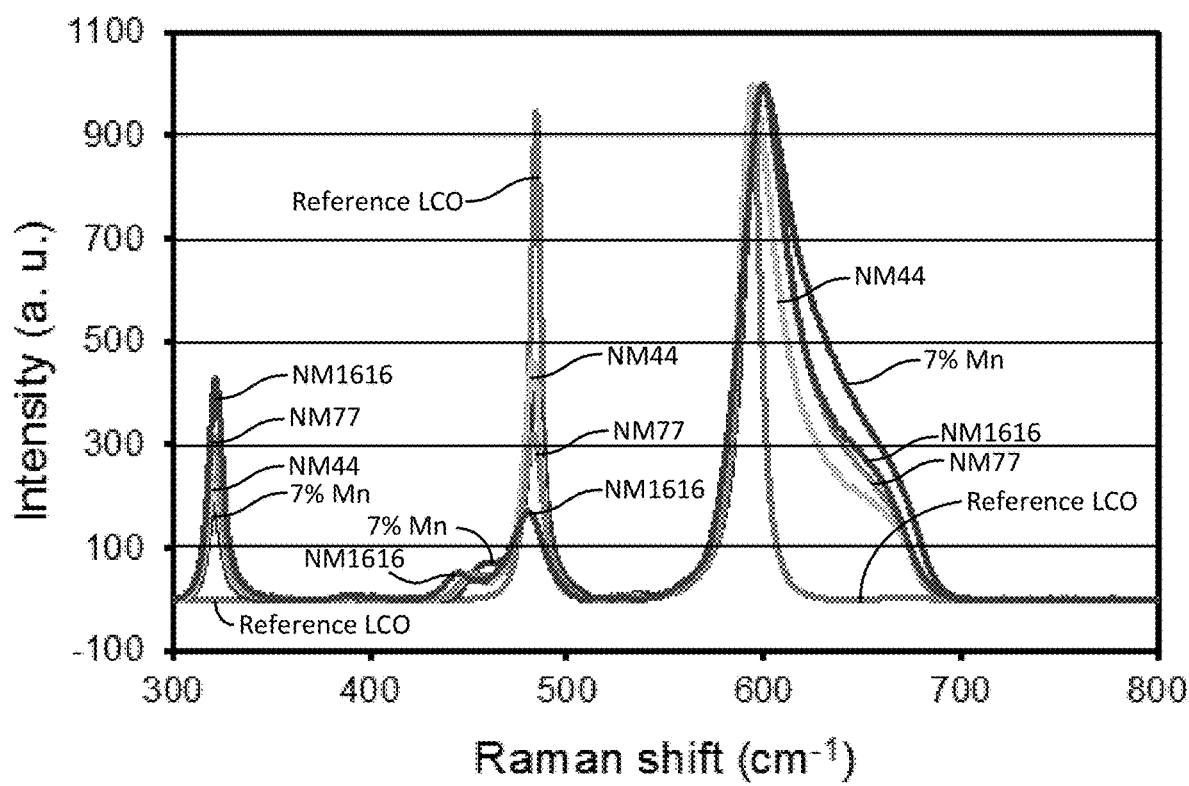
FIG. 8 shows Raman spectra of lithium cobalt oxide compositions having nickel-manganese pairs and lithium cobalt oxide compositions without nickel-manganese pairs.

FIG. 8 shows Raman spectra of layered compositions of $LiCoO_2$ (reference LCO), $LiCoO_2$ composition with 7 atomic % manganese and no nickel, and Ni—Mn substituted $LiCoO_2$ of different amounts of Ni—Mn (specifically, NM44, NM77, NM1010 and NM1616). According to the factor-group analysis, the layered $LiCoO_2$ with R-3m structure is predicted to show two Raman-active $A_{1g}$ and $E_g$ modes, which are observed at around 596 cm$^{-1}$ and around 486 cm$^{-1}$, respectively. With the addition of Mn or Ni—Mn into the structure, a peak at around 320 cm$^{-1}$ is observed, which increases intensity with increasing amounts of Ni—Mn pairs. In addition, increasing amounts of Ni—Mn pairs result in a peak around 450 cm$^{-1}$. Furthermore, Ni—Mn pairs are associated with peaks at frequencies above the 596 cm$^{-1}$ band and below the 486 cm$^{-1}$ band due to the Mn—O and Ni—O vibrations. The intensity of the scattering above 596 cm$^{-1}$ band seems to increase with increasing Mn substitution, and decreasing with increasing Ni substitution. In addition, increasing Ni substitution slightly decreasing the frequency of the Ni—Mn induced scattering below 486 cm$^{-1}$.

Figure 9:
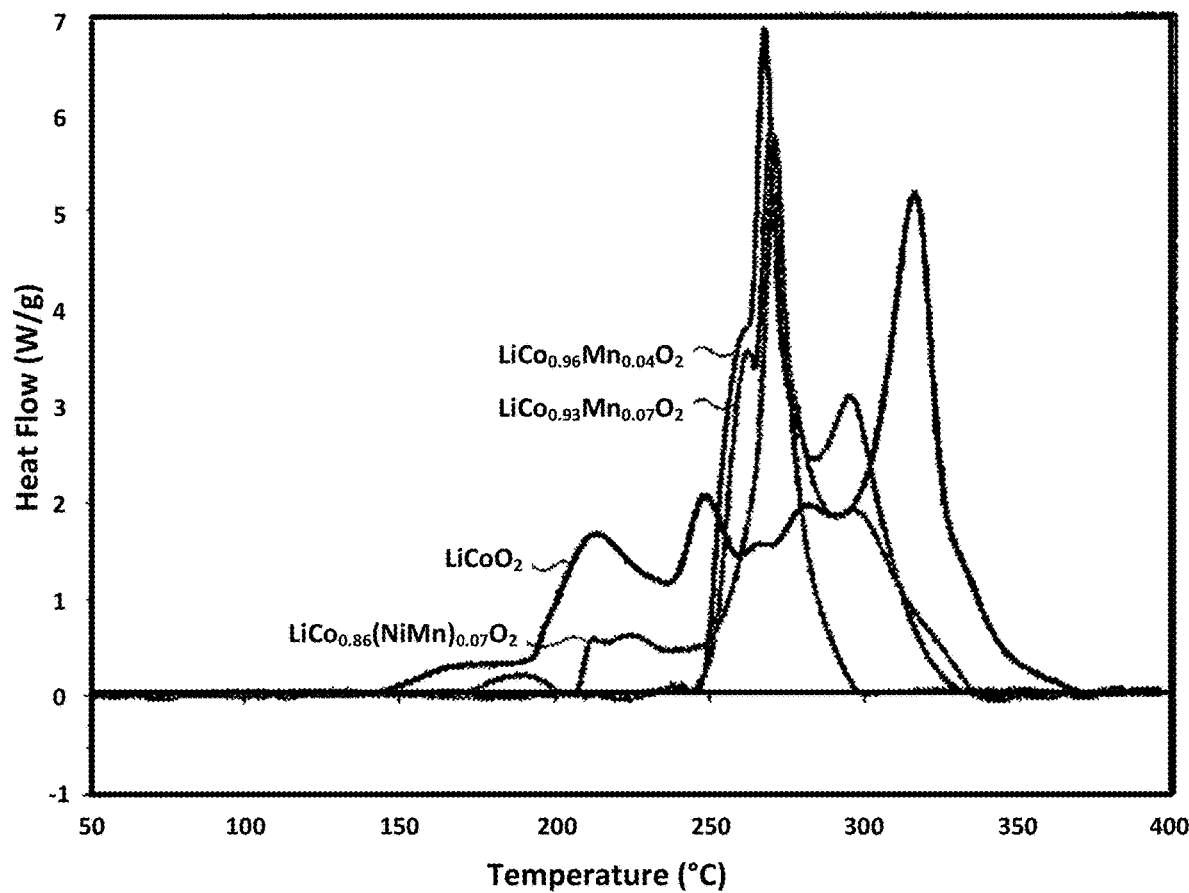
FIG. 9 shows a heat flow versus temperature graph comparing thermal stability of different cathode materials, according to an illustrative embodiment.

FIG. 9 shows a heat flow versus temperature graph comparing thermal stability of different cathode materials. The graph of FIG. 9 shows results in accordance with differential scanning calorimetry (DSC) techniques for analyzing phase transitions of materials when heat is applied. The graph shows heat flow curves for a NM77 composition (marked as $LiCo_{0.86}(NiMn)_{0.07}O_2$), a lithium cobalt oxide having 4 atomic % manganese (marked as $LiCo_{0.96}Mn_{0.04}O_2$), a lithium cobalt oxide having 7 atomic % manganese (marked as $LiCo_{0.93}Mn_{0.07}O_2$), and an undoped lithium cobalt oxide (marked as $LiCoO_2$). The cathode materials where harvested when being charged to 4.45V.

In general, peaks in a DSC curve correspond to exothermic or endothermic reactions, which are often accompanied with structural change of a lithium cobalt oxide material. The onset temperature is defined as the lowest temperature at which the material initiates an exothermic reaction. The graph of FIG. 9 indicates that the undoped lithium cobalt oxide composition has a relative low onset temperature, i.e., around 150° C. The graph indicates the NM77 composition has a higher onset temperature, i.e., around 180° C. However, the lithium cobalt oxide compositions having 4% and 7% manganese experienced structural changes at even higher temperatures, i.e., around 250° C. These results indicate that lithium cobalt oxide compositions having 4% and 7% manganese have better thermal stability than the undoped lithium cobalt oxide material and NM77 material.

Figure 10:
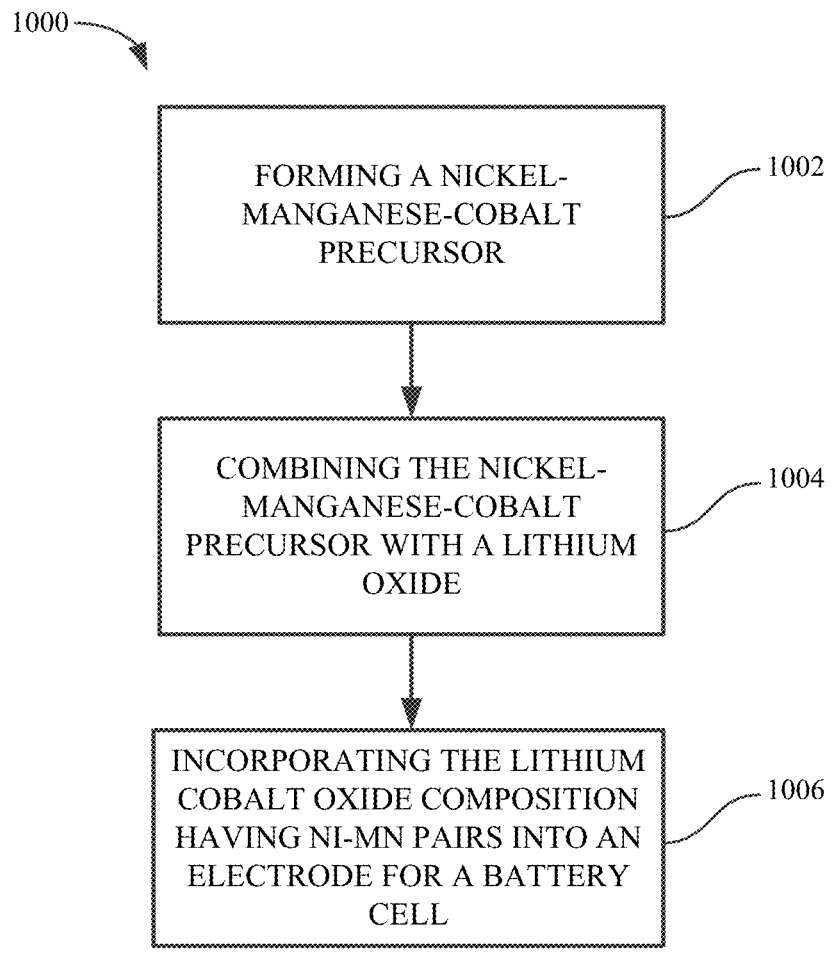
FIG. 10 shows a flowchart indicating a method of forming a battery cell with an electrode with a lithium cobalt oxide composition having nickel-manganese pairs, according to an illustrative embodiment.

FIG. 10 shows flowchart 1000 indicating a method of forming a battery cell with an electrode with a lithium cobalt oxide composition having Ni—Mn pairs, in accordance with some embodiments. At 1002, a nickel-manganese-cobalt precursor is formed. At 1004, the nickel-manganese-cobalt precursor is combined with a lithium oxide (e.g., $Li_2CO_3$) in to form a solid-state lithium cobalt oxide composition having Ni—Mn pairs. At 1006, the lithium cobalt oxide composition having Ni—Mn pairs is incorporated into an electrode for a battery cell.

In some embodiments, the lithium cobalt compositions in accordance with Formulae (I)-(IV) are in the form of a coating. FIGS. 11A-11D show coated particles for cathode materials, in accordance with some embodiments. In these coated particle embodiments, a lithium cobalt oxide composition having heterogeneous atomic pairs are in the form of a coating around a core material of a different composition. In some cases, this configuration can improve the thermal stability of the cathode material.

Figure 11A:
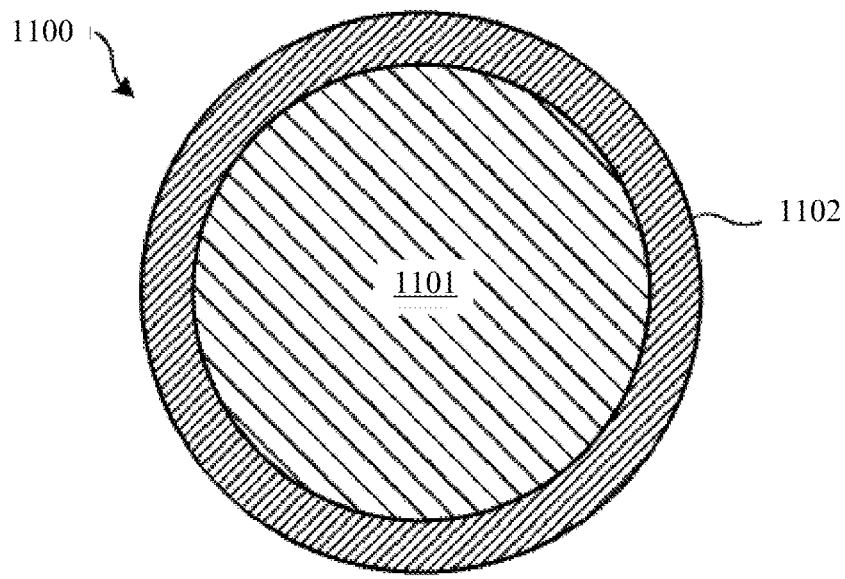
FIGS. 11A-11D show coated particles for cathode materials in accordance with some embodiments.

FIG. 11A shows a lithium battery cathode particle 1100 that includes coating 1102, in accordance with some embodiments. Particle 1100 represents one of a number of similar particles within a cathode for a lithium ion battery cell. Particle 1100 is represented as having a spherical shape—however, particle 1100 can have any suitable shape, including a globular or other non-spherical shape. Particle 1100 includes core 1101, which can be composed of any suitable cathode material, such as layered cathode, spinel cathode, olive cathode (e.g., layered $LiTMO_2$, spinel $LiM_2O_4$, $LiMPO_4$, $Li_2MnO_3*LiTMO_2$). In some embodiments, core 1101 is composed of a lithium cobalt oxide material. In some embodiments, core 1101 is composed of a lithium cobalt oxide represented by:

$$Li_aCo_bM6_cO_\delta \qquad \text{(Formula (V))}$$

where M6 is one or more of manganese (Mn), nickel (Ni), aluminum (Al), magnesium (Mg), titanium (Ti), zirconium (Zr), calcium (Ca), vanadium (V), chromium (Cr), iron (Fe), copper (Cu), zinc (Zn), and ruthenium (Ru); and where $0.90 \leq a \leq 1.1$, $0.5 \leq b \leq 1.0$, $0 < c \leq 0.5$, $1.90 \leq \delta \leq 2.10$. In some instances, M6 can be Mn, Ni, or the combination of Mn and Ni, along with Al as a dopant.

For example, core 1101 can be composed of lithium cobalt oxide doped with manganese. In some embodiments, core 1101 includes a lithium cobalt oxide doped with about 4 atomic % manganese or a lithium cobalt oxide doped with about atomic 7 atomic % manganese. In some embodiments, core 1101 is composed of a high voltage, high volumetric energy density material, such as described in U.S. Patent Publication No. 2014/0272563A1, which is incorporated herein by reference in its entirety.

Compositions in accordance with Formula (V) have high thermal stability when exposed to relatively high temperatures compared to other lithium cobalt oxide compositions. Thus, a cathode composed of a lithium cobalt oxide material in accordance with Formula (V) will retain structural integrity at relatively high temperatures.

In some embodiments, the core is selected from a layered hexagonal rock-salt structure represented as $LiTM_{1-x}Me_xM7O_2$; where TM is Co, Mn or Ni; Me is Li, Mg, Al, Ti, Zr, Ca, V, Cr, Fe, Cu, Zn or Ru. In some cases, the core has a spinel cubic structure represented as $LiMn_2-xMe_xO_4$; where Me is Li, Ni, Co, Mg, Al, Ti, Zr, Ca, V, Cr, Fe, Cu, Zn or Ru. In some embodiments, the core has an olivine structure represented as $LiTM_{1-x}Me_xPO_4$; where TM is Co, Mn, Ni or Fe; Me is Li, Mg, Al, Ti, Zr, Ca, V, Cr, Fe, Cu, Zn or Ru. In some embodiments, the core is a layered-layered material such as represented by $Li_2MO_3*LiTM_{1-x}Me_xO_2$; where M is Mn, Ru, Ti or Zr; TM is Co, Mn or Ni; Me is Li, Mg, Al, Ti, Zr, Ca, V, Cr, Fe, Cu, Zn or Ru.

Core 1101 is covered with coating 1102 (which can also be referred to as a shell), which can be composed of a lithium cobalt oxide composition in accordance with one or more of Formulae (I), (II), (III), or (IV). That is, coating 1102 can be composed of a lithium cobalt oxide having heterogeneous atomic pairs, such as Ni—Mn pairs. As described above, lithium cobalt oxide having heterogeneous atomic pairs generally have a more stable crystal structure than undoped lithium cobalt oxide compositions and lithium cobalt oxide compositions having homogeneous atomic pairs (e.g., Ni—Ni or Mn—Mn pairs). In addition, lithium cobalt oxide compositions having heterogeneous atomic pairs are found to have higher capacity and energy retention after cycle life testing.

One of the advantages of particle 1100 having coating 1102 of one composition and core 1101 of a different composition is that each composition can provide different benefits. In particular, core 1101 can provide high thermal stability to particle 1100 while coating 1102 can provide relatively higher energy retention to particle 1100. In addition, some lithium cobalt oxide compositions having atomic pairs (i.e., in accordance with one or more of Formulae (I), (II), (III), or (IV)) can have a lower true density and lower average discharge voltage than a lithium cobalt oxide composition without atomic pairs (e.g., in accordance with Formula (V)). That is, core 1101 can allow for denser packing of a lithium cobalt oxide composition (i.e., provide a higher volumetric energy density for the battery cell). Thus, core 1101 can provide high energy density and high thermal stability, and coating 1102 can provide high energy retention.

The relative volumes of core 1101 and coating 1102 can vary. In some embodiments, the relative volume of core 1101 is greater than that of coating 1102. In some cases, the thickness of coating 1102 ranges from about a couple of (i.e., two) nanometers to about five micrometers, and the diameter of particle 1100 ranges from about couple of (i.e., two) micrometers to about thirty micrometers.

Figure 11B:
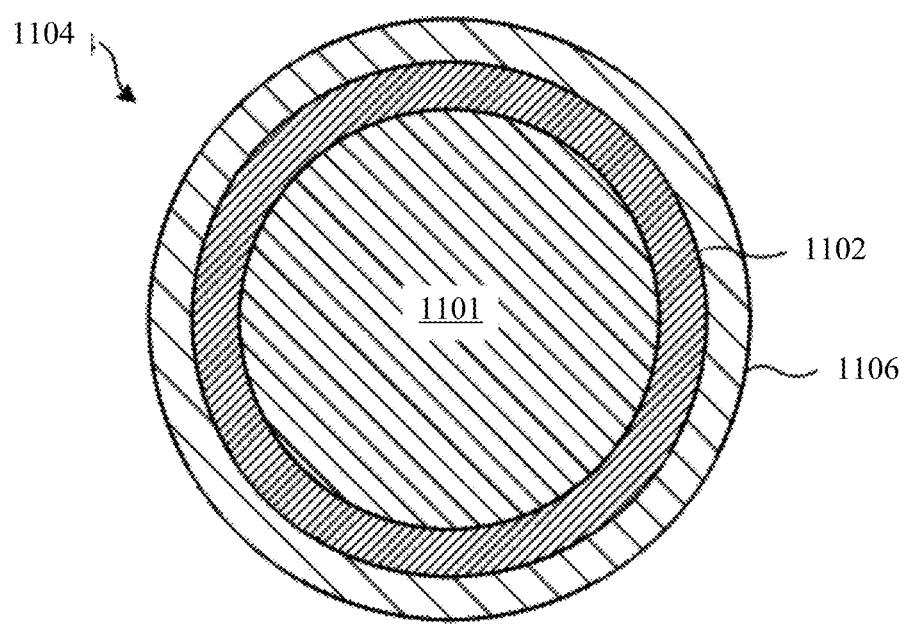

FIG. 11B shows a lithium battery cathode particle 1104, in accordance with other embodiments. Particle 1104 includes coating 1102, which can be composed of a lithium cobalt oxide in accordance with one or more of Formulae (I), (II), (III), or (IV). In addition, second coating 1106 covers coating 1102. Thus, in the embodiment show in FIG. 11B, coating 1102 can be referred to as a first coating.

Second coating 1106 can be composed of a dielectric material, such as one or more of aluminum oxide ($Al_2O_3$), aluminum fluoride ($AlF_3$), aluminum phosphate ($AlPO_4$), zirconium oxide ($ZrO_2$), titanium oxide ($TiO_2$), magnesium oxide (MgO) etc. In some embodiments, second coating 1106 has a porous structure such that portions of first coating 1102 are uncovered and exposed, thereby providing access to the lithium cobalt oxide composition of first coating 1102. In this way, lithium ions can pass through second coating 1106 during charge and discharge cycles. One of the functions of second coating 1106 can be to prevent or reduce exposure of second coating 1106 (and sometimes core 1101) to hydrogen fluoride (HF), which can exist within the battery electrolyte. It is believe the HF can degrade a lithium oxide-based material. Therefore, by reducing exposure of first coating 1102 to HF can reduce degradation of first coating 1102 (and sometimes core 1101), thereby slowing down the impedance growth as a result of degraded surface of particle 1100 and decreasing the electrical resistance of the battery cell. In this way, second coating 1106 can stabilize the surface of particle 1100 with respect to the electrolyte composition.

The thickness of second coating 1106 can vary depending on a number of factors. In some embodiments, the thickness of second coating 1106 ranges from less than about one nanometer to about a couple of (i.e., two) micrometers. In some cases, the thickness of coating 1102 ranges from about a couple of (i.e., two) to about five micrometers, and the diameter of particle 1104 ranges from about a couple of (i.e., two) micrometers to about thirty micrometers.

Figure 11C:
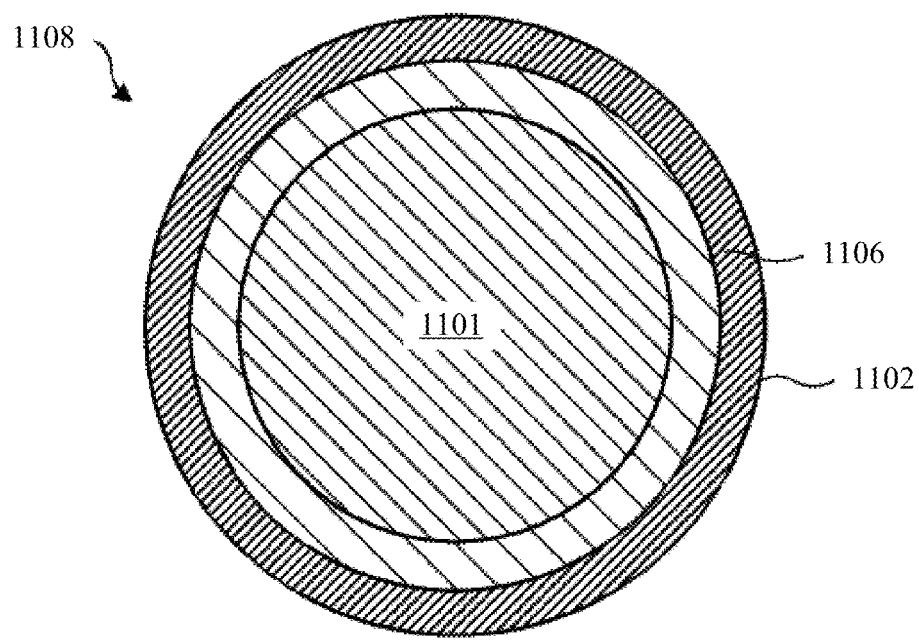

FIG. 11C shows a lithium battery cathode particle 1108, in accordance with other embodiments. Particle 1108 includes core 1101, which is covered with coating 1102 (also referred to as a first coating or a lithium cobalt oxide coating doped with atomic pairs) composed of a lithium cobalt oxide in accordance with one or more of Formulae (I), (II), (III), or (IV), as well as second coating 1106 composed of a dielectric material. In contrast to particle 1104 of FIG. 11B, second coating 1106 is positioned between core 1101 and first coating 1102. In some cases, this arrangement with coating 1102 being the outermost layer of particle 1108 provides a cathode material having good thermal stability and energy retention. In some embodiments, the thickness of second coating 1106 ranges from less than about one nanometer to about a couple of (i.e., two) micrometers. In some cases, the thickness of coating 1102 ranges from about couple of nanometers to about five micrometers, and the diameter of particle 1104 ranges from about couple of (i.e., two) micrometers to about thirty micrometers.

Figure 11D:
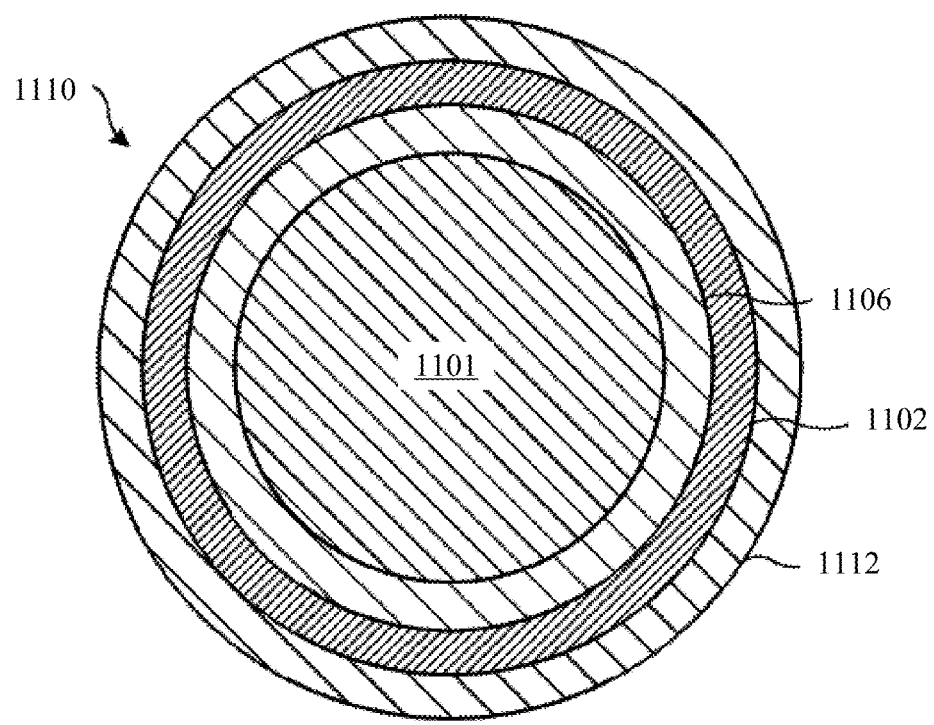

FIG. 11D shows a lithium battery cathode particle 1110, in accordance with other embodiments. Particle 1110 includes core 1101, which is covered with coating 1102 composed of a lithium cobalt oxide composition in accordance with one or more of Formulae (I), (II), (III), or (IV). Particle 1110 also includes second coating 1106 and third coating 1112, which are each composed of dielectric material. In some cases, this arrangement with particle 1108 having layers of dielectric coatings and between layers of lithium cobalt oxide material provides a cathode material having good thermal stability and energy retention.

It should be noted that the particles presented in FIGS. 11A-11D can have any suitable shape, including spherical, globular or other non-spherical shape. The size of the particles presented in FIGS. 11A-11D can vary depending on a number of factors. In some embodiments, the particles in FIGS. 11A-11D have a diameter ranging from about couple of (i.e., two) micrometers to about thirty micrometers.

It should also be noted that the embodiments described above with reference to FIGS. 11A-11D are presented as examples and that any suitable combination and number of coatings can be used in order to create a cathode material having a prescribed performance, such as energy density, thermal stability, discharge capacity, dQ/dV values, etc. That is, the particles can be composed of one or more lithium cobalt oxide coatings doped with atomic pairs and/or one or more dielectric coatings, arranging in any suitable order. Put another way, the particles can include multiple first coatings and/or multiple second coatings.

Methods of forming coated particles, such as particle 1100, 1104, 1108 and 1110, can include any of a number of suitable coating techniques. One technique involves forming a solution of a nickel-manganese-cobalt precursor using the techniques described above. Then, particles formed of a core material are immersed in the solution such that the core material becomes coated with the nickel-manganese-cobalt material. Another technique involves forming nanoparticles of the nickel-manganese-cobalt precursor. The nanoparticles are then applied to surfaces of particles formed of the core material. The nanoparticles can be applied using dry or wet blending techniques. In some cases, a calcination or melting process following the blending process is applied to stabilize the nanoparticles to surfaces of the particles composed of the core material.

Figure 12A:
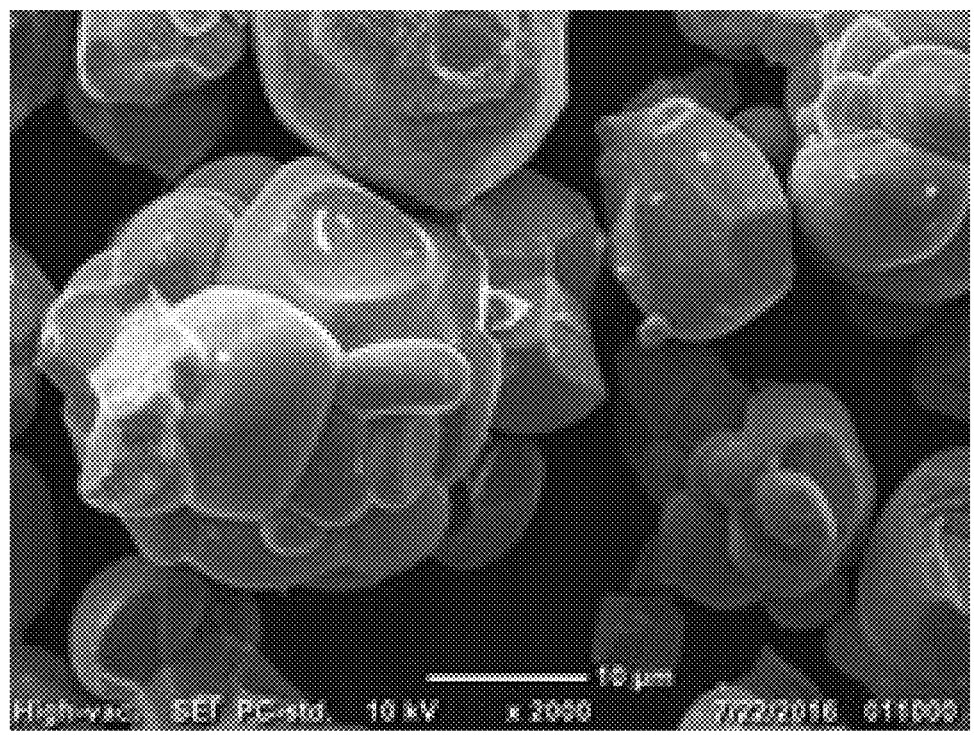
FIGS. 12A and 12B show SEM images of uncoated and coated particles having various lithium cobalt oxide compositions, according to an illustrative embodiment.
Figure 12B:
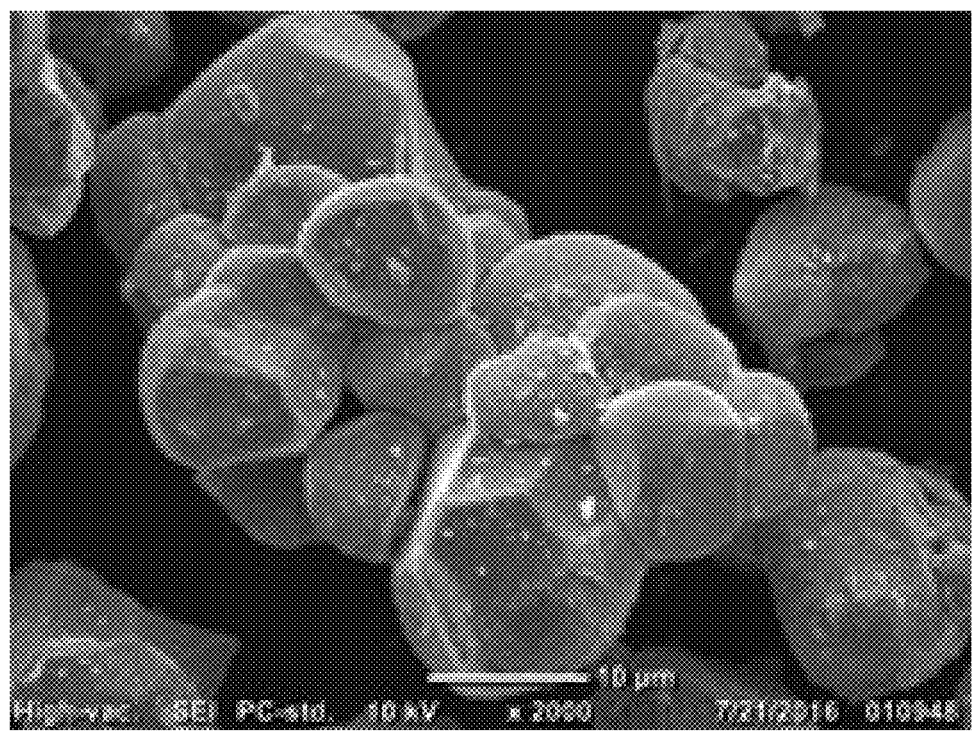

FIGS. 12A and 12B show SEM images of uncoated and coated particles. FIG. 12A shows particles composed of a lithium cobalt manganese oxide composition, and FIG. 12B shows particles composed of a lithium cobalt manganese oxide composition core having a coating composed of a composition having Ni—Mn pairs. As shown, the coated particles (FIG. 12B) appear to have different surface textures compared to the uncoated particles (FIG. 12A).

Figure 13:
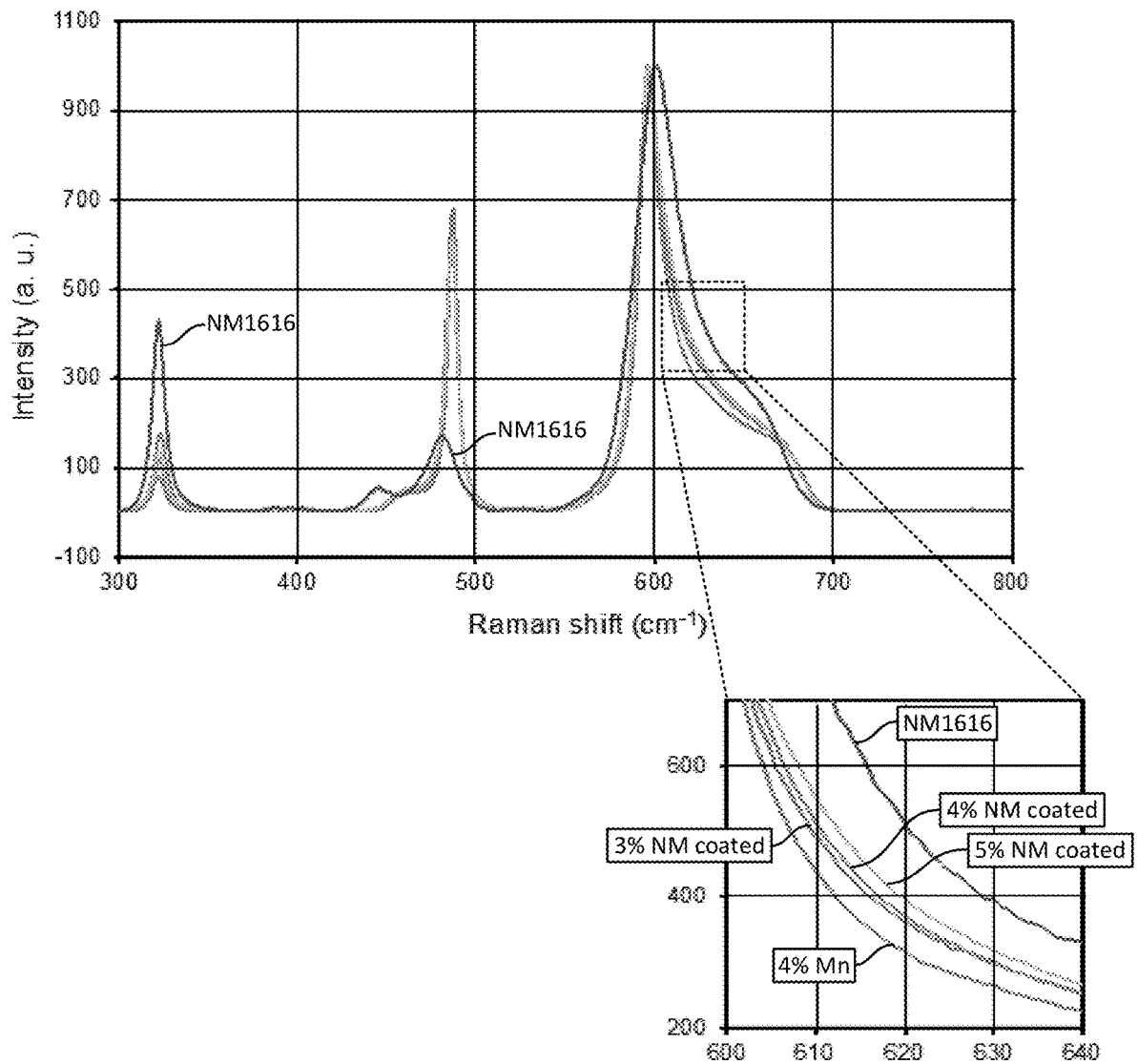
FIG. 13 shows Raman spectra of particles coated and uncoated coated with various lithium cobalt oxide compositions, according to an illustrative embodiment.

FIG. 13 shows Raman spectra of particles having different compositions, some coated and some not coated. Compositions include an uncoated 4 atomic % manganese $LiCoO_2$ composition (4% Mn), a 4 atomic % manganese $LiCoO_2$ core covered with a 3 atomic % NiMn $LiCoO_2$ composition (3% NM coated), a 4 atomic % manganese $LiCoO_2$ core covered with a 4 atomic % NiMn $LiCoO_2$ composition (4% NM coated), a 4 atomic % manganese $LiCoO_2$ core covered with a 5 atomic % NiMn $LiCoO_2$ composition (5% NM coated), and an uncoated 16 atomic % NiMn $LiCoO_2$ composition (NM1616).

The Raman spectra of FIG. 13 indicate that after coating with compositions having Ni—Mn pairs, the shoulder peak at around 650 $cm^{-1}$ is more pronounced compared to the uncoated 4% Mn composition. Furthermore, the shoulder peak at around 650 $cm^{-1}$ is even more pronounced in the uncoated NM1616 composition. This indicates that samples having coatings with compositions having Ni—Mn pairs are more stable than to the uncoated 4% Mn composition, but that uncoated NM1616 composition provides even better stability. It should be noted, however, that the coating configuration could provide a more surface stable high-energy cathode. Thus, these factors should be considered and balanced when designing a battery cell for a particular application.

Figure 14:
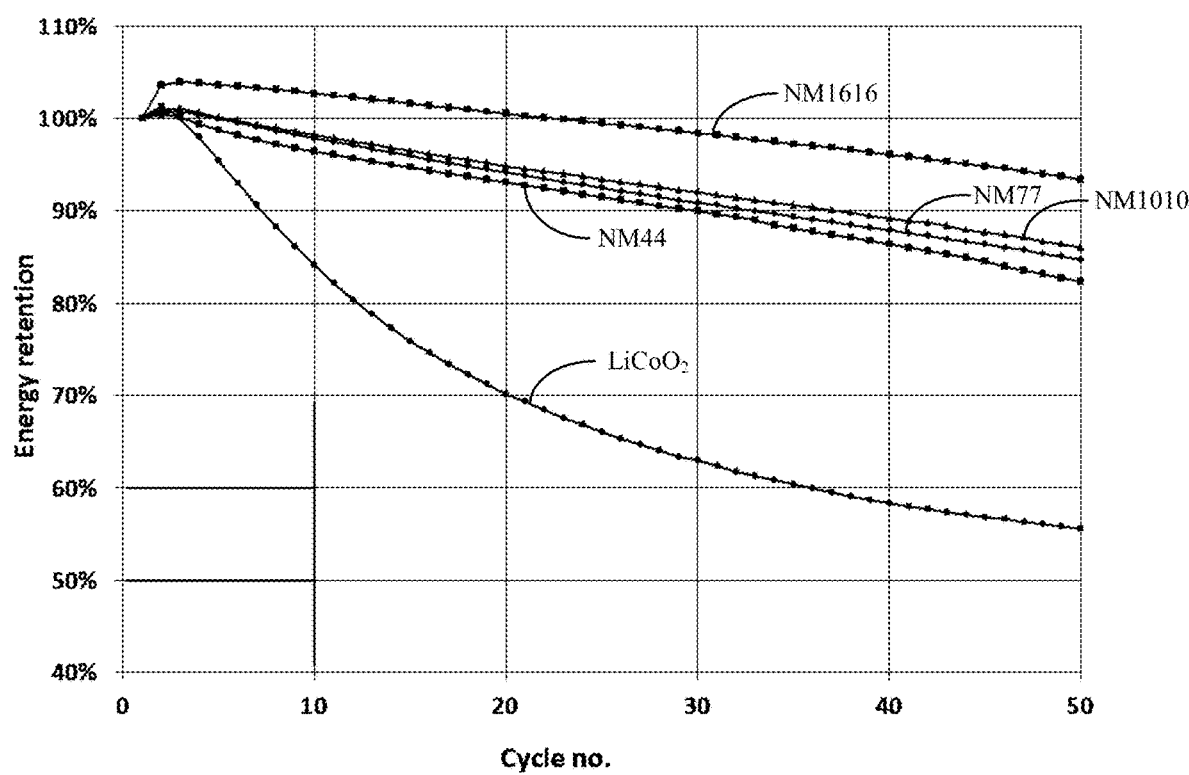
FIG. 14 shows a graph illustrating energy retention of battery cells having various lithium cobalt oxide compositions, according to an illustrative embodiment.

FIG. 14 shows a graph illustrating energy retention of battery cells having $LiCoO_2$ (standard, commercially available), NM44, NM77, NM1010, and NM1616 cathode compositions. In each graph, the energy retention values (y-axis) are normalized with respect to a first cycle. The graph of FIG. 14 indicates that battery cells having higher amounts of Ni—Mn pairs have higher energy retention over 50 cycle counts.

Figure 15:
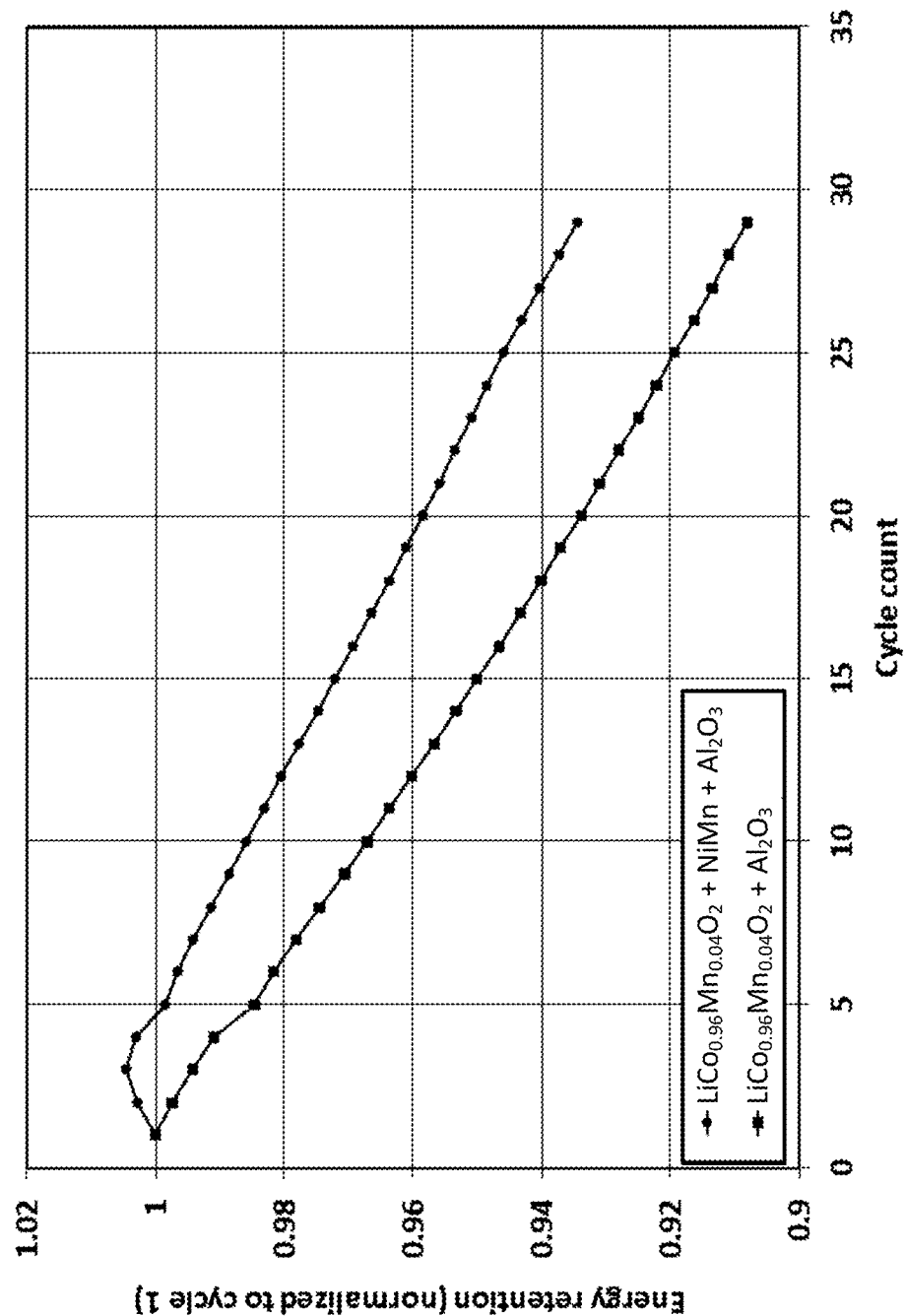
FIG. 15 shows a graph illustrating energy retention of battery cells having particles of different coating compositions after a number of charge and discharge cycles, according to an illustrative embodiment.

FIG. 15 shows a graph illustrating energy retention of battery cells having particles of different coating compositions after a number of charge and discharge cycles. Performance of a battery cell with particles having $LiCo_{0.96}Mn_{0.04}O_2$ core with an $Al_2O_3$ coating compared to a battery cell with particles having $LiCo_{0.96}Mn_{0.04}O_2$ core with a Ni—Mn and an $Al_2O_3$ coating. The energy retention (y-axis) is normalized with respect to the first cycle. The graph of FIG. 15 indicates that the battery cell with particles having a Ni—Mn and $Al_2O_3$ coating has higher energy retention over 28 cycle counts.

Figure 16:
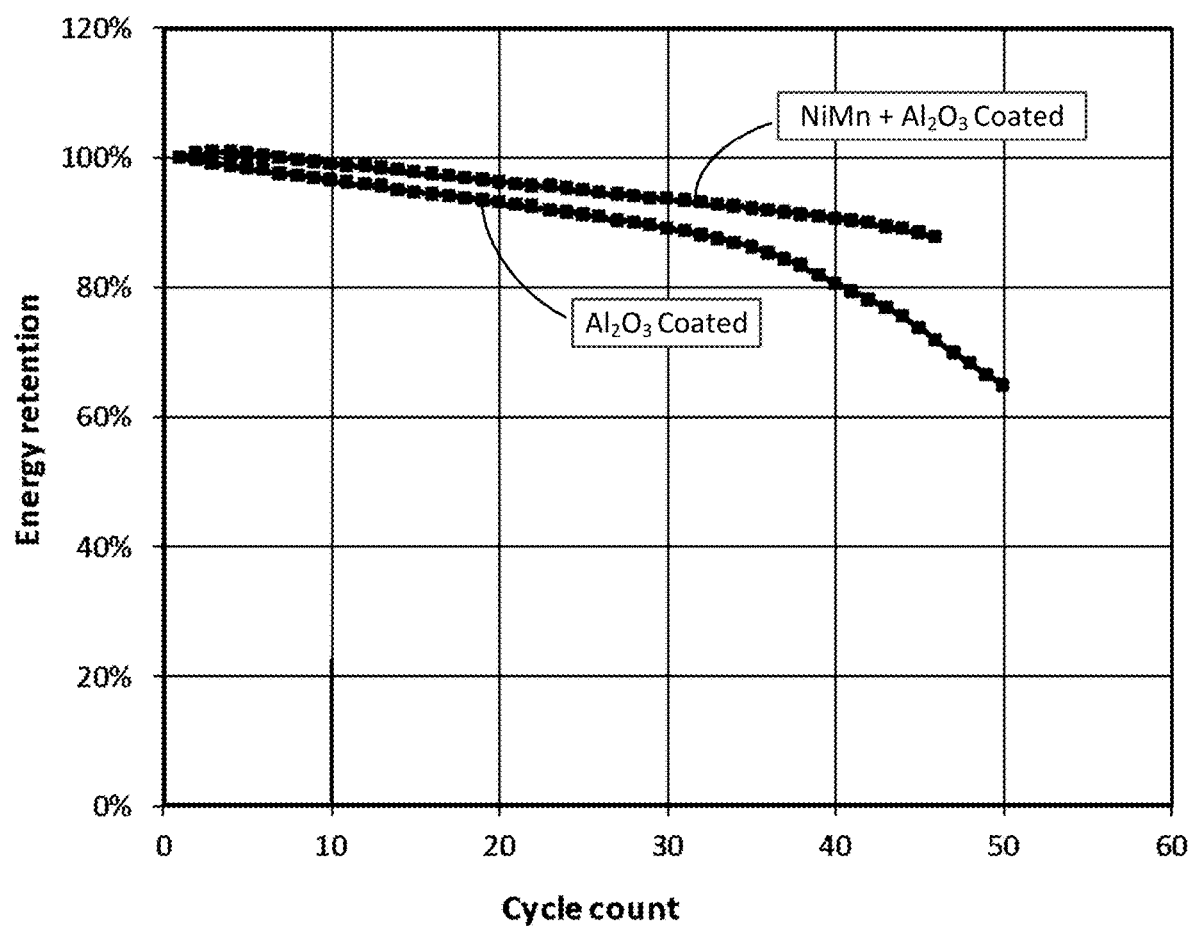
FIG. 16 shows a graph illustrating energy retention of half cells having particles of different compositions after a number of charge and discharge cycles, according to an illustrative embodiment.
Figure 17A:
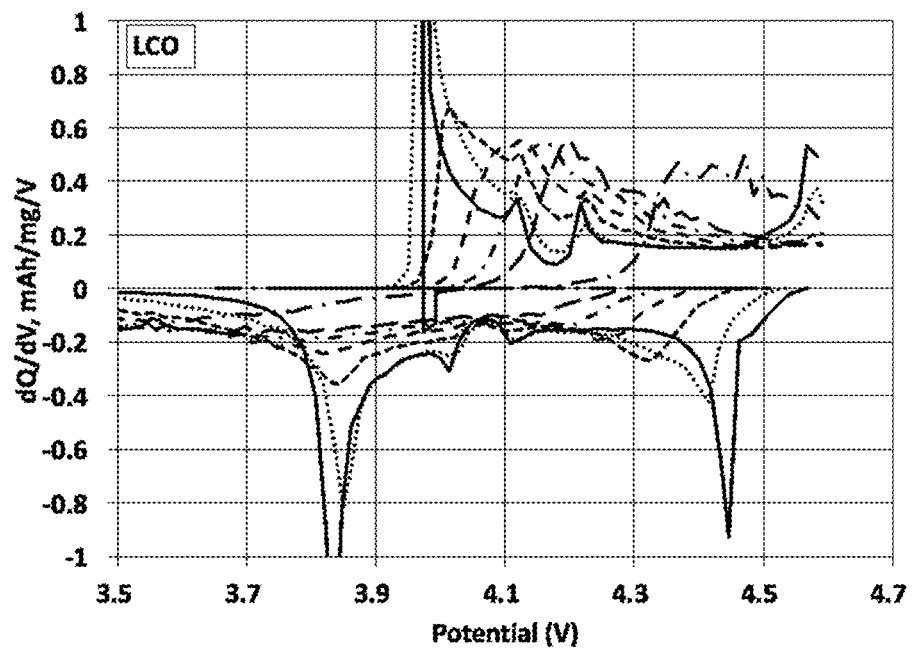
FIGS. 17A-17E show capacity analysis plots for battery cells having various lithium cobalt oxide compositions, according to an illustrative embodiment.
Figure 17B:
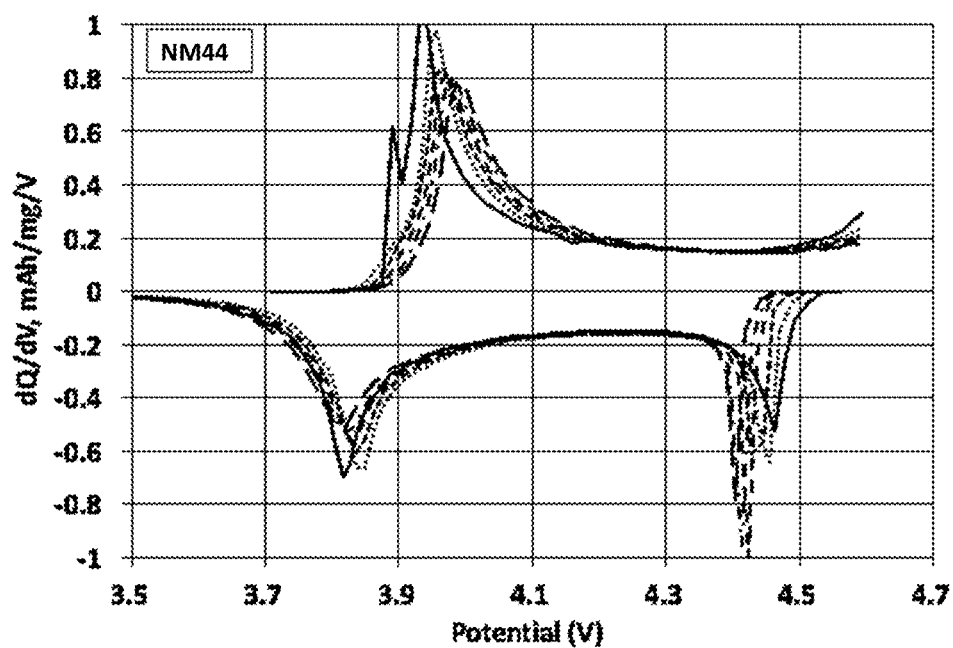
Figure 17C:
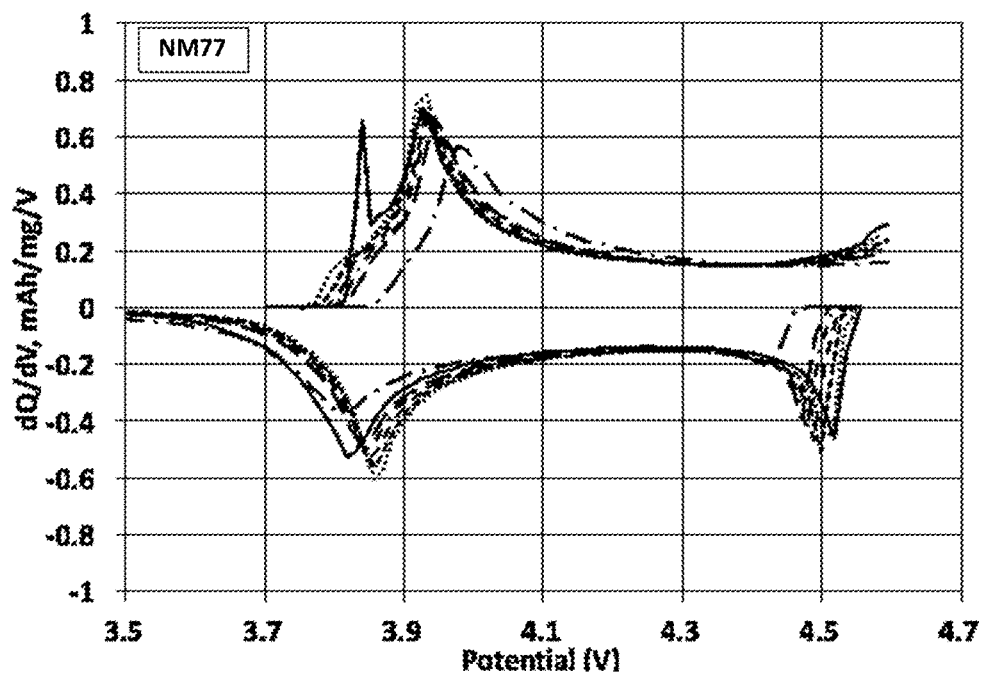
Figure 17D:
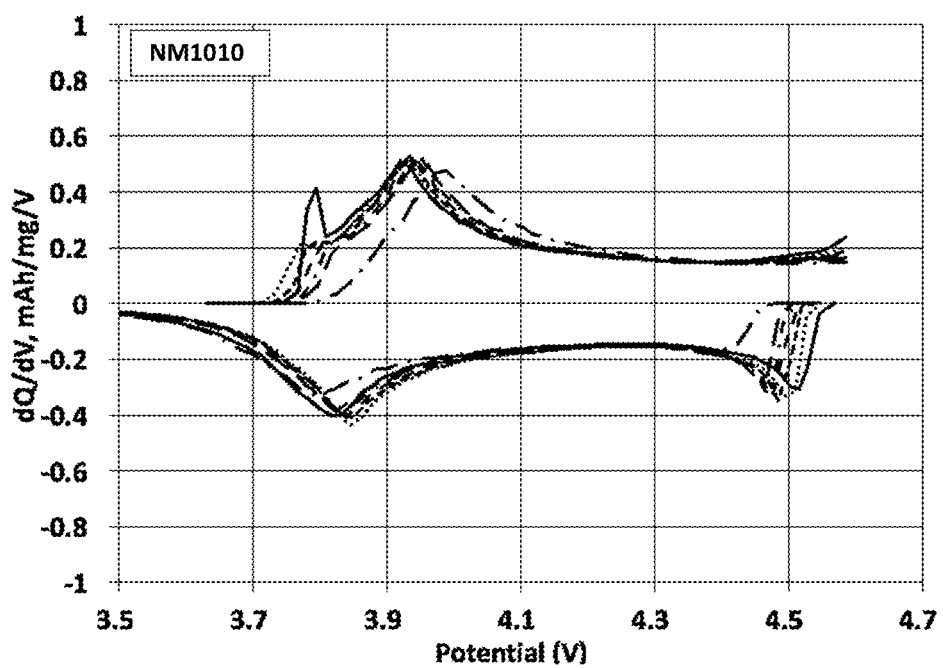
Figure 17E:
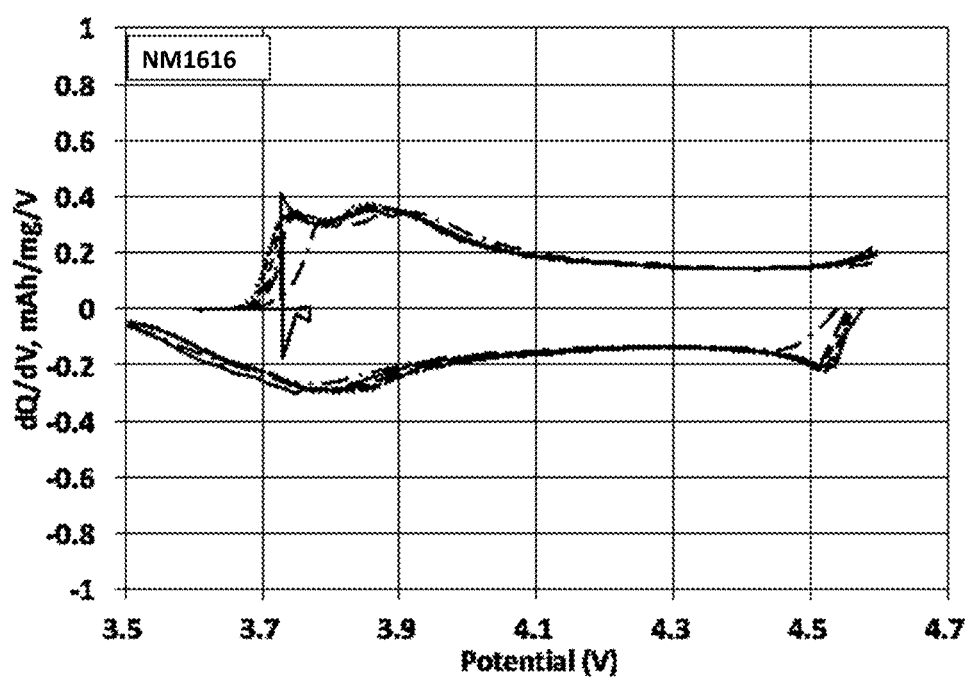

FIG. 16 shows a graph illustrating energy retention (%) of half cells having particles of different coating compositions after a number of charge and discharge cycles. The half cells are coin cell cycled at C/5 2.75-4.5V at 25 degrees C. Performance of a half cell with particles having $Al_2O_3$ coating is compared to a battery half cell with particles having a Ni—Mn and $Al_2O_3$ coating. The graph of FIG. 16 indicates that the half cell with particles having a Ni—Mn and $Al_2O_3$ coating has higher energy retention over about 46 cycle counts.

FIGS. 17A-17E show capacity analysis (dQ/dV) plots for battery cells having $LiCoO_2$ (standard, commercially available), NM44, NM77, NM1010, and NM1616 cathode compositions, respectively. Each dQ/dV plot is based on performance of a coin half cell at C/5 charge/discharge rate 2.75-4.6V. The solid lines in the plots are dQ/dV curves of a $1^{st}$ cycle after formation cycle, and the dotted lines are dQ/dV curves every 5 cycles thereafter. FIGS. 17A-17E indicate that the performance of the battery cell with the NM44, NM77, NM1010, and NM1616 cathode compositions are stable over numerous charge/discharge cycles compared to the standard battery cells with commercially available $LiCoO_2$ composition.

Figure 18:
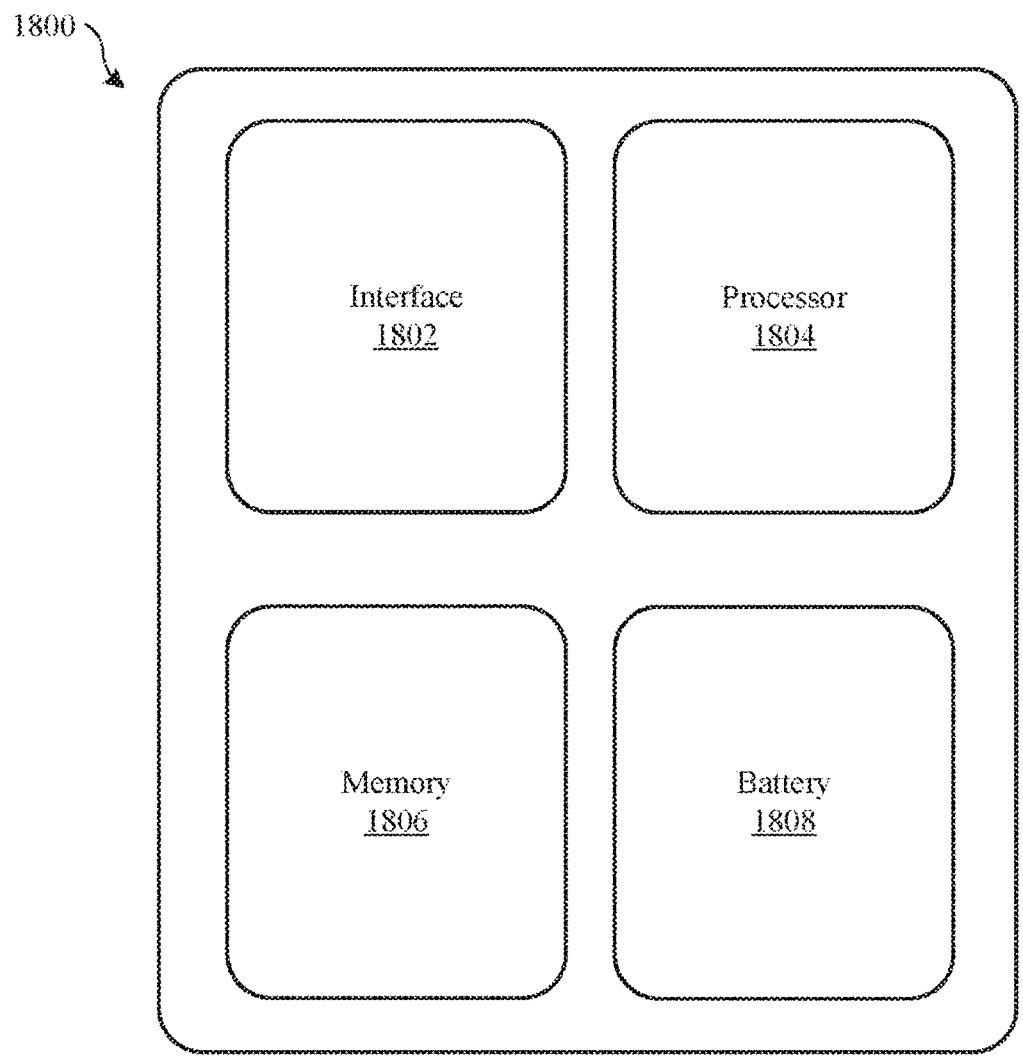
FIG. 18 shows an electronic device having a battery, according to an illustrative embodiment.

The battery cells described herein can be used in any suitable electronic device, such as device 1800 of FIG. 18. In some cases, electronic device 1800 is a consumer electronic device, such as a portable computing device (e.g., mobile phone, tablet device, wearable device, laptop, media player, camera, etc.). Electronic device 1800 includes interface 1802, which can include a user input component and a user output component. For example, interface 1802 can include visual display, visual capture, audio output, audio input, button, keypad, touch screen, sensor and other components. Electronic device 1800 also includes processor 1804, which can pertain to a microprocessor or controller for controlling operation of electronic device 1800. Electronic device 1800 further includes memory 1806, which can be accessed by one or more components of electronic device 1800 and can include random-access memory (RAM) and read-only memory (ROM). Electronic device 1800 also includes battery 1808, which can provide power to various components of electronic device 1800. Battery 1808 can correspond to rechargeable lithium-ion battery that includes one or more battery cells in accordance with embodiments described herein.

Figure 19A:
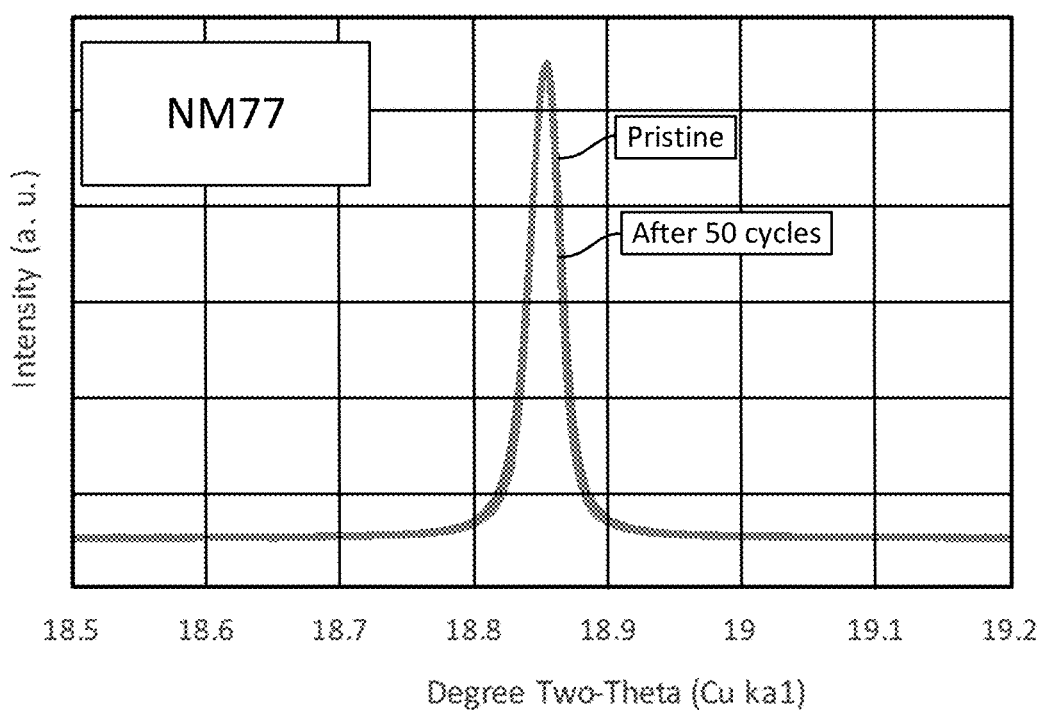
FIGS. 19A-19C show X-ray diffraction patterns of various lithium cobalt oxide compositions, according to an illustrative embodiment.
Figure 19B:
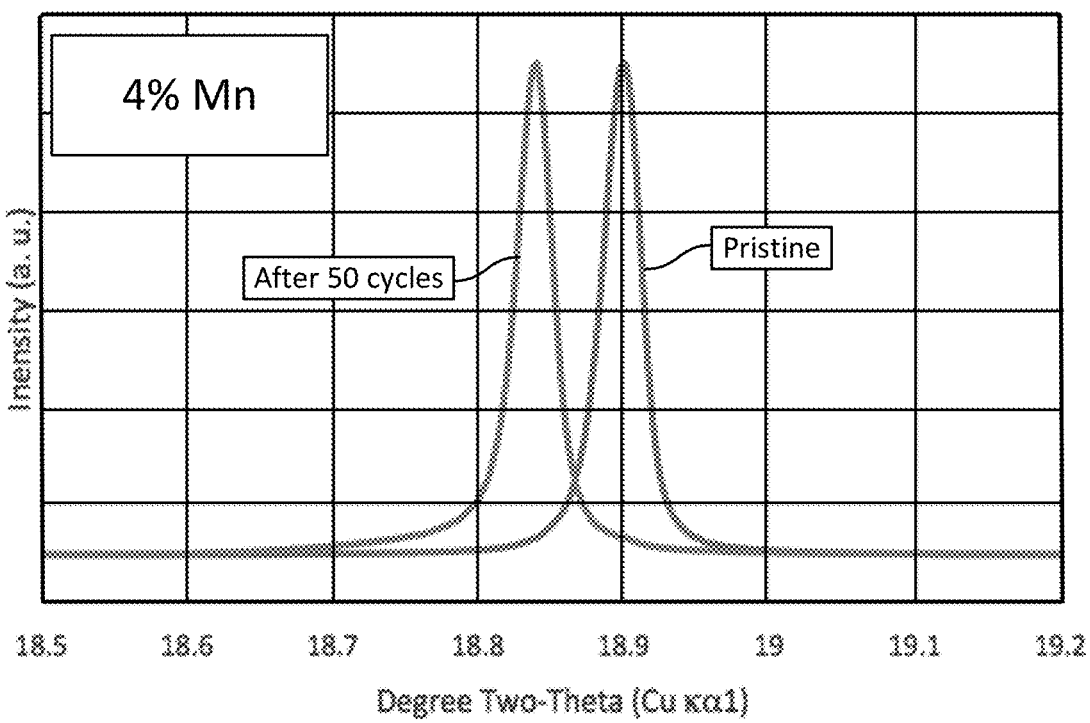
Figure 19C:
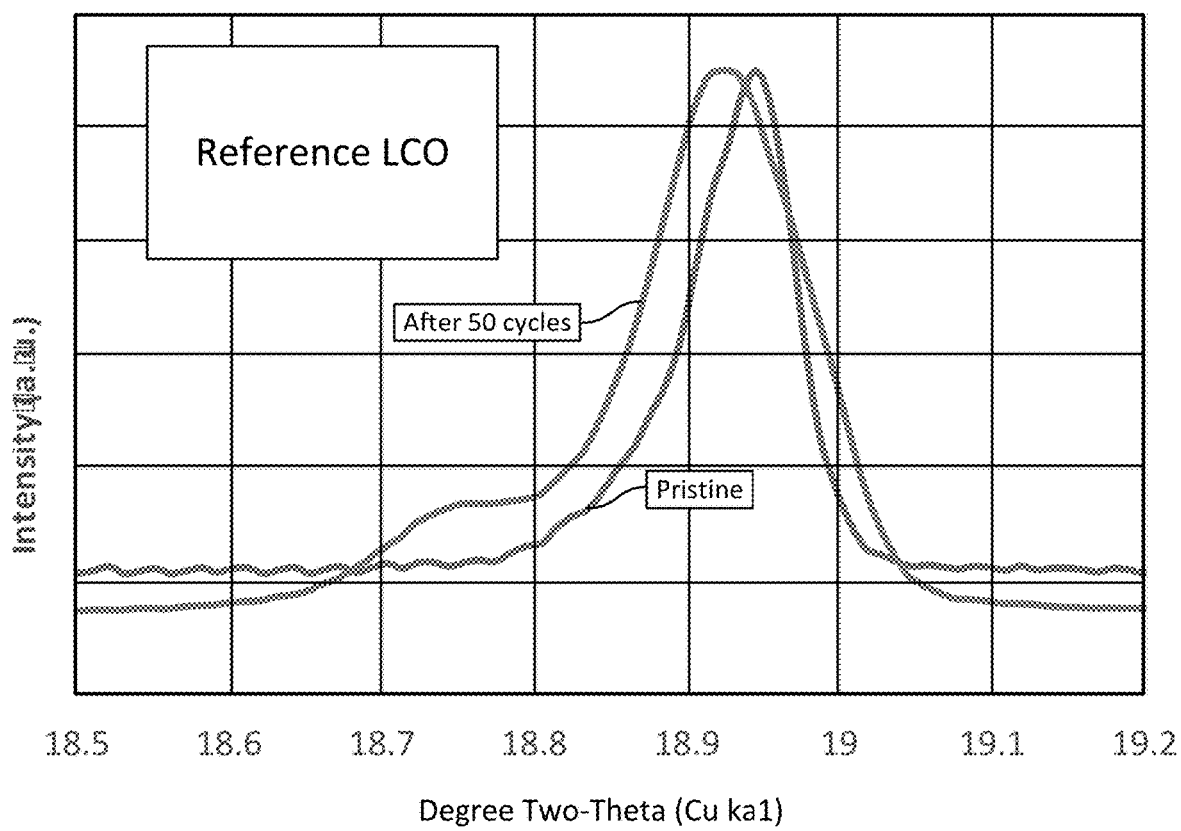

FIGS. 19A-19C show X-ray diffraction patterns of NM77, 4% Mn and LCO (standard $LiCoO_2$) compositions before and after 50 charge/discharge cycles. The compositions prior to charging/discharging are referred to as "pristine". Each sample was cycled between 2.75 V and 4.6 V at C/5 rate. FIG. 19A shows that the NM77 composition cathode had no structural changes, as indicated by not change in location or shape of X-ray diffraction peak between 18.8 and 18.9 two-theta degrees. This indicates that the crystal structure of the NM77 composition shows good reversibility. In contrast, FIGS. 19B and 19C show the 4% Mn and LCO compositions show significant shifting and changes in the shape at the peak between 18.8 and 18.9 two-theta degrees after the 50 charge/discharge cycles. That is, the crystal structures of the 4% Mn and LCO samples have irreversible change after cycle testing.

The battery cell performance of the different compositions will depend on the specific composition—e.g., extent of Ni—Mn pairing, amount of Me (if any)—as well as other factors. That is, any suitable atomic percentages can be used in accordance with the Formulae (I)-(IV).

Figure 20:
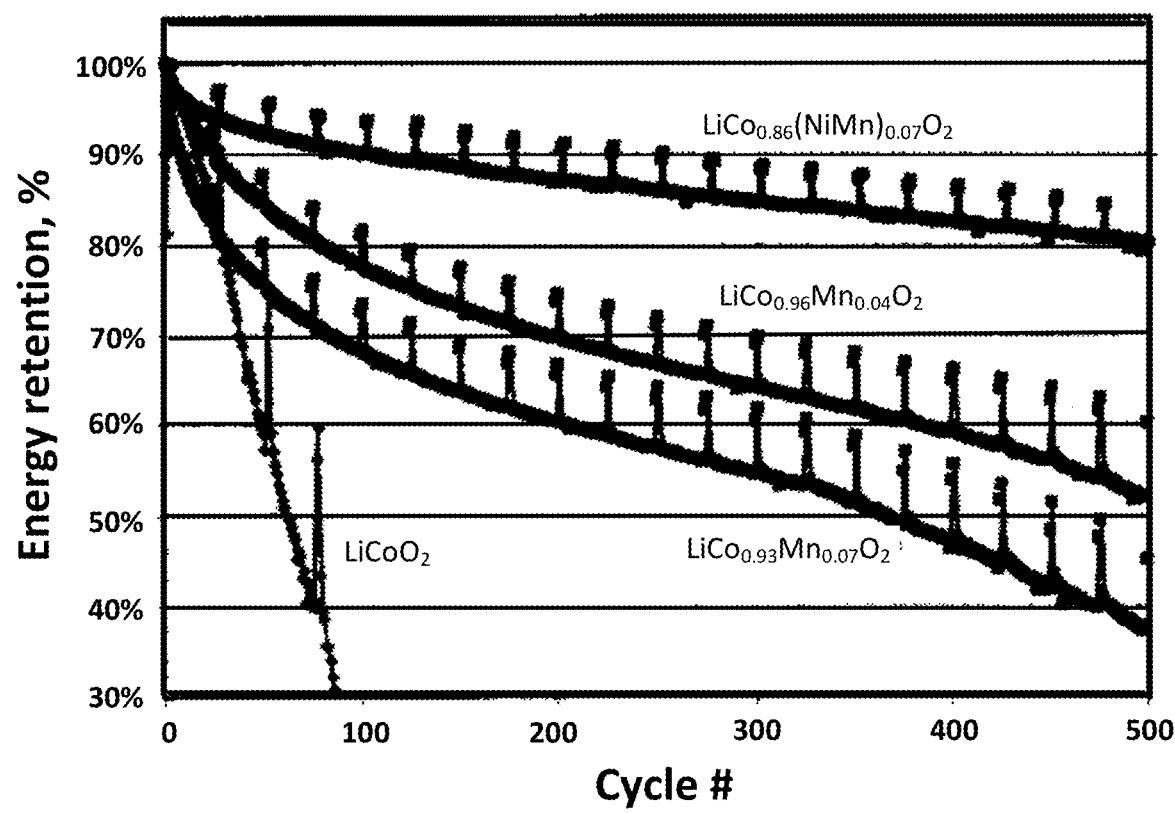
FIG. 20 shows a graph illustrating energy retention of cells having particles of different compositions at a higher temperature, according to an illustrative embodiment.

FIG. 20 shows a graph illustrating energy retention (%) of cells (single layer pouch cells) with different compositions at higher temperatures after a number of charge cycles. Each cell was cycled at 0.7 C charge, 1 C discharge, with a reference point test (RPT) at C/5 charge/discharge every 25 cycles using 2.75-4.45V at 45 degrees C. As shown, the cell having the $LiCo_{0.86}(NiMn)_{0.07}O_2$ composition has a much higher energy retention at higher temperatures compared to the cell without NiMn pair composition.

Methods of forming the compositions in accordance with Formulae (I) and (II) can vary. Example 1 below presents a method of forming a NM77 composition, specifically $LiCo_{0.86}Ni_{0.07}Mn_{0.07}O_2$, in accordance with some embodiments.

Example 1

An aqueous solution of manganese, nickel and cobalt sulfate (Mn:Ni:Co mole ratio 7:7:86) are dripped into a reactor having heated water. Ethylene Diamine Triacetic Acid (EDTA) is added and the pH is fixed at 10.5 by adding a basic solution. After some time, nickel-manganese-cobalt precursor particles form (e.g., in salt form such as an oxide or a hydroxide), which are then washed, filtered and dried. The precursor particles are mixed with $Li_2CO_3$ in solid state by varying the ratio of Li/metal to 0.96, 1.0 and 1.04. Following mixing, the mixed powder was heated then cooled. The sample was subsequently ground, then sieved and re-fired at higher temperatures and allowed to cool. The final sintered black powder was sieved for use in an electrochemical test as a cathode active material.

It should be noted that embodiments described herein are not limited to the methods described in Example 1. For example, other methods of forming the precursor particles can be used. For instance, other methods of mixing manganese, nickel and cobalt in solution state and precipitating out homogenous combined particles may be used. Alternatively, manganese, nickel and cobalt can be combined in solid state (e.g., in the form of manganese sulfate, nickel sulfate and cobalt sulfate). In other embodiments, a spray-dry process is used to form the precursor particles.

Examples 2-5 below present methods of forming coated particle compositions, in accordance with some embodiments.

Example 2: NM77 Coating on $Li_{1.04}Co_{0.96}Mn_{0.04}O_2$ Core

A predetermined amount of base powder (i.e., $Li_{1.04}Co_{0.96}Mn_{0.04}O_2$) is weighed out in a container. An amount of cobalt and nickel, manganese and lithium precursor needed for a desired amount of $LiCo_{0.86}Mn_{0.07}Ni_{0.07}O_2$ coating (e.g., 1, 2 and 3 wt. %) is calculated based on the weighed amount of base powder. The transition metal precursors include salts of cobalt, nickel and manganese, such as nitrate, acetate, or other salts soluble in water or alcohol. The lithium precursor is in in the form of a carbonate, hydroxide, acetate, oxalate, nitrate or any suitable combination thereof. The transition metal precursors and lithium precursor are dissolved in a small amount of water or alcohol to form a mixed solution. The mixed solution is added drop-wise onto the base powder while stirring. The mixed solution added is such that the base powder is incipiently wet and well mixed (i.e., exhibits a damp consistency). After drying at 50-80° C., the dried base powder is heat-treated at 700° C. for 5 hours in stagnant air.

Example 3: NM1616 Coating on $Li_{1.04}Co_{0.96}Mn_{0.04}O_2$ Core

A predetermined amount of base powder (i.e., $Li_{1.04}Co_{0.96}Mn_{0.04}O_2$) is weighed out in a container. An amount of cobalt and nickel, manganese and lithium precursor needed for a desired amount of $LiCo_{0.68}Mn_{0.16}Ni_{0.16}O_2$ coating (e.g., 1, 2 and 3 wt. %) is calculated based on the weighed amount of base powder. The transition metal precursors include salts of cobalt, nickel and manganese, such as nitrate, acetate, or other salt soluble in water or alcohol. The lithium precursor is in in the form of a carbonate, hydroxide, acetate, oxalate, nitrate or any suitable combination thereof. The transition metal precursors and lithium precursor are dissolved in a small amount of water or alcohol to form a mixed solution. The mixed solution is added drop-wise onto the base powder while stirring. The mixed solution is added such that the base powder is incipiently wet and well mixed (i.e., exhibits a damp consistency). After drying at 50-80° C., the dried base powder is heat-treated at 700° C. for 5 hours in stagnant air.

Example 4: NM1616 Coating on $LiNi_{0.8}Co_{0.15}Al_{0.05}O_2$ Core

A predetermined amount of base powder (i.e., $LiNi_{0.8}Co_{0.15}Al_{0.05}O_2$) is weighed out in a container. An amount of cobalt and nickel, manganese and lithium precursor needed for a desired amount of $LiCo_{0.68}Mn_{0.16}Ni_{0.16}O_2$ coating (e.g., 1, 2 and 3 wt. %) is calculated based on the weighed amount of base powder. The transition metal precursors include salts of cobalt, nickel and manganese, such as nitrate, acetate, or other salt soluble in water or alcohol. The lithium precursor is in in the form of a carbonate, hydroxide, acetate, oxalate, nitrate or any suitable combination thereof. The transition metal precursors and lithium precursor are dissolved in a small amount of water or alcohol to form a mixed solution. The mixed solution is added drop-wise onto the base powder while stirring. The mixed solution is added such that the base powder is incipiently wet and well mixed (i.e., exhibits a damp consistency). After drying at 50-80° C., the dried base powder is heat-treated at 500° C. for 5 hours in stagnant air.

Example 5: NM1616 Coating on $LiNi_{0.82}Co_{0.13}Mn_{0.055}O_2$ Core

A predetermined amount of base powder (i.e., $LiNi_{0.8}Co_{0.15}Al_{0.05}O_2$) is weighed out in a container. An amount of cobalt and nickel, manganese and lithium precursor needed for a desired amount of $LiCo_{0.68}Mn_{0.16}Ni_{0.16}O_2$ coating (e.g., 1, 2 and 3 wt. %) is calculated based on the weighed amount of base powder. The transition metal precursors include salts of cobalt, nickel and manganese, such as nitrate, acetate, or other salt soluble in water or alcohol. The lithium precursor is in in the form of a carbonate, hydroxide, acetate, oxalate, nitrate or any suitable combination thereof. The transition metal precursors and lithium precursor are dissolved in a small amount of water or alcohol to form a mixed solution. The mixed solution is added drop-wise onto the base powder while stirring. The mixed solution is added such that the base powder is incipiently wet and well mixed (i.e., exhibits a damp consistency). After drying at 50-80° C., the dried base powder is heat-treated at 500° C. for 5 hours in stagnant air.

In some embodiments described below, various methods of synthesizing hydroxide precursors are disclosed in Examples 6-11.

Example 6

Figure 21:
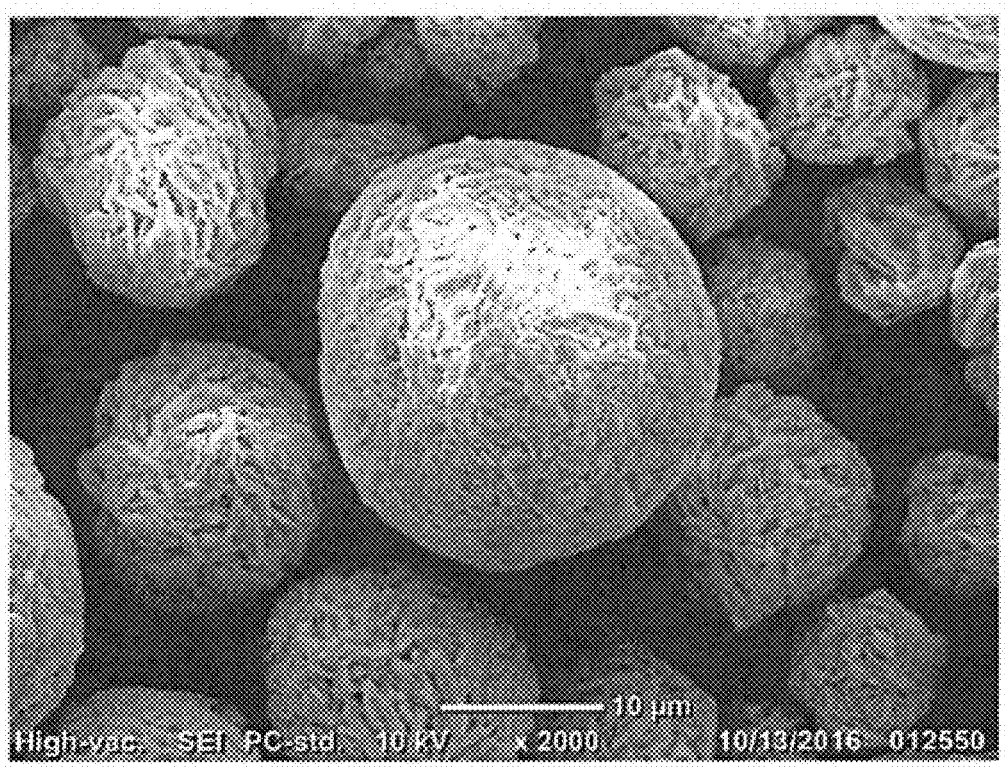
FIG. 21 shows an SEM image of spherical transition metal hydroxide particles prepared by a coprecipitation process, according to an illustrative embodiment.

Hydroxide precursors with the desired transition metal combination, for example: $Co_{0.97}Mn_{0.03}(OH)_2$ were synthesized via a coprecipitation process. During the process, a metal sulfate solution of the targeted composition and a NaOH solution were independently pumped into a 4 L continuous stirred tank reactor (CSTR) with the pH and temperature well controlled. At the same time, complexing agents ($NH_4OH$ or EDTA) were introduced into the tank to control the growth and density of the hydroxide particles. Additionally, a cover gas of $N_2$ is bubbled into the reactor to prevent the oxidation of the transition metals. After an initial growth time, the particles in the reactor begin to round and densify. The precursor is collected from the process as dense spherical particles, having tap densities as high as 2.00 g/cc. The powder cake is washed, filtered, and dried. The resulting precursor particles are composed of plate-like primary grains (FIG. 21). The primary grains are densely woven into spherical secondary particles with the D50 ranging between 15-25 um. This powder is used as a precursor that is later blended with other particles, such as lithium salts, and other precursor powders to be reacted together in a high-temperature process to produce a lithiated-oxide material with the desired properties for a high-energy density Li-ion cathodes. The spherical shape and the wide particle distribution of these particles allow them to be packed with the highest packing efficiency, which is critical for the high electrode density.

Example 7

Figure 22:
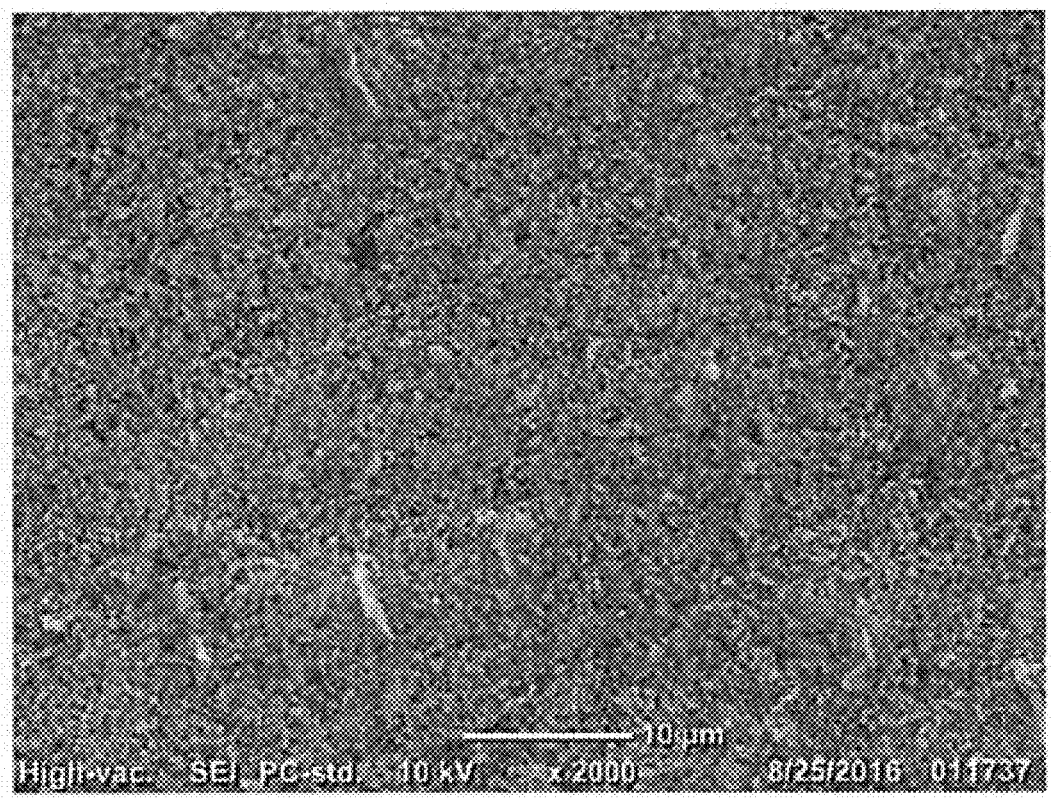
FIG. 22 shows an SEM image of a coprecipitated precursor that has been ground to sub-micron size, according to an illustrative embodiment.
Figure 23:
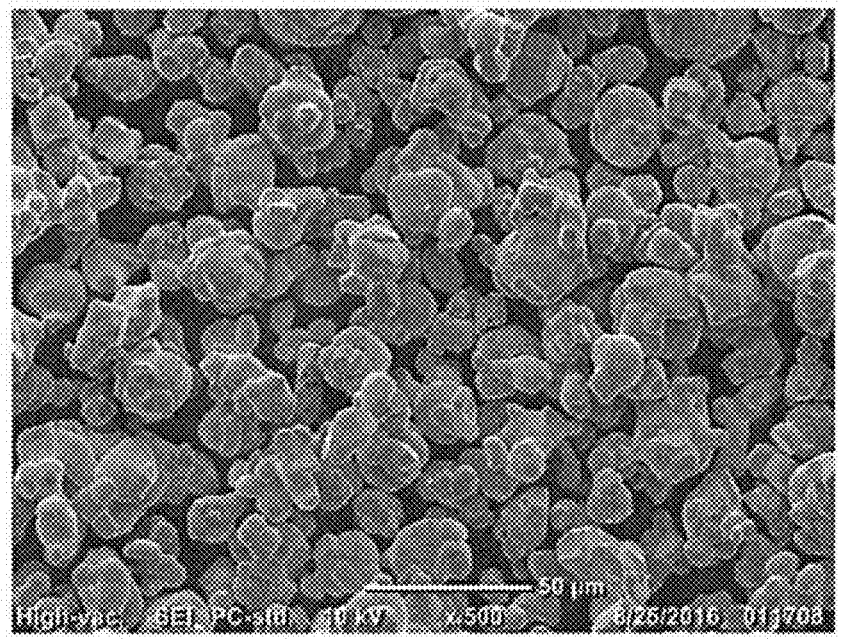
FIG. 23 shows an SEM image of calcined particles in accordance with the disclosure.

A coprecipitation process as described in Example 1 is started. The composition of the present material is chosen for its high energy retention, although its energy density may be considered substandard. In this example, the particles are immediately harvested from the reactor and washed. At this early stage of coprecipitation, the particles are irregular-shaped and have an open cancellous structure. The precursor particles are milled in water to produce sub-micron particles, which are subsequently filtered and dried (FIG. 22). This precursor (FIG. 22) is dry-blended with the appropriate amount of Li-salt and the base particles prepared in Example 1. The mixture is calcined in air at a temperature, for example 1085° C., and process time, for example 15 h, such that the particles interact and form a particulate material with the physical, chemical and electrochemical properties described as the inventive material (FIG. 23).

Example 8

Figure 24:
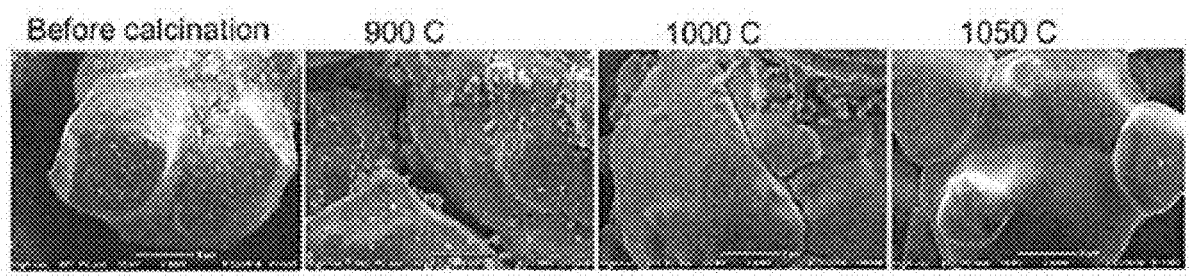
FIG. 24 is SEM images showing an effect of calcination temperature on the extent of reaction of the overlay with the base particle, according to an illustrative embodiment.

The coprecipitated precursors are produced as described in Examples 6 and 7. The base material (Example 6) is blended with an appropriate amount of lithium salt and calcined at the required temperature and time to produce particulates with a similar morphology to those shown in FIG. 23. These particles are blended with the sub-micron hydroxide precursor described in Example 7 and with an appropriate amount of Li-salt. The mixture is heat treated at a temperature and time, for example from 500-1050° C. for 5 h, to react the fine particles with the lithium salt and sinter the fine particles to and into the surface of the pre-calcined base particles (FIG. 24). The sintering temperature and time are chosen to control the extent of diffusion of the fine particles into the surface of the base material.

Example 9

An alternative approach is to pre-lithiate and calcine the base and fine particles separately at a lower temperature 500-900° C. before blending, and then heat-treating the fine particles with the base material at higher temperatures (900-1100° C.) to bond them together and allow interdiffusion of elements. Other blending and calcination approaches can be conceived to achieve the same results as described here.

Example 10

Figure 25:
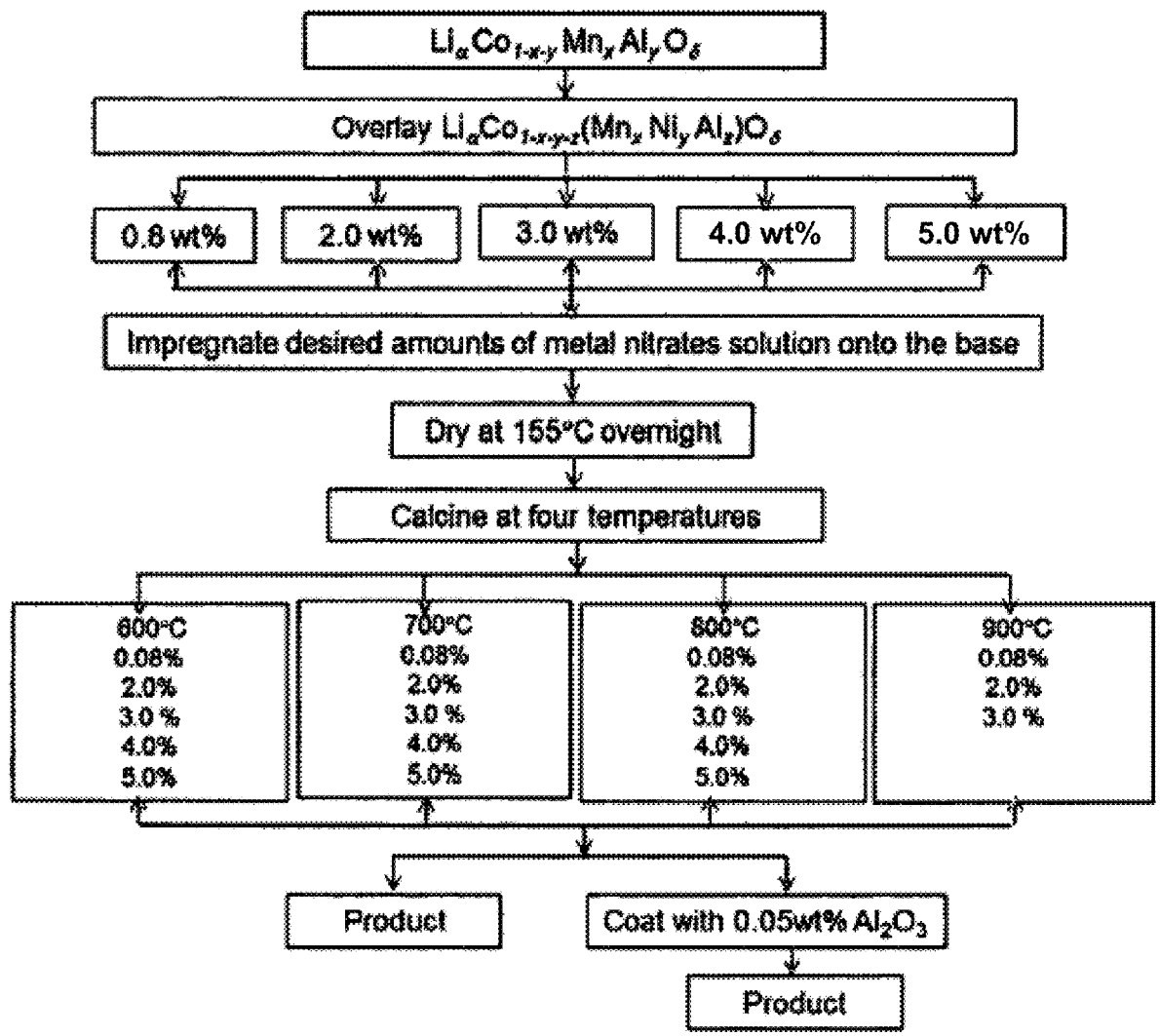
FIG. 25 is a process of flow chart showing an alternative method of overlay using metal ion solution, according to an illustrative embodiment.

An alternative approach is to coprecipitate, lithiate, and calcine the base particles as in Example 8. Then a solution of acetates and/or nitrates containing LiCo(MnxNiyAlz)O was prepared and mixed with the base particles to form an incipient wet mixture. The mixture was dried and then calcined between 600-900° C. FIG. 25 is a flow chart of the various compositions and process parameters.

Example 11

An alternative approach to produce the precursor of the inventive material is to carry out the coprecipitation process for the base particles as described in Example 6. Then, as the particles have grown and densified to their near-optimum properties, the process is contained as a batch process, and the metal-ion feedstock solution is changed to produce the energy-retentive composition defined in equation: $Li_\alpha Co_{1-x-y-z}(Mn_xNi_yAl_z)O_\sigma$, wherein $0<y\leq x\leq 0.2$, $0.98\leq\alpha\leq 1.02$, $1.99\leq\delta\leq 2.01$. The coprecipitation process then continues until the hydroxide precursor particles have been overlaid with the desired fraction of the new composition. These precursor particles are washed, dried and calcined with lithium salts as described earlier to produce a finished cathode powder.

Example 12: NM1616 Coating on LiNi$_{0.8}$Co$_{0.15}$Al$_{0.05}$O$_2$ Core

Coin cells were made from the electrode material described in Example 7, using a Li disk anode (½ cell) to demonstrate the effects of the inventive modification. Three cells are compared in FIG. 6 for their discharge capacity. The 3% Mn baseline has a composition: (as determined by high precision ICP-OES); the 2 wt % NM1616 (referring to a lithiated 2 wt % overlay containing a nominal 16 mol % Mn, 16 mol % Ni, and balance Co, or resulting in an overall composition of the base and the overlay: and the 5 wt % NM1616 (referring to a lithiated 5 wt % overlay containing a nominal 16 mol % Mn, 16 mol % Ni, and balance Co, or results in an overall composition of the base and the overlay. All of the materials are coated with 0.05 wt % Al$_2$O$_3$ using a wet impregnation process of Al-nitrate salts, dried and calcined at 500° C. in air. The 3% Mn baseline starts out with a discharge capacity of 184 mAh/g, while the 2 wt % NM1616 overlaid material has a lower capacity of 182 mAh/g, however, the overlaid material shows better capacity retention over 25 cycles. The 5 wt % NM1616 has a lower capacity of 179 mAh/g, yet also shows better capacity retention than the baseline.

It is determined that during processing, the overlaid materials maintain a certain amount of separation of the overlay from the base material; i.e., the elements of the overlay have not completely distributed into the base, but have a surface that is enriched with the initial composition of the overlay material.

Figure 27:
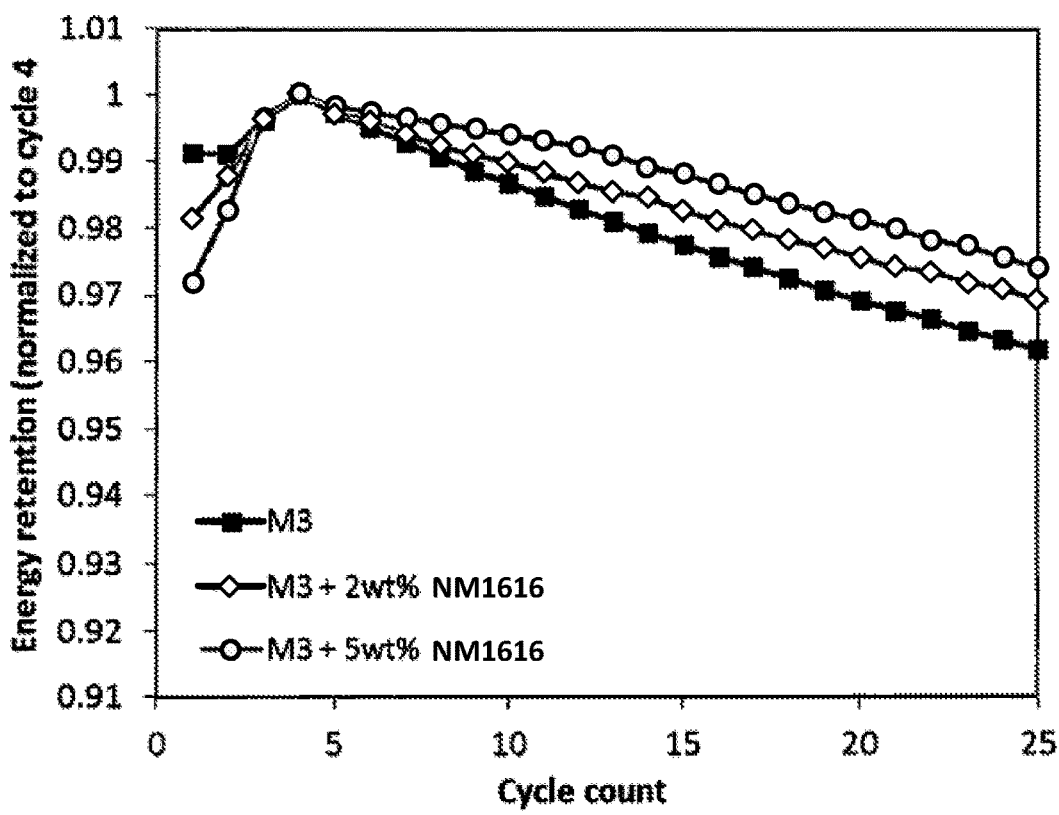
FIG. 27 is a graph of normalized energy retention illustrating the improved retention of overlaid materials, according to an illustrative embodiment.
Figure 28:
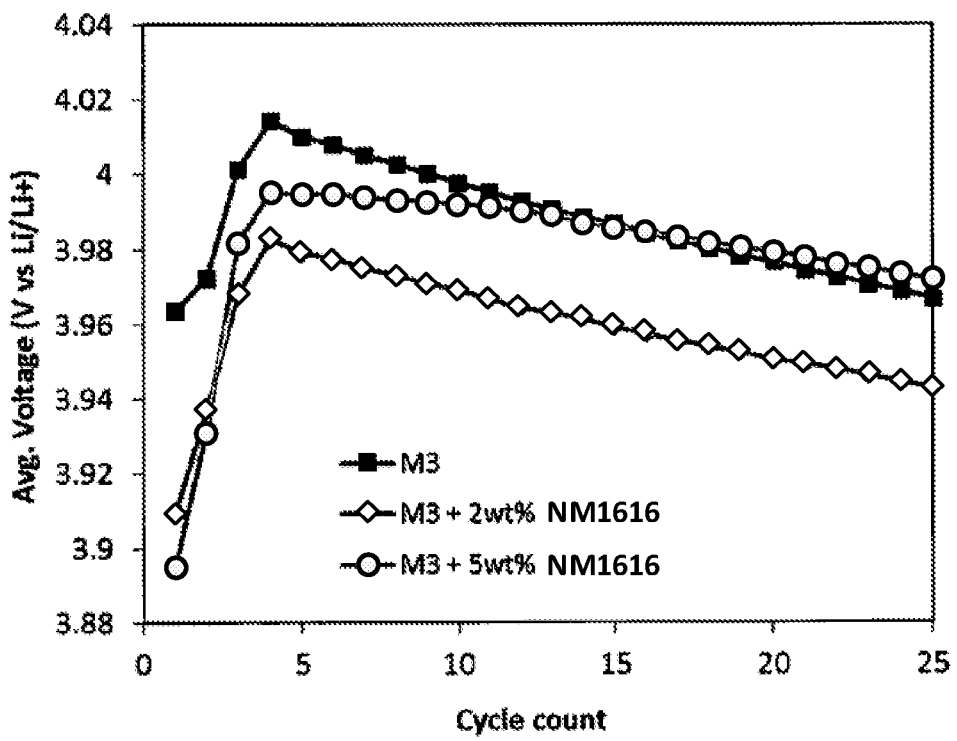
FIG. 28 is a graph showing the average voltage with cycling improved with ab increase of MN161 content, according to an illustrative embodiment.

Further evidence of improved energy retention is shown in FIG. 27. The normalized energy retention is improved by overlaying increasing amounts of NM1616 on the 3% Mn baseline material. This improvement is also seen in the average discharge voltage (FIG. 28). The best voltage retention is seen for the 5 wt % NM1616 overlaid material.

Figure 26:
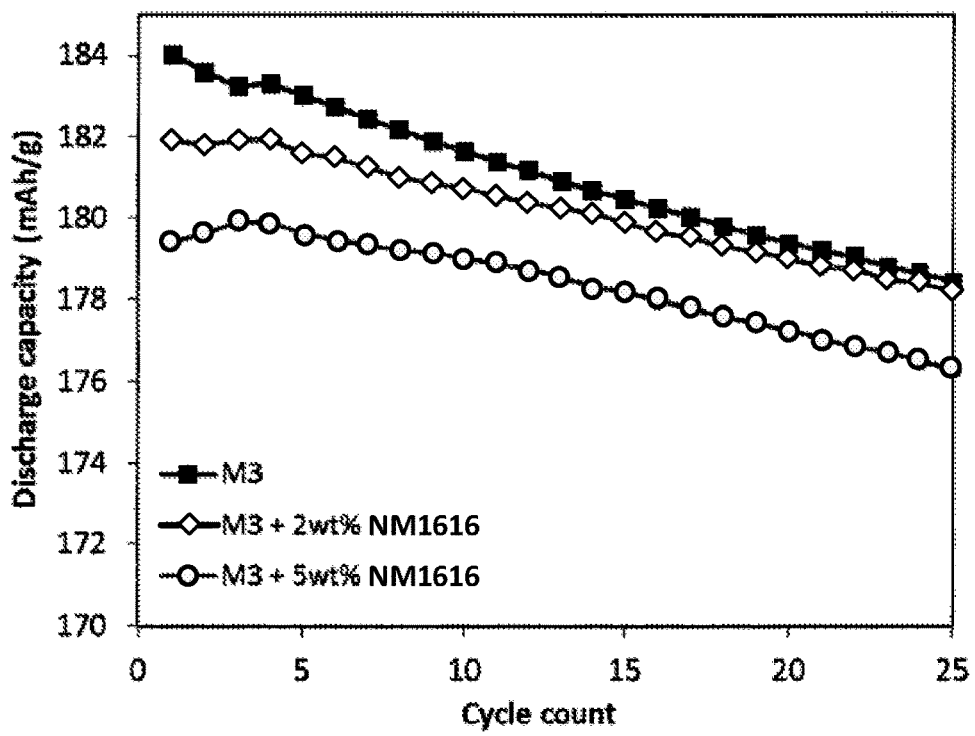
FIG. 26 is a graph showing discharge capacity v. cycling demonstrating improved capacity retention overlay by overlaying NM1616, according to an illustrative embodiment.

The benefits gained from an increased amount of overlay on the base material are offset by a reduction in capacity with increased NM1616 as shown in FIG. 26. Considering the capacity and voltage retention, the best overlay composition is between 2 and 5 wt % NM1616.

The NM1616 composition was chosen for its excellent energy retention, however, there are other compositions of Mn and Ni substituted LiCoO2 that may also provide good energy retention while maintaining high energy density. Additionally, 3% Mn was chosen as the base composition because of its high energy density and retention. Other compositions including variable Al and Mn additions can further improve energy density and retention.

Example 13

Figure 29:
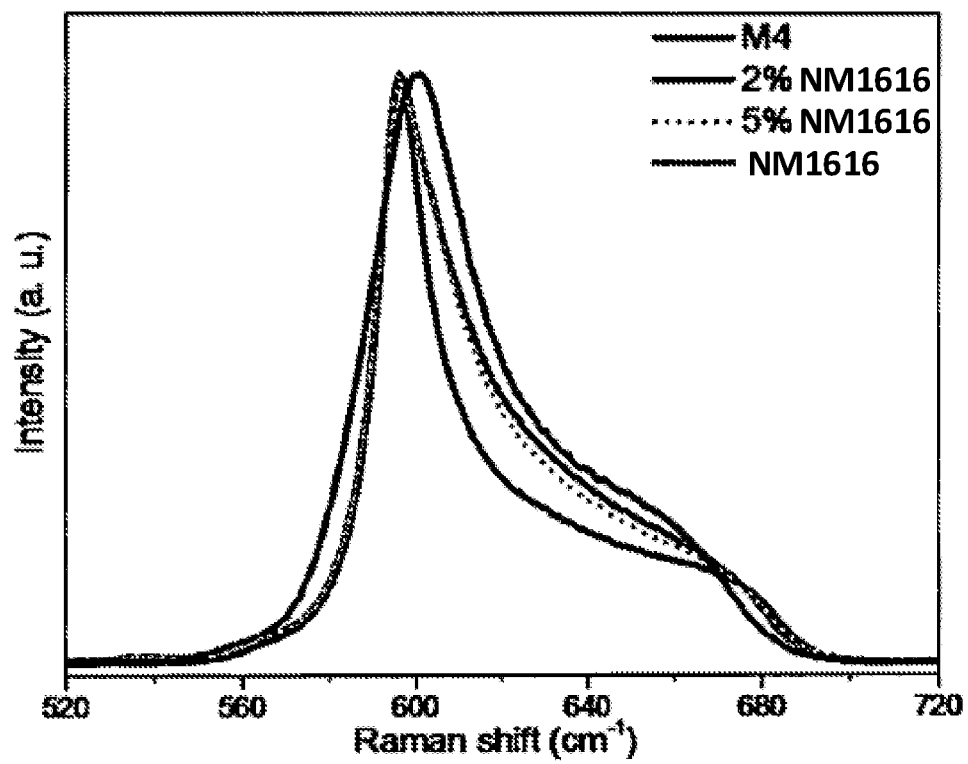
FIG. 29 is a Raman microspectroscopy spectra showing that the overlay surface is similar to bulk NM1616, according to an illustrative embodiment.
Figure 30:
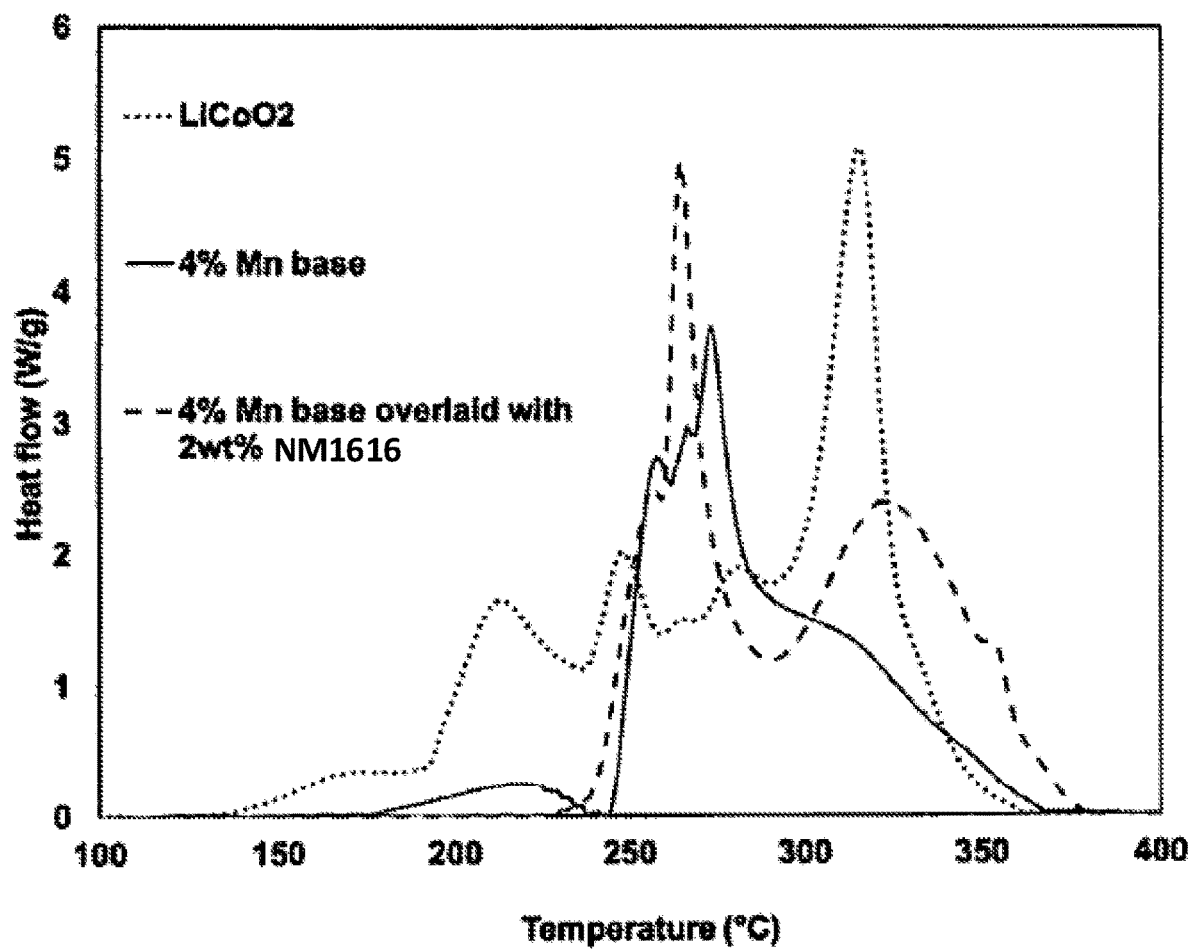
FIG. 30 is a differential scanning calorimetry showing better thermal stability with NM1616 overlay, according to an illustrative embodiment.

The assumption that the NM1616 overlay does remain near the surface of the particle after high temperature processing is substantiated by Raman microspectroscopy. This surface-sensitive technique shows the effect of Li, Mn and Ni additions. In FIG. 29, a comparison is made between baseline 4% Mn (M4) with 2 wt % and 5 wt % NM1616 overlays and pure NM1616 powder. The Raman spectrum for NM1616 shows an upward shift in the major peak compared to M4 and 2 wt % and 5 wt % NM1616; and the 'knee' between 620-680 cm-1 has greater intensity and has narrowed for NM1616. The 2 wt % and 5 wt % MN overlays show spectra that lie in between the M4 and NM1616. The knee size and shape is determined by the amount of Ni, Mn, and Li content in the compound. As such, this figure illustrates that the surfaces of both 2 wt % and 5 wt % show similar surface behavior to pure NM1616.

Example 14

The thermal stability of a baseline material containing 4% Mn is improved with the addition of Mn to LiCoO2. Stability is sacrificed slightly when 4% Mn is overlaid with NM1616. Differential scanning calorimetry (DSC) is used to demonstrate thermal stability of lithium ion materials. Electrodes from each material were first cycled between 2.75-4.6V vs. Li with 0.1 C and then charged to 4.6V and held at this voltage for 5 hours, before disassembling. The cycled electrodes were harvested from the coin cells and then washed with Dimethyl carbonate (DMC) and dried in the glove box. The harvested electrodes were sealed in the stainless steel high pressure capsules with electrolyte [1.2 M LiPF6+EC: EMC (3:7 by weight)]. The sealed high pressure capsules were heated from 30-400° C. with 10° C./min then cooled down to 30° C. FIG. 10 shows DSC test results of LiCoO2, (4% Mn base), and (4% Mn overlaid with NM1616). The onset temperature and the heat release for charged LiCoO2 are 190° C. and 0.54 J/g, respectively. While the onset temperature for the charged (4% Mn base) has improved to 247° C. and the heat release has reduced to 0.28 J/g. The thermal stability of the (4% Mn overlaid with NM1616) is slightly less stable compared to the 4% Mn base having an onset temperature of 240° C. and heat release of 0.37 J/g; but maintains a better thermal stability than LiCoO2.

During heating, the charged cathode goes through a phase transition that releases oxygen, which reacts exothermically with the electrolyte solvent resulting in a heat release. Manganese is considered to increase thermal stability. Addition of Mn stabilizes the structure of charged and delays the structural change during heating. Co-addition of Ni will reduce the thermal stability of charged which is caused by the largest and fastest reduction of Ni4+ to Ni2+. (Seong-Min Bak, et al. ACS Appl. Mater. Interfaces 2014, 6, 22594-22601) However, well-balanced Co, Ni and Mn ratios can also achieve good thermal stability.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A compound represented by Formula (II):

$$Li_a Co_{(1-2y)}(M1M2)_y O_\delta \qquad \text{Formula (II)}$$

wherein M1 is Ni;
wherein M2 is Ti;
wherein M1M2 represents metal pairs of M1 and M2; and
wherein $0<y\le0.4$, $0.95\le\alpha\le1.4$, and $1.90\le\delta\le2.10$.

2. The compound of claim 1, wherein $0<y\le0.25$.
3. The compound of claim 1, wherein $0.02\le y\le0.06$.
4. The compound of claim 1, wherein $0.05\le y\le0.09$.
5. The compound of claim 1, wherein $0.08\le y\le0.12$.
6. The compound of claim 1, wherein $0.14\le y\le0.18$.
7. The compound of claim 1, wherein $0.20\le y\le0.25$.
8. A cathode active material comprising the compound of claim 1.
9. A cathode comprising a cathode current collector and the cathode active material according to claim 8 disposed over the cathode current collector.
10. A battery cell comprising:
an anode comprising an anode current collector and an anode active material disposed over the anode current collector and
the cathode of claim 9.
11. A portable electronic device comprising:
the battery cell of claim 10.

* * * * *

UNITED STATES PATENT AND TRADEMARK OFFICE
CERTIFICATE OF CORRECTION

PATENT NO. : 11,462,736 B2
APPLICATION NO. : 16/802347
DATED : October 4, 2022
INVENTOR(S) : Hongli Dai et al.

It is certified that error appears in the above-identified patent and that said Letters Patent is hereby corrected as shown below:

In the Claims

Claim 1, beginning at Column 28, Line 26, the formula reads:
$Li_aCo_{(1-2y)}(M/M2)_yO_\delta$    Formula (II)

The formula should be:
$Li_aCo_{(1-2y)}(M1M2)_yO_\delta$ Formula (II)

Signed and Sealed this
Twenty-second Day of October, 2024

Katherine Kelly Vidal
*Director of the United States Patent and Trademark Office*